US012697597B2

(12) United States Patent
Lackey et al.

(10) Patent No.: US 12,697,597 B2
(45) Date of Patent: Aug. 4, 2026

(54) METHODS FOR POLYNUCLEOTIDE SYNTHESIS

(71) Applicant: Twist Bioscience Corporation, South San Francisco, CA (US)

(72) Inventors: Jeremy Lackey, Foster City, CA (US); David Dodd, San Francisco, CA (US); Stefan Pitsch, Stein am Rhein (CH)

(73) Assignee: Twist Bioscience Corporation, South San Francisco, CA (US)

( * ) Notice: Subject to any disclaimer, the term of this patent is extended or adjusted under 35 U.S.C. 154(b) by 944 days.

(21) Appl. No.: 18/051,472

(22) Filed: Oct. 31, 2022

(65) Prior Publication Data

US 2023/0158469 A1 May 25, 2023

Related U.S. Application Data

(60) Provisional application No. 63/274,397, filed on Nov. 1, 2021.

(51) Int. Cl.
*B01J 19/00* (2006.01)

(52) U.S. Cl.
CPC .. *B01J 19/0046* (2013.01); *B01J 2219/00587* (2013.01); *B01J 2219/00596* (2013.01); *B01J 2219/00722* (2013.01)

(58) Field of Classification Search
CPC .......... B01J 19/0046; B01J 2219/00587; B01J 2219/00596; B01J 2219/00722; C07H 21/00; C07H 21/04; C07H 21/02; Y02P 20/55
See application file for complete search history.

(56) References Cited

U.S. PATENT DOCUMENTS

| | | | |
|---|---|---|---|
| 5,026,838 | A | 6/1991 | Nojiri et al. |
| 5,368,823 | A | 11/1994 | McGraw et al. |
| 5,474,796 | A | 12/1995 | Brennan |
| 5,534,507 | A | 7/1996 | Cama et al. |
| 5,677,195 | A | 10/1997 | Winkler et al. |
| 5,843,767 | A | 12/1998 | Beattie |
| 6,013,440 | A | 1/2000 | Lipshutz et al. |
| 6,028,189 | A | 2/2000 | Blanchard |
| 6,093,302 | A | 7/2000 | Montgomery |
| 6,419,883 | B1 | 7/2002 | Blanchard |
| 6,444,111 | B1 | 9/2002 | Montgomery |
| 6,472,147 | B1 | 10/2002 | Janda et al. |
| 6,492,107 | B1 | 12/2002 | Kauffman et al. |
| 6,893,816 | B1 | 5/2005 | Beattie |
| 7,163,660 | B2 | 1/2007 | Lehmann |
| 7,202,264 | B2 | 4/2007 | Ravikumar et al. |
| 8,198,071 | B2 | 6/2012 | Goshoo et al. |
| 8,486,631 | B2 | 7/2013 | Holt et al. |
| 8,647,821 | B2 | 2/2014 | Castro et al. |
| 9,403,141 | B2 | 8/2016 | Banyai et al. |
| 9,409,139 | B2 | 8/2016 | Banyai et al. |
| 9,555,388 | B2 | 1/2017 | Banyai et al. |
| 9,677,067 | B2 | 6/2017 | Toro et al. |
| 9,745,619 | B2 | 8/2017 | Rabbani et al. |
| 9,765,387 | B2 | 9/2017 | Rabbani et al. |
| 9,833,761 | B2 | 12/2017 | Banyai et al. |
| 9,839,894 | B2 | 12/2017 | Banyai et al. |
| 9,889,423 | B2 | 2/2018 | Banyai et al. |
| 9,895,673 | B2 | 2/2018 | Peck et al. |
| 9,981,239 | B2 | 5/2018 | Banyai et al. |
| 10,053,688 | B2 | 8/2018 | Cox |
| 10,272,410 | B2 | 4/2019 | Banyai et al. |
| 10,384,188 | B2 | 8/2019 | Banyai et al. |
| 10,384,189 | B2 | 8/2019 | Peck |
| 10,417,457 | B2 | 9/2019 | Peck |
| 10,583,415 | B2 | 3/2020 | Banyai et al. |
| 10,618,024 | B2 | 4/2020 | Banyai et al. |
| 10,632,445 | B2 | 4/2020 | Banyai et al. |
| 10,639,609 | B2 | 5/2020 | Banyai et al. |
| 10,669,304 | B2 | 6/2020 | Indermuhle et al. |
| 10,744,477 | B2 | 8/2020 | Banyai et al. |
| 10,754,994 | B2 | 8/2020 | Peck |
| 10,773,232 | B2 | 9/2020 | Banyai et al. |
| 10,844,373 | B2 | 11/2020 | Cox et al. |
| 10,894,242 | B2 | 1/2021 | Marsh et al. |
| 10,894,959 | B2 | 1/2021 | Cox et al. |
| 10,907,274 | B2 | 2/2021 | Cox |
| 10,936,953 | B2 | 3/2021 | Bramlett et al. |

(Continued)

FOREIGN PATENT DOCUMENTS

| | | | |
|---|---|---|---|
| CN | 101277758 | A | 10/2008 |
| EP | 3030682 | A2 | 6/2016 |

(Continued)

OTHER PUBLICATIONS

Larpent, C., Patin, H. Tetrahedron. 1988. vol 44, No. 19, pp. 6107 to 6118. (Year: 1988).*

Hayakawa, Y., et al. J. Am. Chem. Soc. 1990, 112, 1691-1696. (Year: 1990).*

PCT/US2022/048456 International Search Report and Written Opinion Mar. 3, 2023.

Agbavwe et al.: Efficiency, Error and Yield in Light-Directed Maskless Synthesis of DNA Microarrays. Journal of Nanobiotechnology. 9(57):1-17 (2011).

Arkles et al.: The Role of Polarity in the Structure of Silanes Employed in Surface Modification. Silanes and Other Coupling Agents. 5:51-64 (2009).

ATDBio. Nucleic Acid Structure, Nucleic Acids Book, 9 pages, published on Jan. 22, 2005. from: http://www.atdbio.com/content/5/Nucleic-acid-structure.

(Continued)

*Primary Examiner* — Andrea Olson
*Assistant Examiner* — Samuel L Galster
(74) *Attorney, Agent, or Firm* — Bookoff McAndrews, PLLC

(57) ABSTRACT

Provided herein are compositions, devices, systems and methods for DNA oligomer synthesis. Further provided are devices comprising addressable electrodes controlling polynucleotide synthesis (deprotection, extension, or cleavage, etc.). The compositions, devices, systems and methods described herein provide improved synthesis, storage, density, and retrieval of biomolecule-based information.

20 Claims, 21 Drawing Sheets

(56) References Cited

U.S. PATENT DOCUMENTS

| | | | |
|---|---|---|---|
| 10,969,965 | B2 | 4/2021 | Malina et al. |
| 10,975,372 | B2 | 4/2021 | Cox et al. |
| 10,987,648 | B2 | 4/2021 | Peck et al. |
| 11,185,837 | B2 | 11/2021 | Banyai et al. |
| 11,214,798 | B2 | 1/2022 | Brown |
| 11,263,354 | B2 | 3/2022 | Peck |
| 11,332,738 | B2 | 5/2022 | Nugent et al. |
| 11,332,740 | B2 | 5/2022 | Nugent et al. |
| 11,377,676 | B2 | 7/2022 | Wu et al. |
| 11,407,837 | B2 | 8/2022 | Glanville |
| 11,452,980 | B2 | 9/2022 | Banyai et al. |
| 11,492,665 | B2 | 11/2022 | Zeitoun et al. |
| 11,492,727 | B2 | 11/2022 | Tabibiazar et al. |
| 11,492,728 | B2 | 11/2022 | Sato |
| 11,512,347 | B2 | 11/2022 | Peck |
| 2001/0018512 | A1 | 8/2001 | Blanchard |
| 2002/0025561 | A1 | 2/2002 | Hodgson |
| 2002/0045221 | A1 | 4/2002 | Dellinger et al. |
| 2002/0094533 | A1 | 7/2002 | Hess et al. |
| 2002/0095073 | A1 | 7/2002 | Jacobs et al. |
| 2002/0160536 | A1 | 10/2002 | Regnier et al. |
| 2002/0164824 | A1 | 11/2002 | Xiao et al. |
| 2003/0120035 | A1 | 6/2003 | Gao et al. |
| 2003/0171325 | A1 | 9/2003 | Gascoyne et al. |
| 2004/0087008 | A1 | 5/2004 | Schembri |
| 2004/0259146 | A1 | 12/2004 | Friend et al. |
| 2005/0137805 | A1 | 6/2005 | Lewin et al. |
| 2005/0227235 | A1 | 10/2005 | Carr et al. |
| 2006/0127920 | A1 | 6/2006 | Church et al. |
| 2007/0196834 | A1 | 8/2007 | Cerrina et al. |
| 2008/0085511 | A1 | 4/2008 | Peck et al. |
| 2008/0085514 | A1 | 4/2008 | Peck et al. |
| 2008/0108149 | A1 | 5/2008 | Sundararajan et al. |
| 2008/0227160 | A1 | 9/2008 | Kool |
| 2008/0287320 | A1 | 11/2008 | Baynes et al. |
| 2008/0300842 | A1 | 12/2008 | Govindarajan et al. |
| 2009/0062129 | A1 | 3/2009 | Mckernan et al. |
| 2009/0239759 | A1 | 9/2009 | Balch |
| 2009/0285825 | A1 | 11/2009 | Kini et al. |
| 2010/0004143 | A1 | 1/2010 | Shibahara |
| 2010/0099103 | A1 | 4/2010 | Hsieh et al. |
| 2010/0111768 | A1 | 5/2010 | Banerjee et al. |
| 2010/0216648 | A1 | 8/2010 | Staehler et al. |
| 2010/0311960 | A1 | 12/2010 | Dellinger |
| 2011/0172127 | A1 | 7/2011 | Jacobson et al. |
| 2011/0217738 | A1 | 9/2011 | Jacobson |
| 2012/0129704 | A1 | 5/2012 | Gunderson et al. |
| 2012/0164691 | A1 | 6/2012 | Eshoo et al. |
| 2012/0231968 | A1 | 9/2012 | Bruhn et al. |
| 2012/0264653 | A1 | 10/2012 | Carr et al. |
| 2013/0017642 | A1 | 1/2013 | Milgrew et al. |
| 2013/0017977 | A1 | 1/2013 | Oleinikov |
| 2013/0065017 | A1 | 3/2013 | Sieber |
| 2013/0109595 | A1 | 5/2013 | Routenberg |
| 2013/0109596 | A1 | 5/2013 | Peterson et al. |
| 2013/0130321 | A1 | 5/2013 | Staehler et al. |
| 2013/0165328 | A1 | 6/2013 | Previte et al. |
| 2014/0106394 | A1 | 4/2014 | Ko et al. |
| 2014/0178992 | A1 | 6/2014 | Nakashima et al. |
| 2015/0038373 | A1 | 2/2015 | Banyai et al. |
| 2015/0120265 | A1 | 4/2015 | Amirav-Drory et al. |
| 2015/0196917 | A1 | 7/2015 | Kay et al. |
| 2016/0089651 | A1 | 3/2016 | Banyai |
| 2016/0090592 | A1 | 3/2016 | Banyai et al. |
| 2016/0096160 | A1 | 4/2016 | Banyai et al. |
| 2016/0186166 | A1* | 6/2016 | Poehmerer ........ B01L 3/502761 204/600 |
| 2016/0251651 | A1 | 9/2016 | Banyai et al. |
| 2016/0303535 | A1 | 10/2016 | Banyai et al. |
| 2016/0333340 | A1 | 11/2016 | Wu |
| 2016/0339409 | A1 | 11/2016 | Banyai et al. |
| 2016/0340672 | A1 | 11/2016 | Banyai et al. |
| 2016/0354752 | A1 | 12/2016 | Banyai et al. |
| 2017/0095785 | A1 | 4/2017 | Banyai et al. |
| 2017/0159044 | A1 | 6/2017 | Toro et al. |
| 2017/0327819 | A1 | 11/2017 | Banyai et al. |
| 2017/0357752 | A1 | 12/2017 | Diggans |
| 2017/0362589 | A1 | 12/2017 | Banyai et al. |
| 2018/0029001 | A1 | 2/2018 | Banyai et al. |
| 2018/0104664 | A1 | 4/2018 | Fernandez |
| 2018/0142289 | A1 | 5/2018 | Zeitoun et al. |
| 2018/0253563 | A1 | 9/2018 | Peck et al. |
| 2018/0264428 | A1 | 9/2018 | Banyai et al. |
| 2018/0282721 | A1 | 10/2018 | Cox et al. |
| 2018/0326388 | A1 | 11/2018 | Banyai et al. |
| 2019/0244109 | A1* | 8/2019 | Bramlett .............. G06N 99/007 |
| 2019/0314783 | A1 | 10/2019 | Banyai et al. |
| 2019/0352635 | A1 | 11/2019 | Toro et al. |
| 2019/0366293 | A1 | 12/2019 | Banyai et al. |
| 2019/0366294 | A1 | 12/2019 | Banyai et al. |
| 2020/0017908 | A1 | 1/2020 | Milton et al. |
| 2020/0102611 | A1 | 4/2020 | Zeitoun et al. |
| 2020/0156037 | A1 | 5/2020 | Banyai et al. |
| 2020/0181667 | A1 | 6/2020 | Wu et al. |
| 2020/0222875 | A1 | 7/2020 | Peck et al. |
| 2020/0283760 | A1 | 9/2020 | Nugent et al. |
| 2020/0299322 | A1 | 9/2020 | Indermuhle et al. |
| 2020/0299684 | A1 | 9/2020 | Toro et al. |
| 2020/0330953 | A1 | 10/2020 | Banyai et al. |
| 2021/0002710 | A1 | 1/2021 | Gantt et al. |
| 2021/0040476 | A1 | 2/2021 | Cox et al. |
| 2021/0071168 | A1 | 3/2021 | Nugent et al. |
| 2021/0102192 | A1 | 4/2021 | Tabibiazar et al. |
| 2021/0102195 | A1 | 4/2021 | Sato et al. |
| 2021/0102198 | A1 | 4/2021 | Cox et al. |
| 2021/0115594 | A1 | 4/2021 | Cox et al. |
| 2021/0129108 | A1 | 5/2021 | Marsh et al. |
| 2021/0142182 | A1 | 5/2021 | Bramlett et al. |
| 2021/0170356 | A1 | 6/2021 | Peck et al. |
| 2021/0179724 | A1 | 6/2021 | Sato et al. |
| 2021/0180046 | A1 | 6/2021 | Cox et al. |
| 2021/0189082 | A1 | 6/2021 | Berti et al. |
| 2021/0207197 | A1 | 7/2021 | Gantt et al. |
| 2021/0231609 | A1 | 7/2021 | Gordon et al. |
| 2021/0332078 | A1 | 10/2021 | Wu |
| 2021/0348220 | A1 | 11/2021 | Zeitoun et al. |
| 2021/0355194 | A1 | 11/2021 | Sato et al. |
| 2021/0395344 | A1 | 12/2021 | Sato et al. |
| 2022/0032256 | A1 | 2/2022 | Lackey et al. |
| 2022/0064206 | A1* | 3/2022 | Fernandez ........... B01J 19/0046 |
| 2022/0064313 | A1 | 3/2022 | Sato et al. |
| 2022/0064628 | A1 | 3/2022 | Toro et al. |
| 2022/0106586 | A1 | 4/2022 | Nugent et al. |
| 2022/0106590 | A1 | 4/2022 | Arbiza et al. |
| 2022/0135690 | A1 | 5/2022 | Sato et al. |
| 2022/0135965 | A1 | 5/2022 | Gantt et al. |
| 2022/0138354 | A1 | 5/2022 | Peck |
| 2022/0145289 | A1 | 5/2022 | Lackey et al. |
| 2022/0206001 | A1 | 6/2022 | Sato |
| 2022/0243195 | A1 | 8/2022 | Nugent et al. |
| 2022/0246236 | A1 | 8/2022 | Amirav-Drory |
| 2022/0259319 | A1 | 8/2022 | Sato et al. |
| 2022/0259638 | A1 | 8/2022 | Brown |
| 2022/0277808 | A1 | 9/2022 | Arbiza et al. |
| 2022/0281989 | A1 | 9/2022 | Glanville |
| 2022/0307010 | A1 | 9/2022 | Sato et al. |
| 2022/0315971 | A1 | 10/2022 | Wu et al. |
| 2022/0323924 | A1 | 10/2022 | Lackey et al. |
| 2022/0325276 | A2 | 10/2022 | Banyai et al. |
| 2022/0325278 | A1 | 10/2022 | Nugent et al. |
| 2022/0348659 | A1 | 11/2022 | Sato et al. |
| 2022/0356463 | A1 | 11/2022 | Shen et al. |
| 2022/0356468 | A1 | 11/2022 | Sato et al. |
| 2022/0411784 | A1 | 12/2022 | Sato et al. |
| 2023/0002478 | A1 | 1/2023 | Sato et al. |

FOREIGN PATENT DOCUMENTS

| | | | |
|---|---|---|---|
| JP | H07505530 | A | 6/1995 |
| JP | 2001518086 | A | 10/2001 |
| JP | 2002538790 | A | 11/2002 |
| JP | 2004268394 | A | 9/2004 |
| JP | 2006503586 | A | 2/2006 |
| JP | 2007314746 | A | 12/2007 |

(56) References Cited

FOREIGN PATENT DOCUMENTS

| | | | |
|---|---|---|---|
| JP | 2008214343 | A | 9/2008 |
| JP | 2009294195 | A | 12/2009 |
| JP | 2012507513 | A | 3/2012 |
| JP | 2016527313 | A | 9/2016 |
| WO | WO-9320242 | A1 | 10/1993 |
| WO | WO-02072791 | A2 | 9/2002 |
| WO | WO-2004039953 | A2 | 5/2004 |
| WO | WO-2005059096 | A2 | 6/2005 |
| WO | WO-2008054543 | A2 | 5/2008 |
| WO | WO-2008063135 | A1 | 5/2008 |
| WO | WO-2010053443 | A1 | 5/2010 |
| WO | WO-2011109031 | A1 | 9/2011 |
| WO | WO-2012078312 | A2 | 6/2012 |
| WO | WO-2012154201 | A1 | 11/2012 |
| WO | WO-2014021938 | A1 | 2/2014 |
| WO | WO-2015021080 | A2 | 2/2015 |
| WO | 2020020608 | A1 | 1/2020 |
| WO | WO-2020010560 | A1 | 1/2020 |
| WO | WO-2022010934 | A2 | 1/2022 |
| WO | WO-2022076326 | A1 | 4/2022 |
| WO | WO-2022086866 | A1 | 4/2022 |
| WO | WO-2022087293 | A1 | 4/2022 |
| WO | WO-2022098662 | A2 | 5/2022 |
| WO | WO-2022159620 | A1 | 7/2022 |
| WO | WO-2022178137 | A1 | 8/2022 |
| WO | WO-2022204309 | A1 | 9/2022 |
| WO | WO-2022204316 | A2 | 9/2022 |
| WO | WO-2022217004 | A1 | 10/2022 |
| WO | WO-2022235579 | A1 | 11/2022 |
| WO | WO-2022235584 | A1 | 11/2022 |
| WO | WO-2022271884 | A2 | 12/2022 |

OTHER PUBLICATIONS

ATDBio. Solid-Phase Oligonucleotide Synthesis, Nucleic Acids Book, 20 pages, Published on Jul. 31, 2011. from: http://www.atdbio.com/content/17/Solid-phase-oligonucleotide-synthesis.

Berg: Biochemistry. 5th ED. New York (2002) 148-149.

Blanchard et al.: High-Density Oligonucleotide Arrays. Biosensors & Bioelectronics, 11(6/7):687-690 (1996).

Buermans et al.: Next Generation sequencing technology: Advances and applications, Biochimica et Biophysica Acta (BBA)—Molecular Basis of Disease, 1842:1931-1941 (2014).

Cheng et al.: High throughput parallel synthesis of oligonucleotides with 1536 channel synthesizer. Nucleic Acids Res. 30(18):e93 (2002).

Cleary et al.: Production of complex nucleic acid libraries using highly parallel in situ oligonucleotide synthesis. Nat Methods. 1(3):241-248 (2004).

Cohen et al.: Human population: The next half century. Science. 302:1172-1175 (2003).

Cruse et al.: Atlas of Immunology. Third Edition. Boca Raton:CRC Press (pp. 282-283) (2010).

Elsik et al.: The Genome sequence of taurine cattle: A window of ruminant biology and evolution. Science. 324:522-528 (2009).

Fodor et al.: Light-directed, spatially addressable parallel chemical synthesis. Science. 251(4995):767-773 (1991).

Gao et al.: A method for the generation of combinatorial antibody libraries using pIX phage display. PNAS 99(20):12612-12616 (2002).

GE Healthcare. AKTA oligopilot plus. Data File 18-114-66 ADC. 8 pages (2006).

GE Healthcare. Robust and cost-efficient oligonucleotide synthesis. Application Note 28-4058-08 AA. 4 pages (2005).

Gibson et al.: Creation of a Bacterial Cell Controlled by A Chemically Synthesized Genome. Science. 329(5989):52-56 (2010).

Hayakawa et al.: Allyloxycarbonyl group: a versatile blocking group for nucleotide synthesis. J. Org. Chem. 51(12):2400-2402 (1986).

Hudson: Matrix Assisted Synthetic Transformations: A Mosaic of Diverse Contributions. Journal of Combinatorial Chemistry. 1(6):403-457 (1999).

Kong et al.: Parallel gene synthesis in a microfluidic device. Nucleic Acids Res. 35(8):e61 (2007).

Kosuri and Church. Large-scale de novo DNA synthesis: technologies and applications. Nature Methods. 11:499-507 (2014) Available at: http://www.nature.com/nmeth/journal/v11/n5/full/nmeth.2918.html.

Kosuri et al.: A scalable gene synthesis by selective amplification of DNA pools from high-fidelity microchips. Nature Biotechnology. 28:1295-1299 (2010).

Kosuri et al.: A scalable gene synthesis platform using high-fidelity DNA microchips Nat.Biotechnol. 28(12):1295-1299 (2010).

Krayden, Inc.: A Guide to Silane Solutions. Silane coupling agents. 7 pages. Published on May 31, 2005 at: http://krayden.com/pdf/xia_silane_chemistry.pdf.

Lausted et al.: POSaM: a fast, flexible, open-source, inkjet oligonucleotide synthesizer and microarrayer. Genome Biology. 5:R58, 17 pages (2004) available at https://www.ncbi.nlm.nih.gov/pmc/articles/PMC507883/.

Lebl et al.: Economical Parallel Oligonucleotide and Peptide Synthesizer—Pet Oligator. Int. J. Peptide Res. Ther. 13(1-2):367-376 (2007).

Leproust et al.: Synthesis of high-quality libraries of long (150mer) oligonucleotides by a novel depurination controlled process. Nucleic Acids Research. 38(8):2522-2540 (2010).

Lewontin and Harti, Population genetics in forensic DNA typing. Science, 254:1745-1750, 1991.

Lindstrom et al.: An orthogonal oligonucleotide protecting group strategy that enables assembly of repetitive or highly structured DNAs. Nucleic Acids Research. 30(19):e101 (2002).

Ma et al.: DNA synthesis, assembly and application in synthetic biology. Current Opinion in Chemical Biology. 16:260-267 (2012).

Ma et al.: Versatile surface functionalization of cyclic olefin copolymer (COC) with sputtered SiO2 thin film for potential BioMEMS applications. Journal of Materials Chemistry. 11 pages (2009).

Mazor et al.: Isolation of Full-Length IgG Antibodies from Combinatorial Libraries Expressed in *Escherichia coli*; Antony S. Dimitrov (ed.), Therapeutic Antibodies: Methods and Protocols, vol. 525, Chapter 11, pp. 217-239 (2009).

McBride & Caruthers. An investigation of several deoxynucleoside phosphoramidites useful for synthesizing deoxyoligonucleotides. Tetrahedron Lett. 24:245-248 (1983).

Mitra et al.: In situ localized amplification and contact replication of many individual DNA molecules. Nucleic Acids Res. 27(24):e34 (1999).

Morin et al.: Profiling the HeLa S3 transcriptome using randomly primed cDNA and massively parallel short-read sequencing. Biotechniques. 45:81-94 (2008).

Opposition to European Patent No. 3030682 filed Mar. 3, 2021.

PCT/US2014/049834 International Preliminary Report on Patentability dated Feb. 18, 2016.

PCT/US2014/049834 International Search Report and Written Opinion mailed Mar. 19, 2015.

PCT/US2014/049834 Invitation to Pay Additional Fees mailed Jan. 5, 2015.

Pirrung. How to make a DNA chip. Angew. Chem. Int. Ed. 41:1276-1289 (2002).

Pray. Discovery of DNA Structure and Function: Watson and Crick. Nature Education.6 pages (2008) available at: http://www.nature.com/scitable/topicpage/discovery-of-dna-structure-and-function-watson-397.

Quan et al.: Parallel on-chip gene synthesis and application to optimization of protein expression. Nature Biotechnology. 29:449-452 (2011).

Rafalski and Morgante. Corn and humans: recombination and linkage disequilibrium in two genomes of similar size. Trends in Genetics. 20(2):103-111 (2004).

Rogozin et al.: Origin and evolution of spliceosomal introns. Biology Direct, 7:11 (2012).

Saaem et al.: In situ synthesis of DNA microarray on functionalized cyclic olefin copolymer substrate ACS Applied Materials & Interfaces. 2(2):491-497 (2010).

Sargolzaei et al.: Extent of linkage disequilibrium in Holstein cattle in North America. J.Dairy Science. 91:2106-2117 (2007).

(56) References Cited

OTHER PUBLICATIONS

Srivannavit et al.: Design and fabrication of microwell array chips for a solution-based, photogenerated acid-catalyzed parallel oligonucleotide DNA synthesis. Sensors and Actuators A. 116:150-160 (2004).
Steel. The Flow-Thru Chip A Three-dimensional biochip platform. In: Schena, Microarray Biochip Technology, Chapter 5, Natick, MA: Eaton Publishing, 2000, 33 pages.
Sun et al.: Preparation of N3-thymidine-butylene-N3-thymidine interstrand cross-linked DNA via an orthogonal deprotection strategy. Tetrahedron. 68(38):7787-7793 (2012).
Taylor et al.: Impact of surface chemistry and blocking strategies on DNA microarrays. Nucleic Acids Research, 31(16):e87 19 pages (2003).
Tian et al.: Accurate multiplex gene synthesis from programmable DNA microchips. Nature. 432(7020):1050-1054 (2004).
U.S. Appl. No. 14/452,429 Notice of Allowance dated Jun. 7, 2016.
U.S. Appl. No. 14/452,429 Office Action mailed Apr. 9, 2015.
U.S. Appl. No. 14/452,429 Office Action mailed Oct. 21, 2015.
U.S. Appl. No. 14/452,429 Restriction Requirement mailed Dec. 12, 2014.
U.S. Appl. No. 14/885,962 Notice of Allowance dated Nov. 8, 2017 and Sep. 29, 2017.
U.S. Appl. No. 14/885,962 Office Action dated Dec. 16, 2016.
U.S. Appl. No. 14/885,962 Office Action dated Sep. 8, 2016.
U.S. Appl. No. 14/885,962 Restriction Requirement dated Mar. 1, 2016.
U.S. Appl. No. 14/885,963 Notice of Allowance dated May 24, 2016.
U.S. Appl. No. 14/885,963 Office Action dated Feb. 5, 2016.
U.S. Appl. No. 14/885,965 Office Action dated Aug. 28, 2018.
U.S. Appl. No. 14/885,965 Office Action dated Aug. 30, 2017.
U.S. Appl. No. 14/885,965 Office Action dated Feb. 10, 2017.
U.S. Appl. No. 14/885,965 Office Action dated Feb. 18, 2016.
U.S. Appl. No. 14/885,965 Office Action dated Jan. 4, 2018.
U.S. Appl. No. 14/885,965 Office Action dated Jul. 7, 2016.
U.S. Appl. No. 15/187,714 Final Office Action dated Sep. 17, 2019.
U.S. Appl. No. 15/187,714 Office Action dated Apr. 4, 2019.
U.S. Appl. No. 15/187,714 Restriction Requirement dated Sep. 17, 2018.
U.S. Appl. No. 15/187,721 Notice of Allowance dated Dec. 7, 2016.
U.S. Appl. No. 15/187,721 Office Action dated Oct. 14, 2016.
U.S. Appl. No. 15/233,835 Notice of Allowance dated Oct. 4, 2017.
U.S. Appl. No. 15/233,835 Office Action dated Feb. 8, 2017.
U.S. Appl. No. 15/233,835 Office Action dated Jul. 26, 2017.
U.S. Appl. No. 15/233,835 Restriction Requirement dated Nov. 4, 2016.
U.S. Appl. No. 15/245,054 Notice of Allowance dated Dec. 14, 2017.
U.S. Appl. No. 15/245,054 Office Action dated Mar. 21, 2017.
U.S. Appl. No. 15/245,054 Office Action dated Oct. 19, 2016.
U.S. Appl. No. 15/377,547 Final Office Action dated Feb. 8, 2019.
U.S. Appl. No. 15/377,547 Office Action dated Jul. 27, 2018.
U.S. Appl. No. 15/377,547 Office Action dated Mar. 24, 2017.
U.S. Appl. No. 15/377,547 Office Action dated Nov. 30, 2017.
U.S. Appl. No. 15/602,991 Final Office Action dated Dec. 13, 2018.
U.S. Appl. No. 15/602,991 Notice of Allowance dated Oct. 25, 2017.
U.S. Appl. No. 15/602,991 Office Action dated May 31, 2018.
U.S. Appl. No. 15/602,991 Office Action dated May 31, 2019.
U.S. Appl. No. 15/602,991 Office Action dated Sep. 21, 2017.
U.S. Appl. No. 15/603,013 Final Office Action dated Nov. 6, 2019.
U.S. Appl. No. 15/603,013 Office Action dated Jan. 30, 2018.
U.S. Appl. No. 15/603,013 Office Action dated Jul. 10, 2018.
U.S. Appl. No. 15/603,013 Office Action dated Jun. 26, 2019.
U.S. Appl. No. 15/603,013 Office Action dated Oct. 20, 2017.
U.S. Appl. No. 15/729,564 Final Office Action dated Dec. 13, 2018.
U.S. Appl. No. 15/729,564 Office Action dated Jan. 8, 2018.
U.S. Appl. No. 15/729,564 Office Action dated Jun. 6, 2018.
U.S. Appl. No. 15/729,564 Office Action dated May 30, 2019.
U.S. Appl. No. 15/991,992 Office Action dated May 21, 2020.
U.S. Appl. No. 15/991,992 Restriction Requirement dated Mar. 10, 2020.
U.S. Appl. No. 16/039,256 Final Office Action dated Mar. 30, 2021.
U.S. Appl. No. 16/039,256 Office Action dated Aug. 20, 2020.
U.S. Appl. No. 16/039,256 Office Action dated May 10, 2022.
U.S. Appl. No. 16/039,256 Restriction Requirement dated May 18, 2020.
U.S. Appl. No. 16/409,608 Office Action dated Sep. 9, 2019.
U.S. Appl. No. 16/535,777 Final Office Action dated Oct. 20, 2020.
U.S. Appl. No. 16/535,777 Office Action dated Feb. 8, 2021.
U.S. Appl. No. 16/535,777 Office Action dated Jan. 23, 2020.
U.S. Appl. No. 16/535,779 First Action Interview dated Feb. 10, 2020.
U.S. Appl. No. 16/737,401 Final Office Action dated Jun. 13, 2022.
U.S. Appl. No. 16/737,401 Office Action dated Jan. 5, 2022.
U.S. Appl. No. 16/737,401 Restriction Requirement dated Nov. 15, 2021.
Van Tassell et al.: SNP discovery and allele frequency estimation by deep sequencing of reduced representation libraries. Nature Methods. 5:247-252 (2008).
Vitra: Solid-phase synthesis of base-sensitive oligonucleotides. ARKIVOC (iii) 54-83 http://www.arkat-usa.org/get-file/26185 (2009).
Xu et al.: Design of 240,000 orthogonal 25mer DNA barcode probes. PNAS. 106(7):2289-2294 (2009).

* cited by examiner

METHODS FOR POLYNUCLEOTIDE SYNTHESIS

CROSS-REFERENCE

This application claims the benefit of U.S. provisional patent application No. 63/274,397 filed on Nov. 1, 2021, which is incorporated by reference in its entirety.

BACKGROUND

Biomolecules (e.g., nucleic acids) have applications in research, medicine, and information storage. However, there is a need for high-density, scalable, automated, highly accurate and highly efficient systems for generating biomolecules.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF SUMMARY

Provided herein are methods of synthesizing a polynucleotide comprising: (a) contacting at least one nucleoside attached to a solid support with a protected nucleoside, wherein the protected nucleoside comprise a protecting group, wherein the protecting group comprises an alkene, and wherein the solid support comprises an addressable array; (b) contacting an amount of a reagent with the protected nucleoside, wherein the contacting results in deprotection of a terminal nucleoside of the protected nucleoside; and (c) repeating steps (a) and (b) to synthesize the polynucleotide. Further provided herein are methods wherein the amount of the reagent is less than about 15 mol % of the protected nucleoside. Further provided herein are methods wherein the amount of the reagent is less than about 5 mol % of the protected nucleoside. Further provided herein are methods wherein the protected nucleoside comprises a 5' or 3' protecting group. Further provided herein are methods wherein the protecting group comprises an allyl group. Further provided herein are methods wherein the protecting group comprises an O-allyl group. Further provided herein are methods wherein the reagent is a transition metal catalyst. Further provided herein are methods wherein the transition metal catalyst is in the zero oxidation state. Further provided herein are methods wherein the transition metal catalyst comprises a Pd(0) catalyst. Further provided herein are methods wherein the transition metal catalyst comprises one or more phosphine ligands. Further provided herein are methods wherein the transition metal catalyst comprises $Pd(Ph_3)_4$. Further provided herein are methods wherein the method further comprises contacting the protected nucleoside with a nucleophile. Further provided herein are methods wherein the nucleophile is a C-nucleophile. Further provided herein are methods wherein the nucleophile is N,N-dimethylbarbiturate. Further provided herein are methods wherein the reagent comprises a heteroaromatic group. Further provided herein are methods wherein the reagent is a tetrazine. Further provided herein are methods wherein the nucleophile comprises a phosphine. Further provided herein are methods wherein the nucleophile is $PPh_3$. Further provided herein are methods wherein the contacting the reagent with the protected nucleoside is for less than about 10 minutes. Further provided herein are methods wherein the contacting the reagent with the protected nucleoside is for less than about 5 minutes. Further provided herein are methods wherein the method further comprises capping. Further provided herein are methods wherein capping comprises treatment with acetyl chloride or acetic anhydride. Further provided herein are methods wherein the protected nucleoside comprises at least two alkenyl groups. Further provided herein are methods wherein deprotecting comprises removal of one or more alkenyl groups. Further provided herein are methods wherein the method comprises an oxidation step after step (c). Further provided herein are methods wherein the method comprises an oxidation step after step (b). Further provided herein are methods wherein the polynucleotide is 50-300 bases in length. Further provided herein are methods wherein the method further comprises applying a voltage to a solvent in fluid communication with the protected polynucleotide. Further provided herein are methods wherein the protected nucleoside comprises the formula:

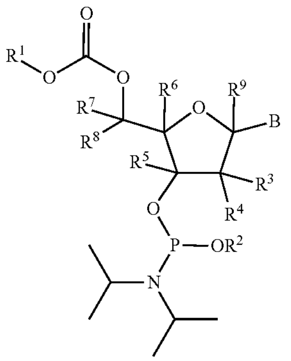

or

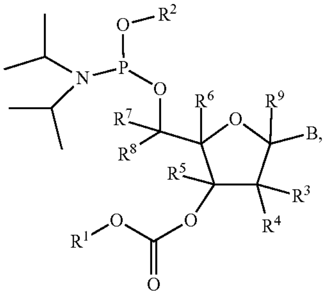

wherein:

$R^1$ is straight chain or branched chain alkenylene;

$R^2$ is alkylene or alkenylene, each of which is independently unsubstituted or substituted;

each $R^3$, $R^4$, $R^5$, $R^6$, $R^7$, $R^8$, or $R^9$ is independently H, OH, halogen, O-alkyl, N-alkyl, O-alkyl-O-alkyl, $N_3$, or $R^3$ and $R^6$ are taken together to form a ring;

and

B is a monocyclic or bicyclic $C_{4-6}$ heterocyclic ring. Further provided herein are methods wherein $R^1$ is straight chain alkenylene. Further provided herein are methods wherein $R^1$ is straight chain $C_{2-6}$alkenylene. Further provided herein are methods wherein $R^1$ is allyl. Further provided herein are methods wherein $R^1$ is branched chain alkenylene. Further provided herein are methods wherein $R^1$ is branched chain $C_{3-8}$alkenylene. Further provided herein are methods wherein $R^2$ is substituted alkylene. Further provided herein are methods wherein $R^2$ is substituted $C_{2-4}$alkylene. Further provided herein are methods wherein $R^2$ is cyanoethyl. Further provided herein are methods wherein $R^2$ is unsubstituted alkenylene. Further provided herein are methods wherein $R^2$ is unsubstituted $C_{2-4}$alkylene. Further provided herein are methods wherein $R^2$ is allyl. Further provided herein are methods wherein B is a monocyclic $C_4$ heterocyclic ring. Further provided herein are methods wherein B is a bicyclic $C_5$ heterocyclic ring. Further provided herein are methods wherein B is a nucleobase. Further provided herein are methods wherein at least three of $R^3$, $R^4$, $R^5$, $R^6$, $R^7$, $R^8$, and $R^9$ are H. Further provided herein are methods wherein $R^3$ is H and $R^4$ is OH. Further provided herein are methods wherein one or both of $R^3$ and $R^4$ is F. Further provided herein are methods wherein one or both of $R^3$ and $R^4$ is $—OCH_3$ or $—OCH_2CH_2OCH_3$. Further provided herein are methods wherein the protected nucleoside has the structure:

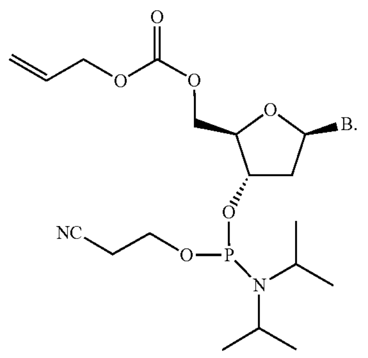

Further provided herein are methods wherein the protected nucleoside has the structure:

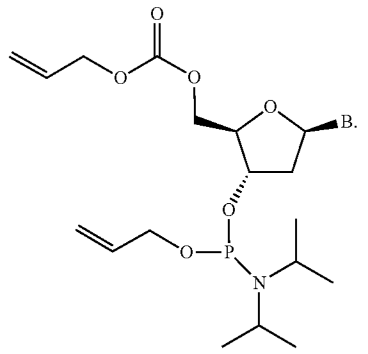

Provided herein are devices configured to perform the methods described herein. Further provided herein are devices wherein the addressable array comprises at least 1000 addressable loci for synthesis. Further provided herein are devices wherein the addressable array comprises a pitch distance of 10-200 nm.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
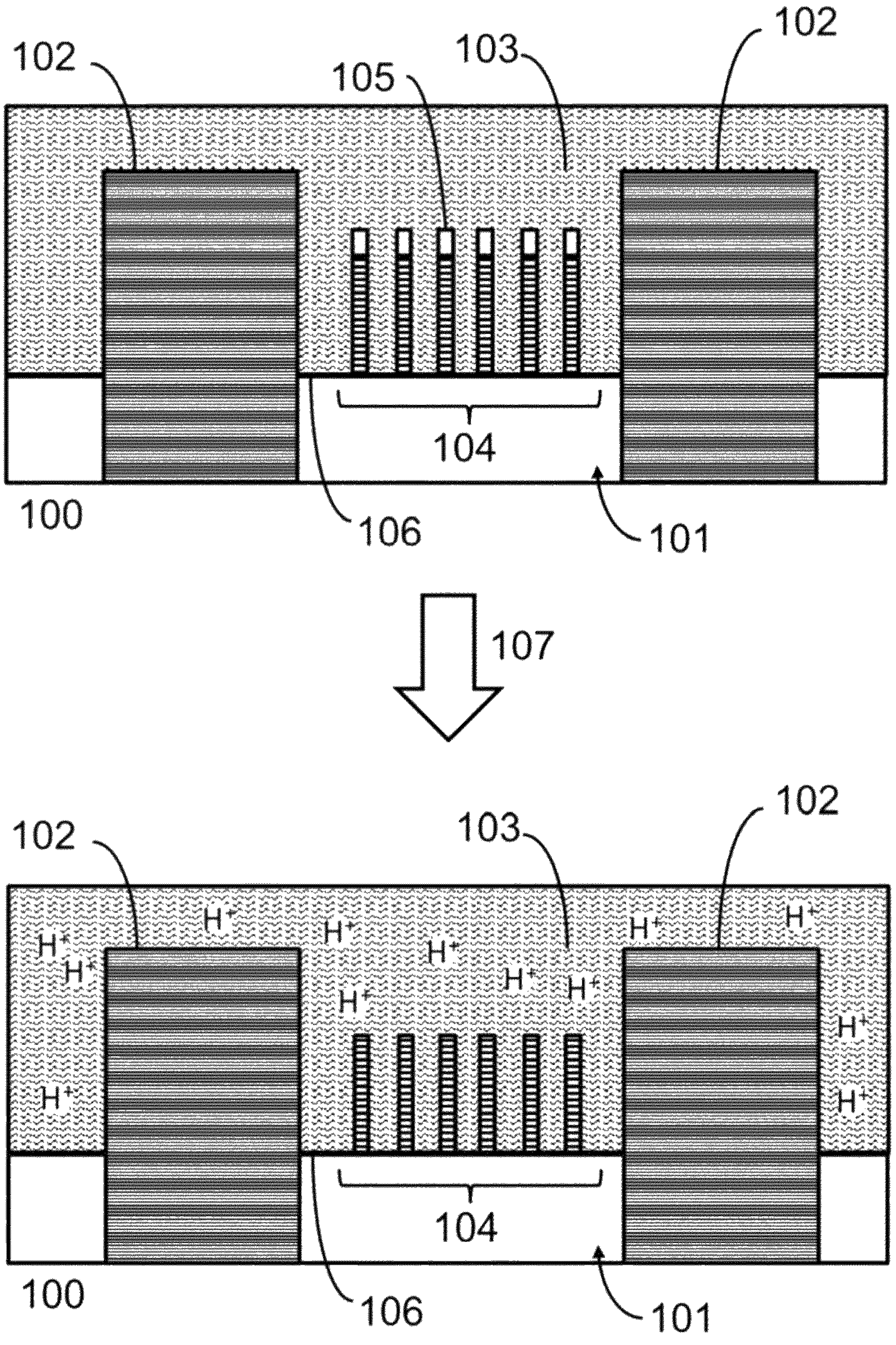
FIG. 1 illustrates an exemplary device for nucleic acid-based data storage configured to deblock polynucleotides with electrochemically generated acid according to some embodiments.

There is a need for higher density synthesis systems, such as those capable of synthesizing large, diverse libraries of biomolecules (e.g., nucleic acids). In some instances, nucleic acids libraries are useful for gene assembly, antibody design, next generation sequencing capture/enrichment, and data storage. In the case of data storage, there is a need for larger capacity storage systems as the amount of information generated and stored is increasing exponentially. Provided herein are methods to increase biomolecule synthesis throughput using efficient and simplified deprotection and oxidation chemistry.

Definitions

Unless defined otherwise, all technical and scientific terms used herein have the same meaning as is commonly understood by one of ordinary skill in the art to which these inventions belong.

Throughout this disclosure, numerical features are presented in a range format. It should be understood that the description in range format is merely for convenience and brevity and should not be construed as an inflexible limitation on the scope of any embodiments. Accordingly, the description of a range should be considered to have specifically disclosed all the possible subranges as well as individual numerical values within that range to the tenth of the unit of the lower limit unless the context clearly dictates otherwise. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual values within that range, for example, 1.1, 2, 2.3, 5, and 5.9. This applies regardless of the breadth of the range. The upper and lower limits of these intervening ranges may independently be included in the smaller ranges, and are also encompassed within the invention, subject to any specifically excluded limit in the stated range. Where the stated range includes one or both of the limits, ranges excluding either or both of those included limits are also included in the invention, unless the context clearly dictates otherwise.

The terminology used herein is for the purpose of describing particular embodiments only and is not intended to be limiting of any embodiment. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" in reference to a number or range of numbers is understood to mean the stated number and numbers +/−10% thereof, or 10% below the lower listed limit and 10% above the higher listed limit for the values listed for a range.

As used herein, the terms "preselected sequence", "predefined sequence" or "predetermined sequence" are used interchangeably. The terms mean that the sequence of the polymer is known and chosen before synthesis or assembly of the polymer. In particular, various aspects are described herein primarily with regard to the preparation of nucleic acids molecules, the sequence of the polynucleotide being known and chosen before the synthesis or assembly of the nucleic acid molecules.

As used herein, the term "symbol," generally refers to a representation of a unit of digital information. Digital information may be divided or translated into one or more symbols. In an example, a symbol may be a bit and the bit may have a numerical value. In some examples, a symbol may have a value of '0' or '1'. In some examples, digital information may be represented as a sequence of symbols or a string of symbols. In some examples, the sequence of symbols or the string of symbols may comprise binary data.

Provided herein are methods and compositions for production of synthetic (e.g. de novo synthesized or chemically synthesized) polynucleotides. Polynucleotides may also be referred to as oligonucleotides or oligos. Polynucleotide sequences described herein may be, unless stated otherwise, comprise DNA or RNA.

"Amino" refers to the $—NH_2$ radical.

"Cyano" refers to the —CN radical.

"Nitro" refers to the $—NO_2$ radical.

"Oxa" refers to the —O— radical.

"Oxo" refers to the =O radical.

"Thioxo" refers to the =S radical.

"Imino" refers to the =N—H radical.

"Oximo" refers to the =N—OH radical.

"Hydrazino" refers to the $=N—NH_2$ radical.

"Alkyl" refers to a straight or branched hydrocarbon chain radical consisting solely of carbon and hydrogen atoms, containing no unsaturation, having from one to fifteen carbon atoms (e.g., $C_1$-$C_{15}$ alkyl). In certain embodiments, an alkyl comprises one to thirteen carbon atoms (e.g., $C_1$-$C_{13}$ alkyl). In certain embodiments, an alkyl comprises one to eight carbon atoms (e.g., $C_1$-$C_8$ alkyl). In other embodiments, an alkyl comprises one to five carbon atoms (e.g., $C_1$-$C_5$ alkyl). In other embodiments, an alkyl comprises one to four carbon atoms (e.g., $C_1$-$C_4$ alkyl). In other embodiments, an alkyl comprises one to three carbon atoms (e.g., $C_1$-$C_3$ alkyl). In other embodiments, an alkyl comprises one to two carbon atoms (e.g., $C_1$-$C_2$ alkyl). In other embodiments, an alkyl comprises one carbon atom (e.g., $C_1$ alkyl). In other embodiments, an alkyl comprises five to fifteen carbon atoms (e.g., $C_5$-$C_{15}$ alkyl). In other embodiments, an alkyl comprises five to eight carbon atoms (e.g., $C_5$-$C_8$ alkyl). In other embodiments, an alkyl comprises two to five carbon atoms (e.g., $C_2$-$C_5$ alkyl). In other embodiments, an alkyl comprises three to five carbon atoms (e.g., $C_3$-$C_5$ alkyl). In other embodiments, the alkyl group is selected from methyl, ethyl, 1-propyl (n-propyl), 1-methylethyl (iso-propyl), 1-butyl (n-butyl), 1-methylpropyl (sec-butyl), 2-methylpropyl (iso-butyl), 1,1-dimethylethyl (tent-butyl), 1-pentyl (n-pentyl). The alkyl is attached to the rest of the molecule by a single bond. Unless stated otherwise specifically in the specification, an alkyl group is optionally substituted by one or more of the following substituents: halo, cyano, nitro, oxo, thioxo, imino, oximo, trimethylsilanyl, $—OR^a$, $—SR^a$, $—OC(O)—R^a$, $—N(R^a)_2$, $—C(O)R^a$, $—C(O)OR^a$, $—C(O)N(R^a)_2$, $—N(R^a)C(O)OR^a$, $—OC(O)—N(R^a)_2$, $—N(R^a)C(O)R^a$, $—N(R^a)S(O)_tR^a$ (where t is 1 or 2), $—S(O)_tOR^a$ (where t is 1 or 2), $—S(O)_tR^a$ (where t is 1 or 2) and $—S(O)_tN(R^a)_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkoxy" refers to a radical bonded through an oxygen atom of the formula —O-alkyl, where alkyl is an alkyl chain as defined above.

"Alkenyl" refers to a straight or branched hydrocarbon chain radical group consisting solely of carbon and hydrogen atoms, containing at least one carbon-carbon double bond, and having from two to twelve carbon atoms. In certain embodiments, an alkenyl comprises two to eight carbon atoms. In other embodiments, an alkenyl comprises two to four carbon atoms. The alkenyl is attached to the rest of the molecule by a single bond, for example, ethenyl (i.e., vinyl), prop-1-enyl (i.e., allyl), but-1-enyl, pent-1-enyl, penta-1,4-dienyl, and the like. Unless stated otherwise specifically in the specification, an alkenyl group is optionally substituted by one or more of the following substituents: halo, cyano, nitro, oxo, thioxo, imino, oximo, trimethylsilanyl, $—OR^a$, $—SR^a$, $—OC(O)—R^a$, $—N(R^a)_2$, $—C(O)R^a$, $—C(O)OR^a$, $—C(O)N(R^a)_2$, $—N(R^a)C(O)OR^a$, $—OC(O)—N(R^a)_2$, $—N(R^a)C(O)R^a$, $—N(R^a)S(O)_tR^a$ (where t is 1 or 2), $—S(O)_tOR^a$ (where t is 1 or 2), $—S(O)_tR^a$ (where t is 1 or 2) and $—S(O)_tN(R^a)_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkynyl" refers to a straight or branched hydrocarbon chain radical group consisting solely of carbon and hydrogen atoms, containing at least one carbon-carbon triple bond, having from two to twelve carbon atoms. In certain embodiments, an alkynyl comprises two to eight carbon atoms. In other embodiments, an alkynyl comprises two to six carbon atoms. In other embodiments, an alkynyl comprises two to four carbon atoms. The alkynyl is attached to the rest of the molecule by a single bond, for example, ethynyl, propynyl, butynyl, pentynyl, hexynyl, and the like. Unless stated otherwise specifically in the specification, an alkynyl group is optionally substituted by one or more of the following substituents: halo, cyano, nitro, oxo, thioxo, imino, oximo, trimethylsilanyl, —$OR^a$, —$SR^a$, —OC(O)—$R^a$, —$N(R^a)_2$, —C(O)$R^a$, —C(O)$OR^a$, —C(O)$N(R^a)_2$, —$N(R^a)$C(O)$OR^a$, —OC(O)—$N(R^a)_2$, —$N(R^a)$C(O)$R^a$, —$N(R^a)S(O)_tR^a$ (where t is 1 or 2), —$S(O)_tOR^a$ (where t is 1 or 2), —$S(O)_tR^a$ (where t is 1 or 2) and —$S(O)_tN(R^a)_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkylene" or "alkylene chain" refers to a straight or branched divalent hydrocarbon chain linking the rest of the molecule to a radical group, consisting solely of carbon and hydrogen, containing no unsaturation and having from one to twelve carbon atoms, for example, methylene, ethylene, propylene, n-butylene, and the like. The alkylene chain is attached to the rest of the molecule through a single bond and to the radical group through a single bond. The points of attachment of the alkylene chain to the rest of the molecule and to the radical group are through one carbon in the alkylene chain or through any two carbons within the chain. In certain embodiments, an alkylene comprises one to eight carbon atoms (e.g., $C_1$-$C_8$ alkylene). In other embodiments, an alkylene comprises one to five carbon atoms (e.g., $C_1$-$C_5$ alkylene). In other embodiments, an alkylene comprises one to four carbon atoms (e.g., $C_1$-$C_4$ alkylene). In other embodiments, an alkylene comprises one to three carbon atoms (e.g., $C_1$-$C_3$ alkylene). In other embodiments, an alkylene comprises one to two carbon atoms (e.g., $C_1$-$C_2$ alkylene). In other embodiments, an alkylene comprises one carbon atom (e.g., $C_1$ alkylene). In other embodiments, an alkylene comprises five to eight carbon atoms (e.g., $C_5$-$C_8$ alkylene). In other embodiments, an alkylene comprises two to five carbon atoms (e.g., $C_2$-$C_5$ alkylene). In other embodiments, an alkylene comprises three to five carbon atoms (e.g., $C_3$-$C_5$ alkylene). Unless stated otherwise specifically in the specification, an alkylene chain is optionally substituted by one or more of the following substituents: halo, cyano, nitro, oxo, thioxo, imino, oximo, trimethylsilanyl, —$OR^a$, —$SR^a$, —OC(O)—$R^a$, —$N(R^a)_2$, —C(O)$R^a$, —C(O)$OR^a$, —C(O)$N(R^a)_2$, —$N(R^a)$C(O)$OR^a$, —OC(O)—$N(R^a)_2$, —$N(R^a)$C(O)$R^a$, —$N(R^a)S(O)_tR^a$ (where t is 1 or 2), —$S(O)_tOR^a$ (where t is 1 or 2), —$S(O)_tR^a$ (where t is 1 or 2) and —$S(O)_tN(R^a)_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Aryl" refers to a radical derived from an aromatic monocyclic or multicyclic hydrocarbon ring system by removing a hydrogen atom from a ring carbon atom. The aromatic monocyclic or multicyclic hydrocarbon ring system contains only hydrogen and carbon from five to eighteen carbon atoms, where at least one of the rings in the ring system is fully unsaturated, i.e., it contains a cyclic, delocalized (4n+2) π-electron system in accordance with the Hilckel theory. The ring system from which aryl groups are derived include, but are not limited to, groups such as benzene, fluorene, indane, indene, tetralin and naphthalene. Unless stated otherwise specifically in the specification, the term "aryl" or the prefix "ar-" (such as in "aralkyl") is meant to include aryl radicals optionally substituted by one or more substituents independently selected from alkyl, alkenyl, alkynyl, halo, fluoroalkyl, cyano, nitro, optionally substituted aryl, optionally substituted aralkyl, optionally substituted aralkenyl, optionally substituted aralkynyl, optionally substituted carbocyclyl, optionally substituted carbocyclylalkyl, optionally substituted heterocyclyl, optionally substituted heterocyclylalkyl, optionally substituted heteroaryl, optionally substituted heteroarylalkyl, —$R^b$—$OR^a$, —$R^b$—OC(O)—$R^a$, —$R^b$—OC(O)—$OR^a$, —$R^b$—OC(O)—$N(R^a)_2$, —$R^b$—$N(R^a)_2$, —$R^b$—C(O)$R^a$, —$R^b$—C(O)$OR^a$, —$R^b$—C(O)$N(R^a)_2$, —$R^b$—O—$R^c$—C(O)$N(R^a)_2$, —$R^b$—$N(R^a)$C(O)$OR^a$, —$R^b$—$N(R^a)$C(O)$R^a$, —$R^b$—$N(R^a)S(O)_tR^a$ (where t is 1 or 2), —$R^b$—$S(O)_tR^a$ (where t is 1 or 2), —$R^b$—$S(O)_tOR^a$ (where t is 1 or 2) and —$R^b$—$S(O)_tN(R^a)_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the above substituents is unsubstituted unless otherwise indicated.

"Aralkyl" refers to a radical of the formula —$R^c$-aryl where $R^c$ is an alkylene chain as defined above, for example, methylene, ethylene, and the like. The alkylene chain part of the aralkyl radical is optionally substituted as described above for an alkylene chain. The aryl part of the aralkyl radical is optionally substituted as described above for an aryl group.

"Carbocyclyl" or "cycloalkyl" refers to a stable non-aromatic monocyclic or polycyclic hydrocarbon radical consisting solely of carbon and hydrogen atoms, which includes fused or bridged ring systems, having from three to fifteen carbon atoms. In certain embodiments, a carbocyclyl comprises three to ten carbon atoms. In other embodiments, a carbocyclyl comprises five to seven carbon atoms. The carbocyclyl is attached to the rest of the molecule by a single bond. Carbocyclyl is saturated (i.e., containing single C—C bonds only) or unsaturated (i.e., containing one or more double bonds or triple bonds). A fully saturated carbocyclyl radical is also referred to as "cycloalkyl." Examples of monocyclic cycloalkyls include, e.g., cyclopropyl, cyclobutyl, cyclopentyl, cyclohexyl, cycloheptyl, and cyclooctyl. An unsaturated carbocyclyl is also referred to as "cycloalkenyl." Examples of monocyclic cycloalkenyls include, e.g., cyclopentenyl, cyclohexenyl, cycloheptenyl, and cyclooctenyl. Polycyclic carbocyclyl radicals include, for example, adamantyl, norbornyl (i.e., bicyclo[2.2.1]heptanyl), norbornenyl, decalinyl, 7,7-dimethyl-bicyclo[2.2.1]heptanyl, and the like. Unless otherwise stated specifically in the specification, the term "carbocyclyl" is meant to include carbocyclyl radicals that are optionally substituted by one or more substituents independently selected from alkyl, alkenyl, alkynyl, halo, fluoroalkyl, oxo, thioxo, cyano, nitro, optionally substituted aryl, optionally substituted aralkyl, optionally substituted aralkenyl, optionally substituted aralkynyl, optionally substituted carbocyclyl, optionally substituted carbocyclylalkyl, optionally substituted heterocyclyl, optionally substituted heterocyclylalkyl, optionally substituted heteroaryl, optionally substituted heteroarylalkyl, —$R^b$—$OR^a$, —$R^b$—OC(O)—$R^a$, —$R^b$—OC(O)—$OR^a$, —$R^b$—OC(O)—$N(R^a)_2$, —$R^b$—$N(R^a)_2$, —$R^b$—C(O)$R^a$, —$R^b$—C(O)$OR^a$, —$R^b$—C(O)$N(R^a)_2$, —$R^b$—O—$R^c$—C(O)$N(R^a)_2$, —$R^b$—$N(R^a)$C(O)$OR^a$, —$R^b$—$N(R^a)$C(O)$R^a$, —$R^b$—$N(R^a)S(O)_tR^a$ (where t is 1 or 2), —$R^b$—$S(O)_tR^a$ (where t is 1 or 2), —$R^b$—$S(O)_tOR^a$ (where t is 1 or 2) and —$R^b$—$S(O)_tN(R^a)_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the above substituents is unsubstituted unless otherwise indicated.

"Carbocyclylalkyl" refers to a radical of the formula —$R^c$-carbocyclyl where $R^c$ is an alkylene chain as defined above. The alkylene chain and the carbocyclyl radical are optionally substituted as defined above.

"Halo" or "halogen" refers to bromo, chloro, fluoro or iodo substituents.

"Fluoroalkyl" refers to an alkyl radical, as defined above, that is substituted by one or more fluoro radicals, as defined above, for example, trifluoromethyl, difluoromethyl, fluoromethyl, 2,2,2-trifluoroethyl, 1-fluoromethyl-2-fluoroethyl, and the like. In some embodiments, the alkyl part of the fluoroalkyl radical is optionally substituted as defined above for an alkyl group.

"Heterocyclyl" or "heterocycloalkyl" refers to a stable 3- to 18-membered non-aromatic ring radical that comprises two to twelve carbon atoms and from one to six heteroatoms selected from nitrogen, oxygen and sulfur. Unless stated otherwise specifically in the specification, the heterocyclyl radical is a monocyclic, bicyclic, tricyclic or tetracyclic ring system, which optionally includes fused or bridged ring systems. The heteroatoms in the heterocyclyl radical are optionally oxidized. One or more nitrogen atoms, if present, are optionally quaternized. The heterocyclyl radical is partially or fully saturated. The heterocyclyl is attached to the rest of the molecule through any atom of the ring(s). Examples of such heterocyclyl radicals include, but are not limited to, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, and 1,1-dioxo-thiomorpholinyl. Unless stated otherwise specifically in the specification, the term "heterocyclyl" is meant to include heterocyclyl radicals as defined above that are optionally substituted by one or more substituents selected from alkyl, alkenyl, alkynyl, halo, fluoroalkyl, thioxo, cyano, nitro, optionally substituted aryl, optionally substituted aralkyl, optionally substituted aralkenyl, optionally substituted aralkynyl, optionally substituted carbocyclyl, optionally substituted carbocyclylalkyl, optionally substituted heterocyclyl, optionally substituted heterocyclylalkyl, optionally substituted heteroaryl, optionally substituted heteroarylalkyl, —$R^b$—$OR^a$, —$R^b$—OC(O)—$R^a$, —$R^b$—OC(O)—$OR^a$, —$R^b$—OC(O)—$N(R^a)_2$, —$R^b$—$N(R^a)_2$, —$R^b$—C(O)$R^a$, —$R^b$—C(O)$OR^a$, —$R^b$—C(O)$N(R^a)_2$, —$R^b$—O—$R^c$—C(O)$N(R^a)_2$, —$R^b$—$N(R^a)$C(O)$OR^a$, —$R^b$—$N(R^a)$C(O)$R^a$, —$R^b$—$N(R^a)S(O)_tR^a$ (where t is 1 or 2), —$R^b$—$S(O)_tR^a$ (where t is 1 or 2), —$R^b$—$S(O)_tOR^a$ (where t is 1 or 2) and —$R^b$—$S(O)_tN(R^a)_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the above substituents is unsubstituted unless otherwise indicated.

"N-heterocyclyl" or "N-attached heterocyclyl" refers to a heterocyclyl radical as defined above containing at least one nitrogen and where the point of attachment of the heterocyclyl radical to the rest of the molecule is through a nitrogen atom in the heterocyclyl radical. An N-heterocyclyl radical is optionally substituted as described above for heterocyclyl radicals. Examples of such N-heterocyclyl radicals include, but are not limited to, 1-morpholinyl, 1-piperidinyl, 1-piperazinyl, 1-pyrrolidinyl, pyrazolidinyl, imidazolinyl, and imidazolidinyl.

"C-heterocyclyl" or "C-attached heterocyclyl" refers to a heterocyclyl radical as defined above containing at least one heteroatom and where the point of attachment of the heterocyclyl radical to the rest of the molecule is through a carbon atom in the heterocyclyl radical. A C-heterocyclyl radical is optionally substituted as described above for heterocyclyl radicals. Examples of such C-heterocyclyl radicals include, but are not limited to, 2-morpholinyl, 2- or 3- or 4-piperidinyl, 2-piperazinyl, 2- or 3-pyrrolidinyl, and the like.

"Heteroaryl" refers to a radical derived from a 3- to 18-membered aromatic ring radical that comprises two to seventeen carbon atoms and from one to six heteroatoms selected from nitrogen, oxygen and sulfur. As used herein, the heteroaryl radical is a monocyclic, bicyclic, tricyclic or tetracyclic ring system, wherein at least one of the rings in the ring system is fully unsaturated, i.e., it contains a cyclic, delocalized (4n+2) π-electron system in accordance with the Hückel theory. Heteroaryl includes fused or bridged ring systems. The heteroatom(s) in the heteroaryl radical is optionally oxidized. One or more nitrogen atoms, if present, are optionally quaternized. The heteroaryl is attached to the rest of the molecule through any atom of the ring(s). Examples of heteroaryls include, but are not limited to, azepinyl, acridinyl, benzimidazolyl, benzindolyl, 1,3-benzodioxolyl, benzofuranyl, benzooxazolyl, benzo[d]thiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8-methano-5,6,7,8-tetrahydroquinazolinyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, triazolyl, tetrazolyl, triazinyl, thieno[2,3-d]pyrimidinyl, thieno[3,2-d]pyrimidinyl, thieno[2,3-c]pyridinyl, and thiophenyl (i.e. thienyl). Unless stated otherwise specifically in the specification, the term "heteroaryl" is meant to include heteroaryl radicals as defined above which are optionally substituted by one or more substituents selected from alkyl, alkenyl, alkynyl, halo, fluoroalkyl, haloalkenyl, haloalkynyl, oxo, thioxo, cyano, nitro, optionally substituted aryl, optionally substituted aralkyl, optionally substituted aralkenyl, optionally substituted aralkynyl, optionally substituted carbocyclyl, optionally substituted carbocyclylalkyl, optionally substituted heterocyclyl, optionally substituted heterocyclylalkyl, optionally substituted heteroaryl, optionally substituted heteroarylalkyl, $-R^b-OR^a$, $-R^b-OC(O)-R^a$, $-R^b-OC(O)-OR^a$, $-R^b-OC(O)-N(R^a)_2$, $-R^b-N(R^a)_2$, $-R^b-C(O)R^a$, $-R^b-C(O)OR^a$, $-R^b-C(O)N(R^a)_2$, $-R^b-O-R^c-C(O)N(R^a)_2$, $-R^b-N(R^a)C(O)OR^a$, $-R^b-N(R^a)C(O)R^a$, $-R^b-N(R^a)S(O)_tR^a$ (where t is 1 or 2), $-R^b-S(O)_tR^a$ (where t is 1 or 2), $-R^b-S(O)_tOR^a$ (where t is 1 or 2) and $-R^b-S(O)_tN(R^a)_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the above substituents is unsubstituted unless otherwise indicated.

"N-heteroaryl" refers to a heteroaryl radical as defined above containing at least one nitrogen and where the point of attachment of the heteroaryl radical to the rest of the molecule is through a nitrogen atom in the heteroaryl radical. An N-heteroaryl radical is optionally substituted as described above for heteroaryl radicals.

"C-heteroaryl" refers to a heteroaryl radical as defined above and where the point of attachment of the heteroaryl radical to the rest of the molecule is through a carbon atom in the heteroaryl radical. A C-heteroaryl radical is optionally substituted as described above for heteroaryl radicals.

The compounds disclosed herein, in some embodiments, contain one or more asymmetric centers and thus give rise to enantiomers, diastereomers, and other stereoisomeric forms that are defined, in terms of absolute stereochemistry, as (R)- or (S)-. Unless stated otherwise, it is intended that all stereoisomeric forms of the compounds disclosed herein are contemplated by this disclosure. When the compounds described herein contain alkene double bonds, and unless specified otherwise, it is intended that this disclosure includes both E and Z geometric isomers (e.g., cis or trans.) Likewise, all possible isomers, as well as their racemic and optically pure forms, and all tautomeric forms are also intended to be included. The term "geometric isomer" refers to E or Z geometric isomers (e.g., cis or trans) of an alkene double bond. The term "positional isomer" refers to structural isomers around a central ring, such as ortho-, meta-, and para-isomers around a benzene ring.

Provided herein are methods and compositions for production of synthetic (e.g. de novo synthesized, enzymatically synthesized, chemically synthesized) biomolecules. In some instances, biomolecules are synthesized in a template-independent manner. In some instances, biomolecules comprise polynucleotides. Polynucleotides may also be referred to as oligonucleotides or oligos. Polynucleotide sequences described herein may be, unless stated otherwise, comprise DNA or RNA. In some instances, biomolecules comprise polymers which comprise two or more monomers. Biomolecules in some instances refer to polymers such as nucleic acids (e.g., DNA, RNA), carbohydrates (e.g., sugars), peptides/proteins, lipids, fatty acids, terpenes, peptoids, or mixture thereof. In some instances, biomolecules may be synthesized in an iterative fashion using methods well-known in the art (with or without protecting groups). In some instances, biomolecules may be synthesized in an iterative fashion from monomers, dimers, trimers, or other appropriate building block.

Biomolecule Synthesis

Provided herein are systems and methods for synthesis of a high density of biomolecules (e.g., polynucleotides) on a substrate in a short amount of time and with low error rates. In some instances, methods comprise use of electrochemical deprotection. In some instances, electrochemical deprotection is facilitated by use of a transition metal catalyst. In some instances, site-specific deprotection is accomplished using addressable arrays.

Provided herein are methods of synthesizing a polynucleotide. The polynucleotide may be synthesized by contacting at least one nucleoside attached to a solid support with a protected nucleoside. In some instances, the protected nucleoside comprises a protecting group. In some instances, the protecting group comprises an alkene. In some instances, the solid support comprises an addressable array. In some instances, the method can comprise contacting an amount of a reagent with the protected nucleoside. In some instances, the contacting results in deprotection of a terminal nucleoside of the protected nucleoside. In some instances, one or more steps provided herein may be repeated to synthesize the polynucleotide. In some instances, a method provided herein comprises one or more steps of (a) contacting at least one nucleoside attached to a solid support with a protected nucleoside, (b) contacting an amount of a reagent with the protected nucleoside, and (c) repeating steps (a) and (b) to synthesize the polynucleotide. In some instances reagents are used to deprotect nucleotides, oxidize a phosphate backbone, perform a capping reaction, facilitate coupling of a nucleotide monomer, or perform other reactions. In some instances, a reagent comprises an enzyme. In some instances, the enzyme comprises a polymerase.

Figure 13:
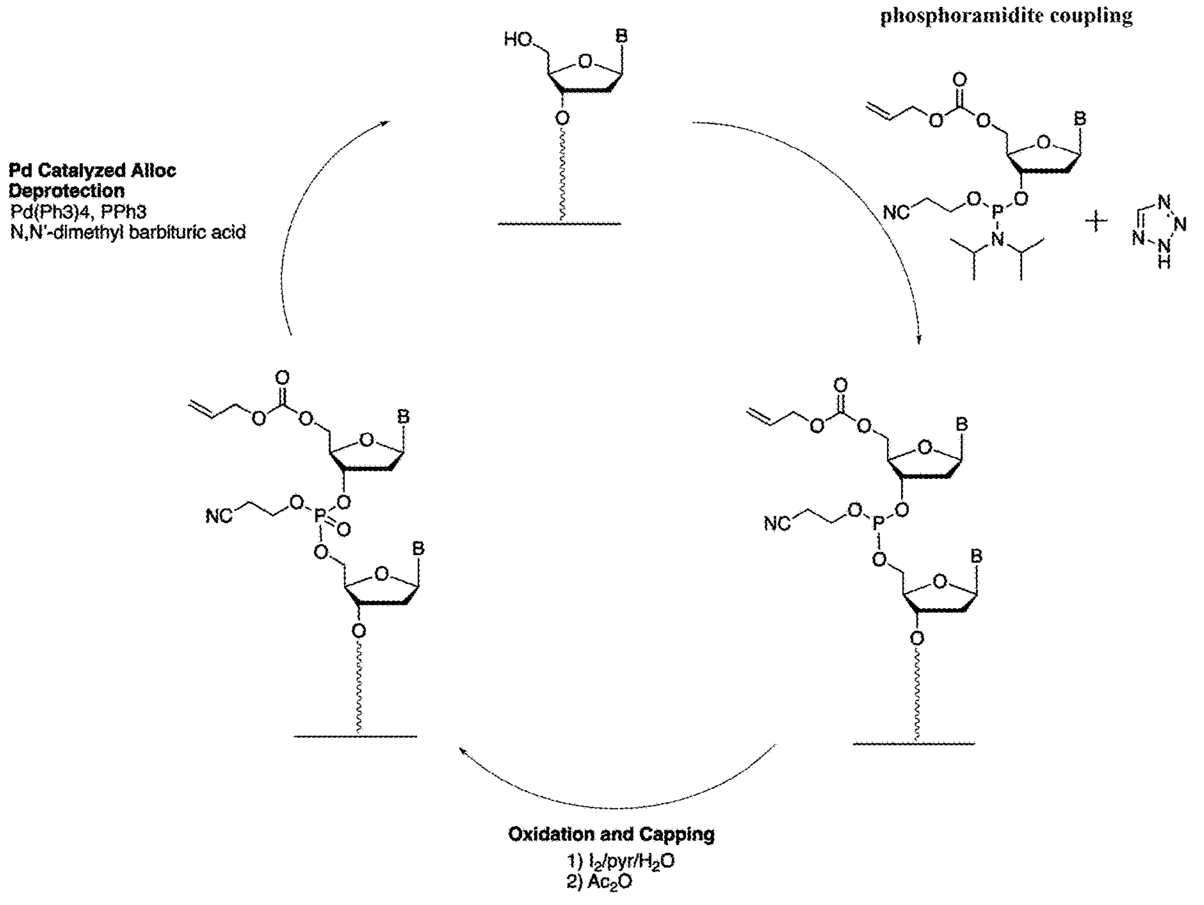
FIG. 13 illustrates the chemical synthesis of DNA using 5'-alloc DNA phosphoramidite monomers according to some embodiments. Steps are labeled: upper right: phosphoramidite coupling; bottom: Oxidation and Capping 1) $I_2$/pyr/$H_2O$ 2) $Ac_2O$; upper left: Pd catalyzed Alloc Deprotection $Pd(PPh_3)_4$, $PPh_3$, N,N'dimethyl barbituric acid.
Figure 15:
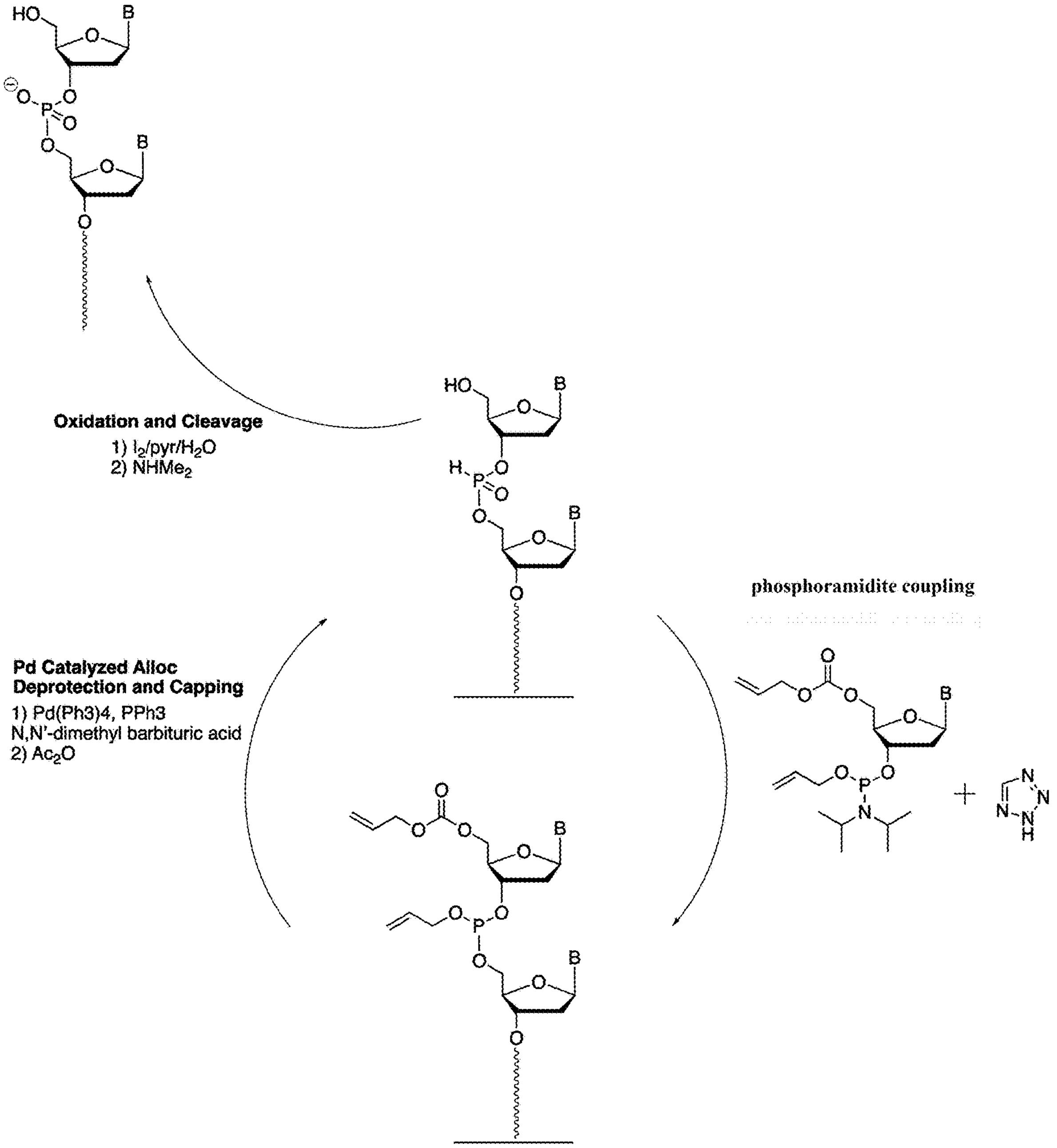
FIG. 15 illustrates the chemical synthesis of DNA using P—O-alloc protecting groups according to some embodiments. The steps are labeled: right: phosphoramidite coupling; left: 1) Pd catalyzed Alloc deprotection and capping $Pd(PPh_3)_4$, $PPh_3$, N,N'dimethyl barbituric acid 2) $Ac_2O$; upper left: : Oxidation and Cleavage 1) $I_2$/pyr/$H_2O$ 2) $NHMe_2$.

Described herein are methods, systems, devices, and compositions where chemical reactions used in polynucleotide synthesis are controlled using electrochemistry. Electrochemical reactions in some instances are controlled by a source of energy, such as light, heat, radiation, electricity, or any other source of energy. For example, electrodes are used to control one or more chemical reactions at all or a portion of discrete loci on a surface. Electrodes in some instances are charged by applying an electrical potential to the electrode to control one or more steps (e.g., chemical steps) in polynucleotide synthesis. In some instances, these electrodes are addressable. Any number of the steps, including chemical steps, described herein is in some instances controlled with one or more electrodes. Electrochemical reactions in a chemical step may comprise oxidations, reductions, acid/base chemistry, or other reaction that is controlled by an electrode. In some instances, electrodes generate electrons or protons that are used as reagents for chemical transformations in a reaction. Electrodes in some instances directly generate a reagent such as an acid. In some instances, an acid is a proton. Electrodes in some instances directly generate a reagent such as a base. Acids or bases are often used to cleave protecting groups, or influence the kinetics of various polynucleotide synthesis reactions, for example by adjusting the pH of a reaction solution. Electrochemically controlled polynucleotide synthesis reactions in some instances comprise redox-active metals or other redox-active organic materials. In some instances, metal or organic catalysts are employed with these electrochemical reactions. In some instances, an exemplary method is depicted in FIG. 13 or FIG. 15. In some instances, a protected nucleoside comprises a 5' or 3' protecting group. In some instances, the protecting group comprises an allyl group. In some instances, the protecting group comprises an O-allyl group. In some instances, synthesis proceeds in the 5' to 3' direction. In some instances, synthesis proceeds in the 3' to 5' direction.

Control of chemical reactions may not limited to the electrochemical generation of reagents. In some instances, chemical reactivity is influenced indirectly through biophysical changes to substrates or reagents through electric fields (or gradients) which are generated by electrodes. In some instances, substrates include but are not limited to nucleic acids. In some instances, electrical fields which repel or attract specific reagents or substrates towards or away from an electrode or surface are generated. Such fields in some instances are generated by application of an electrical potential to one or more electrodes. For example, negatively charged nucleic acids are repelled from negatively charged electrode surfaces. Such repulsions or attractions of polynucleotides or other reagents caused by local electric fields in some instances provides for movement of polynucleotides or other reagents in or out of a region of the synthesis device or structure. In some instances, electrodes generate electric fields which repel polynucleotides away from a synthesis surface, structure, or device. In some instances, electrodes generate electric fields which attract polynucleotides towards a synthesis surface, structure, or device. In some instances, protons are repelled from a positively charged surface to limit contact of protons with substrates or one or more portions thereof. In some instances, repulsion or attractive forces are used to allow or block entry of reagents or substrates to specific areas of the synthesis surface. In some instances, nucleoside monomers are prevented from contacting a polynucleotide chain by application of an electric field in the vicinity of one or both components. Such arrangements allow gating of specific reagents, which may obviate the need for protecting groups when the concentration or rate of contact between reagents and/or substrates is controlled. In some instances, unprotected nucleoside monomers are used for polynucleotide synthesis. Alternatively, application of the field in the vicinity of one or both components promotes contact of nucleoside monomers with a polynucleotide chain. Additionally, application of electric fields to a substrate can alter the substrates reactivity or conformation. In an exemplary application, electric fields generated by electrodes are used to prevent polynucleotides at adjacent loci from interacting. In some instances, the substrate is a polynucleotide, optionally attached to a surface. Application of an electric field in some instances alters the three-dimensional structure of a polynucleotide. Such alterations comprise folding or unfolding of various structures, such as helices, hairpins, loops, or other 3-dimensional nucleic acid structure. Such alterations are useful for manipulating nucleic acids inside of wells, channels, or other structures. In some instances, electric fields are applied to a nucleic acid substrate to prevent secondary structures. In some instances, electric fields obviate the need for linkers or attachment to a solid support during polynucleotide synthesis.

A suitable method for polynucleotide synthesis on a substrate of this disclosure is a phosphoramidite method comprising the controlled addition of a phosphoramidite building block, e.g. nucleoside phosphoramidite, to a growing polynucleotide chain in a coupling step that forms a phosphite triester linkage between the phosphoramidite building block and a nucleoside bound to the substrate. In some instances, the nucleoside phosphoramidite is provided to the substrate activated. In some instances, the nucleoside phosphoramidite is provided to the substrate with an activator. In some instances, nucleoside phosphoramidites are provided to the substrate in a 1.5, 2, 3, 4, 5, 6, 7, 8, 9, 10, 11, 12, 13, 14, 15, 16, 17, 18, 19, 20, 25, 30, 35, 40, 50, 60, 70, 80, 90, 100-fold excess or more over the substrate-bound nucleosides. In some instances, the addition of nucleoside phosphoramidite is performed in an anhydrous environment, for example, in anhydrous acetonitrile. Following addition and linkage of a nucleoside phosphoramidite in the coupling step, the substrate is optionally washed. In some instances, the coupling step is repeated one or more additional times, optionally with a wash step between nucleoside phosphoramidite additions to the substrate. In some instances, a polynucleotide synthesis method used herein comprises 1, 2, 3 or more sequential coupling steps. Prior to coupling, in many cases, the nucleoside bound to the substrate is deprotected by removal of a protecting group, where the protecting group functions to prevent polymerization. Protecting groups may comprise any chemical group that prevents extension of the polynucleotide chain. In some instances, the protecting group is cleaved (or removed) in the presence of an acid. In some instances, the protecting group is cleaved (or removed) in the presence of a base. In some instances, the protecting group is removed with electromagnetic radiation such as light, heat, or other energy source. In some instances, the protecting group is removed through an oxidation or reduction reaction. In some instances, a protecting group comprises a triarylmethyl group. In some instances, a protecting group comprises an aryl ether. In some instances, a protecting comprises a disulfide. In some instances, a protecting group comprises an acid-labile silane. In some instances, a protecting group comprises an acetal. In some instances, a protecting group comprises a ketal. In some instances, a protecting group comprises an enol ether. In some instances, a protecting group comprises a methoxybenzyl group. In some instances, a protecting group comprises an azide. In some instances, a protecting group is 4,4'-dimethoxytrityl (DMT). In some instances, a protecting group is a tert-butyl carbonate. In some instances, a protecting group is a tert-butyl ester. In some instances, a protecting group comprises a base-labile group.

Following coupling, phosphoramidite polynucleotide synthesis methods optionally comprise a capping step. In a capping step, the growing polynucleotide is treated with a capping agent. A capping step generally serves to block unreacted substrate-bound 5'-OH groups after coupling from further chain elongation, preventing the formation of polynucleotides with internal base deletions.

Further, phosphoramidites activated with 1H-tetrazole often react, to a small extent, with the O6 position of guanosine. Without being bound by theory, upon oxidation with $I_2$/water, this side product, possibly via O6-N7 migration, undergoes depurination. The apurinic sites can end up being cleaved in the course of the final deprotection of the polynucleotide thus reducing the yield of the full-length product. The O6 modifications may be removed by treatment with the capping reagent prior to oxidation with $I_2$/water. In some instances, inclusion of a capping step during polynucleotide synthesis decreases the error rate as compared to synthesis without capping. In some instances, the compounds and methods disclosed herein reduce depurination during polynucleotide synthesis. In some instances, the compounds and methods disclosed herein eliminate depurination during polynucleotide synthesis. In some embodiments, the compounds and methods disclosed herein do not require oxidation with an oxidant, for example, $I_2$/water. As an example, the capping step comprises treating the substrate-bound polynucleotide with a mixture of acetic anhydride and 1-methylimidazole. Following a capping step, the substrate is optionally washed.

Following addition of a nucleoside phosphoramidite, and optionally after capping and one or more wash steps, a substrate described herein comprises a bound growing nucleic acid that may be oxidized. The oxidation step comprises oxidizing the phosphite triester into a tetracoordinated phosphate triester, a protected precursor of the naturally occurring phosphate diester internucleoside linkage. In some instances, phosphite triesters are oxidized electrochemically. In some instances, oxidation of the growing polynucleotide is achieved by treatment with iodine and water, optionally in the presence of a weak base such as a pyridine, lutidine, or collidine. Oxidation is sometimes carried out under anhydrous conditions using tert-Butyl hydroperoxide or (1S)-(+)-(10-camphorsulfonyl)-oxaziridine (CSO). In some methods, a capping step is performed following oxidation. A second capping step allows for substrate drying, as residual water from oxidation that may persist can inhibit subsequent coupling. Following oxidation, the substrate and growing polynucleotide is optionally washed. In some instances, the step of oxidation is substituted with a sulfurization step to obtain polynucleotide phosphorothioates, wherein any capping steps can be performed after the sulfurization. Many reagents are capable of the efficient sulfur transfer, including, but not limited to, 3-(Dimethylaminomethylidene)amino)-3H-1,2,4-dithiazole-3-thione, DDTT, 3H-1,2-benzodithiol-3-one 1,1-dioxide, also known as Beaucage reagent, and N,N,N'N'-Tetraethylthiuram disulfide (TETD).

For a subsequent cycle of nucleoside incorporation to occur through coupling, a protected 5' end (or 3' end, if synthesis is conducted in a 5' to 3' direction) of the substrate bound growing polynucleotide is removed so that the primary hydroxyl group can react with a next nucleoside phosphoramidite. In some embodiments, the protecting group comprises a straight chain or branched chain alkenylene. In some embodiments, the protecting group comprises an allyl group. In some embodiments, the protecting group comprises a straight chain or branched chain alkenylene carbonate. In some embodiments, the phosphoramidite comprises a dialkyl amine. In some embodiments, the phosphoramidite comprises a methyl, ethyl, propyl, isopropyl, butyl, sec-butyl, tert-butyl amine, or dialkyl amino variant of any combination thereof. In some embodiments, disclosed herein is a compound of the formula:

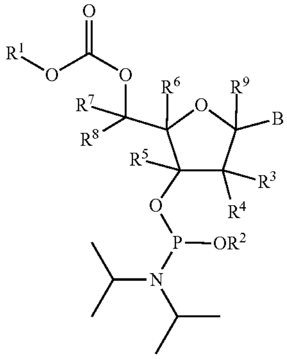

or

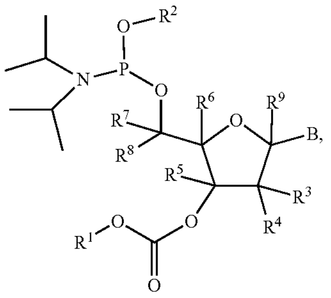

wherein $R^1$ is straight chain or branched chain alkenylene; $R^2$ is alkylene or alkenylene, each of which is independently unsubstituted or substituted; and B is a monocyclic or bicyclic $C_{4-6}$ heterocyclic ring. In some instances, B comprises a base corresponding to A, T, C, G, or U nucleotides. In some embodiments, $R^1$ is straight chain alkenylene. In some embodiments, $R^1$ is straight chain $C_{2-6}$alkenylene. In some embodiments, $R^1$ is allyl. In some embodiments, $R^1$ is branched chain alkenylene. In some embodiments, $R^1$ is branched chain $C_{3-8}$alkenylene. In some embodiments, $R^2$ is substituted alkylene. In some embodiments, $R^2$ is substituted $C_{2-4}$alkylene. In some embodiments, $R^2$ is cyanoethyl. In some embodiments, $R^2$ is unsubstituted alkenylene. In some embodiments, $R^2$ is unsubstituted $C_{2-4}$alkylene. In some embodiments, $R^2$ is allyl. In some embodiments each of $R^3$, $R^4$, $R^5$, $R^6$, $R^7$, $R^8$, or $R^9$ is independently H, OH, halogen, O-alkyl, N-alkyl, O-alkyl-O-alkyl, $N_3$, or $R_3$ and $R_6$ are taken together to form a ring, and B is a heterocyclic ring. In some instances, at least three of $R^3$, $R^4$, $R^5$, $R^6$, $R^7$, $R^8$, and $R^9$ are H. In some instances, at least five of $R^3$, $R^4$, $R^5$, $R^6$, $R^7$, $R^8$, and $R^9$ are H. In some instances, $R^3$, $R^4$, $R^5$, $R^6$, $R^7$, $R^8$, and $R^9$ are H. In some instances, at least one of $R^3$, $R^4$, $R^5$, $R^6$, $R^7$, $R^8$, and $R^9$ is F. In some instances $R^3$ is H and $R^4$ is OH. In some instances one or both of $R^3$ and $R^4$ is F. In some instances one or both of $R^3$ and $R^4$ is $—OCH_3$ or $—OCH_2CH_2OCH_3$. In some instances, at least one of $R^3$, $R^4$, $R^5$, $R^6$, $R^7$, $R^8$, and $R^9$ is $—OCH_3$. In some instances, at least one of $R^3$, $R^4$, $R^5$, $R^6$, $R^7$, $R^8$, and $R^9$ is $—OCH_2CH_2OCH_3$. In some instances, $R_3$ and $R_6$ are taken together to form a ring. In some instances, $R_3$ and $R_6$ are taken together to form a ring where the ring comprises $—CH_2—O—$. In some embodiments, disclosed herein is a compound of the formula:

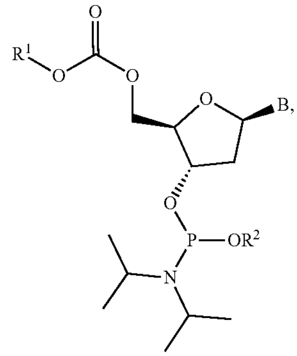

wherein $R^1$ is straight chain or branched chain alkenylene; $R^2$ is alkylene or alkenylene, each of which is independently unsubstituted or substituted; and B is a monocyclic or bicyclic $C_{4-6}$ heterocyclic ring. In some embodiments, $R^1$ is straight chain alkenylene. In some embodiments, $R^1$ is straight chain $C_{2-6}$alkenylene. In some embodiments, $R^1$ is allyl. In some embodiments, le is branched chain alkenylene. In some embodiments, $R^1$ is branched chain $C_{3-8}$alkenylene. In some embodiments, $R^2$ is substituted alkylene. In some embodiments, $R^2$ is substituted $C_{2-4}$alkylene. In some embodiments, $R^2$ is cyanoethyl. In some embodiments, $R^2$ is unsubstituted alkenylene. In some embodiments, $R^2$ is unsubstituted $C_{2-4}$alkylene. In some embodiments, $R^2$ is allyl.

In some embodiments, B is a monocyclic $C_4$ heterocyclic ring. In some embodiments, B is a bicyclic $C_5$ heterocyclic ring. In some embodiments, B is a nucleobase. In some embodiments, B is a modified nucleobase. In some embodiments, B has the formula:

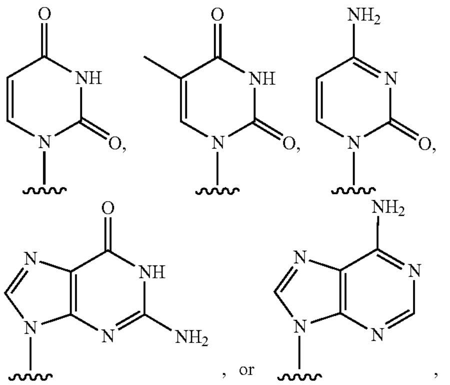

each of which is independently substituted or unsubstituted. In some embodiments, B has the formula:

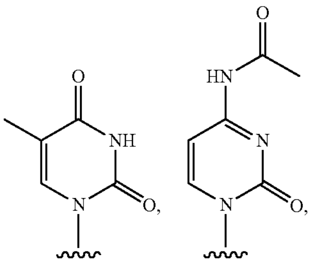

-continued

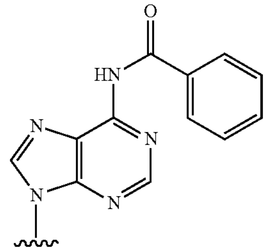

, or

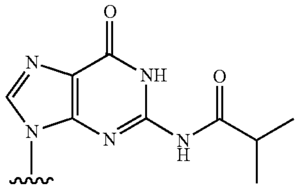

, each of which is independently substituted or unsubstituted.

In some embodiments, the compound is

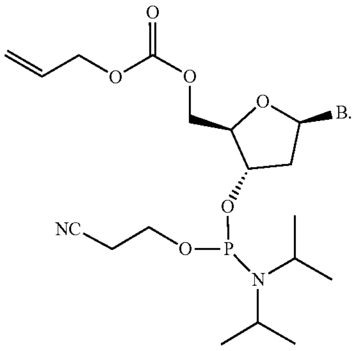

In some embodiments, the compound is:

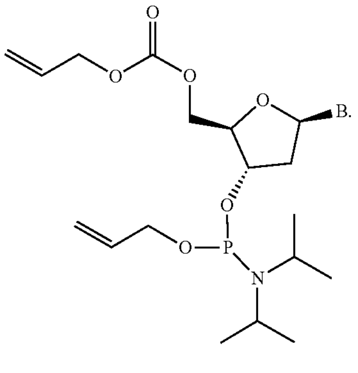

Figure 16:
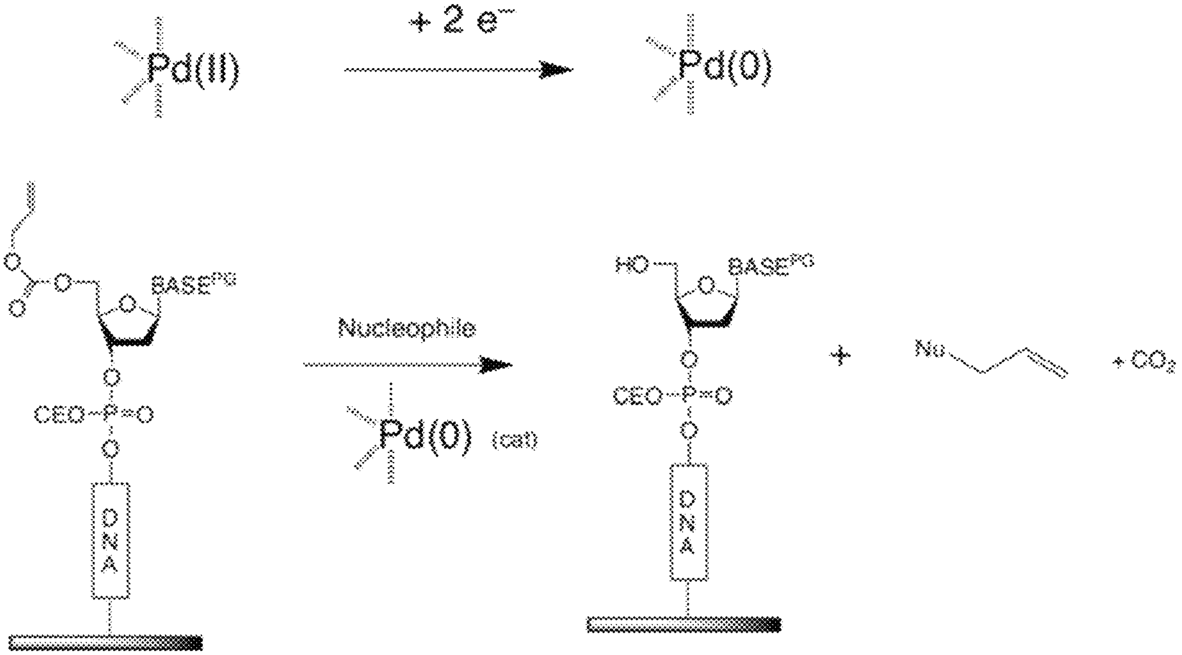
FIG. 16 illustrates the DNA oligomersynthesis on an electrochemical platform, which deprotects 5'-O-alloc protected DNA phosphoramidite moieties with a nucleophile, catalyzed by Pd(0) according to some embodiments.
Figure 17:
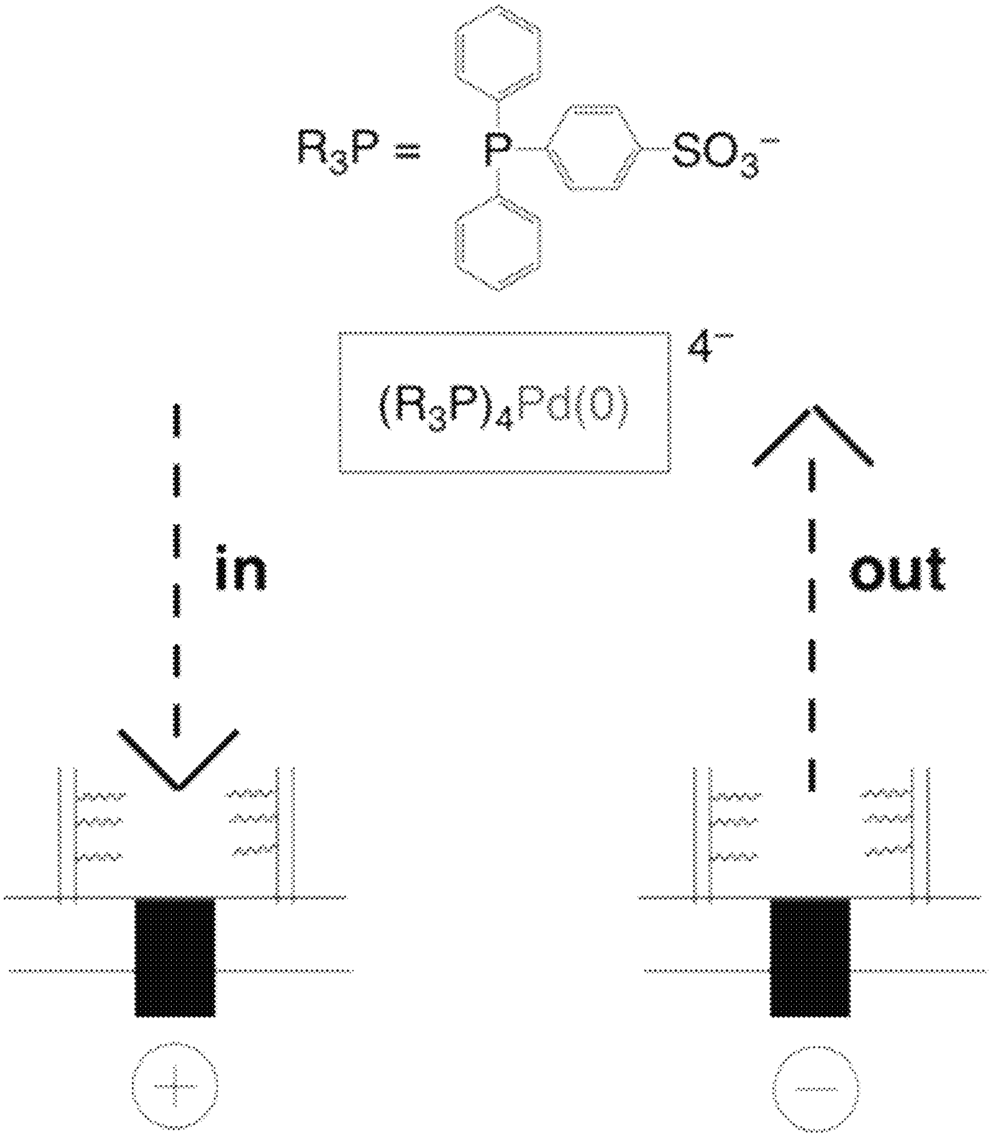
FIG. 17 illustrates use of an electrochemical platform for electrophoretic applications according to some embodiments. Charged species can be selectively attracted or expelled from reaction sites.

Methods and compositions described herein provide for controlled deblocking conditions limiting undesired depurination reactions. In some embodiments, the deblocking step comprises contacting an amount of a reagent with the protected nucleoside, wherein the contacting results in deprotection of a terminal nucleoside of the protected nucleoside. In some embodiments, the reagent is a transition metal catalyst. In some embodiments, the reagent is a zero valent transition metal catalyst. In some embodiments, an O-alloc protecting group can be removed by site-selective reduction of a Pd(II) precursor (FIGS. 16-17). In some embodiments, an O-alloc protecting group can be removed without the use of an acid. In some embodiments, the reagent comprises a Pd(0) catalyst. In some embodiments, the Pd(0) catalyst has a nitrogen-based ligand. In some embodiments, the Pd(0) catalyst comprises an aryl phosphine ligand. In some instances, the ligand comprises 1,2-Bis(diphenylphosphino)ethane. In some embodiments, the Pd(0) catalyst has a nitrogen-based ligand. In some embodiments, the Pd(0) catalyst comprises an alkyl amino ligand. In some instances, alkyl amine ligands comprise TMEDA, TPPTS, diethylamine, DIPEA, In some instances an alkyl amine ligand comprise a $C_1$-$C_{16}$ alkyl amine. In some embodiments, the Pd(0) catalyst comprises a heteroaryl phosphine ligand. In some instances, a heteroaryl group comprises substituted or unsubstituted pyridine, pyrazole, pyrazine, furan, thiophene, thiazole, isoxazole, isothiazole, oxazole, pyridazine, or triazine. In some embodiments, the reagent comprises $Pd(Ph_3)_4$, $PdCl_2(Ph_3P)_2$, $Pd(dba)_2$, or $Pd(OAc)_2$. In some instance a catalyst comprises an oxidation state 2 metal (e.g., $Pd^{2+}$ or $Ni^{2+}$) in combination with a reducing agent. In some instances a ligand comprises 3,3',3''-Phosphanetriyltris trisodium salt (TPPTS). In some embodiments, the reagent comprises a Ni catalyst. In some instances a Ni catalyst comprises a CO ligand. In some instances a Ni catalyst comprises an alkyl amine ligand. In some instances, an alkyl amino ligand comprises TMEDA. In some embodiments, the reagent comprises a Ni, Pd, or Pt catalyst. In some embodiments, the reagent comprises a Pt catalyst. In some embodiments, the reagent comprises tetrazine. In some embodiments, the reagent comprises a modified tetrazine. In some embodiments, the amount of the catalyst is about 0.001 mol % to about 25% mol of the protected nucleoside. In some embodiments, the amount of the catalyst is about 0.001 mol %, 0.005 mol %, 0.01 mol %, 0.05 mol %, 0.1 mol %, 0.5 mol %, 1 mol %, 3 mol %, 5 mol %, 8 mol %, 10 mol %, 12 mol %, 15 mol %, 20 mol %, or 25 mol % of the protected nucleoside. In some embodiments, the amount of the catalyst is at least about 0.001 mol %, 0.005 mol %, 0.01 mol %, 0.05 mol %, 0.1 mol %, 0.5 mol %, 1 mol %, 3 mol %, 5 mol %, 8 mol %, 10 mol %, 12 mol %, 15 mol %, 20 mol %, or 25 mol % of the protected nucleoside. In some embodiments, the amount of the catalyst is at most about 0.001 mol %, 0.005 mol %, 0.01 mol %, 0.05 mol %, 0.1 mol %, 0.5 mol %, 1 mol %, 3 mol %, 5 mol %, 8 mol %, 10 mol %, 12 mol %, 15 mol %, 20 mol %, or 25 mol % of the protected nucleoside. In some embodiments, the amount of the catalyst is 0.001-30%, 0.001-10%, 0.001-5%, 0.001 to 1%, 0.001-0.1%, 0.001-0.01%, 0.01-10%, 0.01-5%, 0.01-1%, 0.01-1%, 0.1-50%, 0.1-25%, 0.1-15%, 0.1-10%, 0.1-5%, 0.1-2%, 0.1-1%, 1-50%, 1-75%, 1-25%, or 1-10% (mol %). In some embodiments, the amount of the catalyst is less than about 15 mol % of the protected nucleoside. In some embodiments, the amount of the catalyst is less than about 5 mol % of the protected nucleoside. In some embodiments, the amount of the catalyst is less than 25, 20, 15, 12, 10, 8, 5, 3, 1, 0.01, or 0.001 mol % of the protected nucleoside. In some embodiments, the deblocking step further comprises contacting the protected nucleoside with a nucleophile, for example, a C-nucleophile. In some embodiments, the C-nucleophile is N,N-dimethylbarbiturate. In some embodiments, the nucleophile is acetylacetonate. In some embodiments, the nucleophile comprises a phosphine. In some embodiments, the nucleophile is $PPh_3$. In some embodiments, the deblocking step is carried out in a chlorinated solvent. In some embodiments, the deblocking step is carried out in dichloromethane or chloroform.

The reagent can be contacted with the protected nucleoside for about 1 minute to about 20 minutes. In some embodiments, the contacting the reagent with the protected nucleoside is for about 1 minute, 2 minutes, 3 minutes, 4 minutes, 5 minutes, 6 minutes, 7 minutes, 8 minutes, 9 minutes, 10 minutes, 15 minutes, or 20 minutes. In some embodiments, the contacting the reagent with the protected nucleoside is for at least about 1 minute, 2 minutes, 3 minutes, 4 minutes, 5 minutes, 6 minutes, 7 minutes, 8 minutes, 9 minutes, 10 minutes, 15 minutes, or 20 minutes. In some embodiments, the contacting the reagent with the protected nucleoside is for less than about 20 min, less than about 15 min, less than about 10 min, less than about 9 min, less than about 8 min, less than about 7 min, less than about 6 min, less than about 5 min, less than about 4 min, less than about 3 min, less than about 2 min, or less than about 1 min. In some embodiments, the contacting the reagent with the protected nucleoside is for less than about 10 min. In some embodiments, the contacting the reagent with the protected nucleoside is for less than about 5 min. In some embodiments, the contacting the reagent with the protected nucleoside is for 0.1-10, 0.1-8, 0.1-5, 0.1-4, 0.1-3, 0.1-2, 0.1-1, 0.1-0.5, 0.5-10, 0.5-5, 0.5-3, 0.5-2, 1-10, 1-7, 1-5, 1-4, 1-3, 1-2, 2-10, 2-8, 2-5, or 5-10 minutes. In some instances, the substrate bound polynucleotide is washed after deblocking. In some cases, efficient washing after deblocking contributes to synthesized polynucleotides having a low error rate.

Methods for the synthesis of polynucleotides on a substrate described herein may involve an iterating sequence of one or more of the following steps: application of a protected monomer to a surface of a substrate feature to link with either the surface, a linker or with a previously deprotected monomer; deprotection of the applied monomer so that it can react with a subsequently applied protected monomer; and application of another protected monomer for linking. One or more intermediate steps include oxidation and/or sulfurization. In some instances, one or more wash steps precede or follow one or all of the steps.

Methods for the synthesis of polynucleotides on a substrate described herein may comprise an oxidation step. For example, methods involve an iterating sequence of one or more of the following steps: application of a protected monomer to a surface of a substrate feature to link with either the surface, a linker or with a previously deprotected monomer; deprotection of the applied monomer so that it can react with a subsequently applied protected monomer; application of another protected monomer for linking, and oxidation and/or sulfurization. In some instances, one or more wash steps precede or follow one or all of the steps.

Methods for the synthesis of polynucleotides on a substrate described herein may further comprise an iterating sequence of the following steps: application of a protected monomer to a surface of a substrate feature to link with either the surface, a linker or with a previously deprotected monomer; deprotection of the applied monomer so that it can react with a subsequently applied protected monomer; and oxidation and/or sulfurization. In some instances, one or more wash steps precede or follow one or all of the steps. In some embodiments, one oxidation step is carried out at the end of the synthesis.

Methods for the synthesis of polynucleotides on a substrate described herein may further comprise an iterating sequence of one or more the following steps: application of a protected monomer to a surface of a substrate feature to link with either the surface, a linker or with a previously deprotected monomer; and oxidation and/or sulfurization. In some instances, one or more wash steps precede or follow one or all of the steps. In some embodiments, one oxidation step is carried out at the end of the synthesis.

Methods for the synthesis of polynucleotides on a substrate described herein may further comprise an iterating sequence of one or more of the following steps: application of a protected monomer to a surface of a substrate feature to link with either the surface, a linker or with a previously deprotected monomer; deprotection of the applied monomer so that it can react with a subsequently applied protected monomer; and oxidation and/or sulfurization. In some instances, one or more wash steps precede or follow one or all of the steps.

In some instances, polynucleotides are synthesized with photolabile protecting groups, where the hydroxyl groups generated on the surface are blocked by photolabile-protecting groups. When the surface is exposed to UV light, such as through a photolithographic mask, a pattern of free hydroxyl groups on the surface may be generated. These hydroxyl groups can react with photoprotected nucleoside phosphoramidites, according to phosphoramidite chemistry. A second photolithographic mask can be applied and the surface can be exposed to UV light to generate second pattern of hydroxyl groups, followed by coupling with 5'-photoprotected nucleoside phosphoramidite. Likewise, patterns can be generated and oligomer chains can be extended. Without being bound by theory, the lability of a photocleavable group depends on the wavelength and polarity of a solvent employed and the rate of photocleavage may be affected by the duration of exposure and the intensity of light. This method can leverage a number of factors such as accuracy in alignment of the masks, efficiency of removal of photo-protecting groups, and the yields of the phosphoramidite coupling step. Further, unintended leakage of light into neighboring sites can be minimized. The density of synthesized oligomer per spot can be monitored by adjusting loading of the leader nucleoside on the surface of synthesis.

The surface of a substrate described herein that provides support for polynucleotide synthesis may be chemically modified to allow for the synthesized polynucleotide chain to be cleaved from the surface. In some instances, the polynucleotide chain is cleaved at the same time as the polynucleotide is deprotected. In some cases, the polynucleotide chain is cleaved after the polynucleotide is deprotected. In an exemplary scheme, a trialkoxysilyl amine such as $(CH_3CH_2O)_3Si—(CH_2)_2—NH_2$ is reacted with surface SiOH groups of a substrate, followed by reaction with succinic anhydride with the amine to create an amide linkage and a free OH on which the nucleic acid chain growth is supported. Cleavage includes gas cleavage with ammonia or methylamine. In some instances, cleavage includes linker cleavage with electrically generated reagents such as acids or bases. In some instances, once released from the surface, polynucleotides are assembled (either in vitro, in vivo, or in silico) into larger nucleic acids that are sequenced and decoded to extract stored information. In some instances, the polynucleotides are assembled using one or more indices.

The surfaces described herein can be reused after polynucleotide cleavage to support additional cycles of polynucleotide synthesis. For example, the linker can be reused without additional treatment/chemical modifications. In some instances, a linker is non-covalently bound to a substrate surface or a polynucleotide. In some embodiments, the linker remains attached to the polynucleotide after cleavage from the surface. Linkers in some embodiments comprise reversible covalent bonds such as esters, amides, ketals, beta substituted ketones, heterocycles, or other group that is capable of being reversibly cleaved. Such reversible cleavage reactions are in some instances controlled through the addition or removal of reagents, or by electrochemical processes controlled by electrodes. Optionally, chemical linkers or surface-bound chemical groups are regenerated after a number of cycles, to restore reactivity and remove unwanted side product formation on such linkers or surface-bound chemical groups.

In some instances, the substrate is a flexible substrate. In some instances, about $10^{10}$, $10^{11}$, $10^{12}$, $10^{13}$, $10^{14}$, or $10^{15}$ bases are synthesized in one day. In some instances, at least about $10^{10}$, $10^{11}$, $10^{12}$, $10^{13}$, $10^{14}$, or $10^{15}$ bases are synthesized in one day. In some instances, at most about $10^{10}$, $10^{11}$, $10^{12}$, $10^{13}$, $10^{14}$, or $10^{15}$ bases are synthesized in one day. In some instances, about $10\times10^{8}$, $10\times10^{9}$, $10\times10^{10}$, $10\times10^{11}$, or $10\times10^{12}$ polynucleotides are synthesized in one day. In some instances, at least about $10\times10^{8}$, $10\times10^{9}$, $10\times10^{10}$, $10\times10^{11}$, or $10\times10^{12}$ polynucleotides are synthesized in one day. In some instances, at most about $10\times10^{8}$, $10\times10^{9}$, $10\times10^{10}$, $10\times10^{11}$, or $10\times10^{12}$ polynucleotides are synthesized in one day. In some cases, each polynucleotide synthesized comprises about 20, 50, 100, 200, 300, 400 or 500 nucleobases. In some cases, each polynucleotide synthesized comprises at least about 20, 50, 100, 200, 300, 400 or 500 nucleobases. In some cases, each polynucleotide synthesized comprises at most about 20, 50, 100, 200, 300, 400 or 500 nucleobases. In some cases, these bases are synthesized with a total average error rate of about 1 in 100; 200; 300; 400; 500; 1000; 2000; 5000; 10000; 15000; 20000 bases. In some cases, these bases are synthesized with a total average error rate of less than about 1 in 100; 200; 300; 400; 500; 600; 700; 800; 900; 1000; 2000; 3000; 4000; 5000; 6000; 7000; 8000; 9000; 10000; 12000; 15000; 18000; 20000 bases. In some instances, these error rates are for about 50%, 60%, 70%, 80%, 90%, 95%, 98%, 99%, 99.5%, or more of the polynucleotides synthesized. In some instances, these error rates are for at least 50%, 60%, 70%, 80%, 90%, 95%, 98%, 99%, 99.5%, or more of the polynucleotides synthesized. In some instances, these at least 90%, 95%, 98%, 99%, 99.5%, or more of the polynucleotides synthesized do not differ from a predetermined sequence for which they encode. In some instances, the error rate for synthesized polynucleotides on a substrate using the methods and systems described herein is less than about 1 in 200. In some instances, the error rate for synthesized polynucleotides on a substrate using the methods and systems described herein is less than about 1 in 1,000. In some instances, the error rate for synthesized polynucleotides on a substrate using the methods and systems described herein is less than about 1 in 2,000. In some instances, the error rate for synthesized polynucleotides on a substrate using the methods and systems described herein is less than about 1 in 3,000. In some instances, the error rate for synthesized polynucleotides on a substrate using the methods and systems described herein is less than about 1 in 5,000. Individual types of error rates include mismatches, deletions, insertions, and/or substitutions for the polynucleotides synthesized on the substrate. The term "error rate" refers to a comparison of the collective amount of synthesized polynucleotide to an aggregate of predetermined polynucleotide sequences. In some instances, each of the polynucleotides comprise a plurality of different nucleotide bases (e.g., A, T, C, G, etc.).

In some instances, synthesized polynucleotides disclosed herein comprise a tether of 12 to 25 bases. In some instances, the tether comprises about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 or more bases. In some instances, synthesized polynucleotides disclosed herein comprise a tether of about 10, about 20, about 30, about 40, about 50, about 60, about 70, about 80, about 90, about 100, about 110, about 120, about 130, about 140, about 150, about 160, about 170, about 180, about 190, about 200, about 210, about 220, about 230, about 240, or about 250 bases.

Electrochemistry

Provided herein are methods of applying voltage to devices described herein. Such voltages may result in any number of different effects, such as electrochemical reaction with solvents or solutes. In some instances, applying a voltage can modify a molecule attached to a synthesis surface. In some instances, the molecule is a polysaccharide, polynucleotide, polypeptide, or other polymer. Further provided herein are methods wherein the devices described herein are energized with an electrical voltage. In some instances, the electrical voltage is used to chemically modify oligonucleotides bound to a solid support or surface. Such modifications can occur through direct electrochemical reactions of a polynucleotide, or through the generation of reagents.

Methods described herein may comprising energizing a device with a voltage (applying a voltage) for a period of time. Applied voltages in some instances form a circuit between a cathode and an anode, leading to current flow through the device, solvent, and/or other components. In some instances, a layer of a device is configured as an anode or cathode. In some instances, a device comprises an anode located above the plane of the cathode ("sandwiched"). In some instances, a device comprises a cathode located above the plane of the anode ("opposing cathode"). In some instances, conductive layer is in electrical contact with layer cathode. In some instances, a device comprises an anode located in substantially the same plane of the cathode. Application of voltage in some instances is configured to perform a step of polynucleotide synthesis. In some instances, devices comprise conducting layers in fluid communication with a solvent. In some instances, the solvent comprises reagents.

Methods described herein may comprise applying a voltage to one or more devices described herein. In some instances, such voltages result in deprotection of molecules (polynucleotides, polypeptides, polysaccharides, or other polymer) at one or more devices or regions. In some instances, application of a voltage at one or more devices results in deprotection of polynucleotides at one or more devices or regions within one or more devices. In some instances, a device is described as "inactive" if a reagent is not generated at or in the vicinity of a device or region of a device. In some instances, a device is described as "active" if a reagent is generated at or in the vicinity of a device or region of a device. In some instances, chemical reactions of polynucleotides occurs at or near one or more active devices, or regions of one or more active devices. In some instances, both active and inactive devices are energized with voltages. In some instances, voltage is applied to inactive devices in levels which are insufficient to generate a chemical reagent. In some instances, one or more voltages (or voltage levels) can be applied for periods of time. In some instances, a single voltage level is used (FIGS. 17A-17C). In some instances, a cathode voltage is kept constant at 0V, while the anode voltage is increased from 0V to 2V during a "pulse". In some instances, a cathode voltage is kept constant at a negative voltage (e.g., −1V or other negative voltage), while the anode voltage is increased from 0V to 2V during a "pulse". In some instances, a cathode voltage is decreased from 0V to a negative voltage (such as −1V), and an anode voltage is increased from 0V to 1V during a "pulse". In some instances such voltages are synchronized. In some instances, the decrease in voltage at the cathode and increase in voltage at the anode occur at approximately the same time. In some instances such voltages are synchronized. In some instances, the decrease in voltage at the cathode and increase in voltage at the anode occur within 1 second, 0.5 seconds, 0.1 seconds, 0.05 seconds, 0.01 seconds, 0.005 seconds, 0.001 seconds, or occur within 0.0005 seconds of each other. In some instances, two voltage levels are used during a deprotection step. In some instances, two voltage levels are used, e.g., a positive and neutral voltage. In some instances, three voltage levels are used e.g., a positive, neutral (or zero/about zero), and negative voltage. The two or three voltage levels used may be positive voltage, neutral voltage, negative voltage, or any combination thereof.

Voltage in some instances is applied to multiple electrodes in fluid communication with the same surface, for example between a reactant electrode and a shield electrode. Voltages between the reactant electrode and shield electrode are in some instances, synchronized. In some instances, when the difference between the cathode and anode voltages exceeds a threshold, a reagent is generated. In some instances, synchronizing positive anode and negative cathode voltages results in the advantage of reducing the magnitude of the voltages that are necessary to drive a device.

Different voltage configurations for activation of a device may be used. In a first configuration, an in-plane cathode, opposing cathode, and other devices (e.g., proximal or distance devices) are connected to ground while a device is energized with a voltage. In a second configuration, an opposing cathode is connected to ground and an in-plane cathode and other devices are left disconnected, while a device is energized with a voltage. In a third configuration, an in-plane cathode and other devices are connected to ground and an opposing cathode is left disconnected, while a device is energized with a voltage. In a fourth configuration, In a fourth configuration, an in-plane cathode is connected to ground and the opposing cathode and other devices are left disconnected while a device is energized with a voltage. In some instances, in-plane cathodes connected to ground generate deprotection-neutralizing products when a device is activated. In some instances the component (e.g., cathode) connected to ground has a negative voltage potential, while the activated device (e.g., anode) is connected to a positive voltage potential. In some instances, this configuration lowers the effective voltage needed to drive the device.

Devices may be described as circuits between an anode and a cathode. In some instances, such circuits are described as being in device states, such as "on", "off", or "alternate resistance". In some instances, alternate resistance is a high resistance state, or "disconnect" state. In some instances, a high resistance state is a resistance state that is higher than an off state (e.g., low/no voltage in off state, but still connected to a ground). In some instances, a high resistance state provides an effective amount of resistance to reduce current flow through one or more inactive devices. Without being bound by theory, the disconnect state in some instances reduces undesired deprotection at areas adjacent to an on device. In some instances, a high resistance state provides an effective amount of resistance to reduce current flow to near zero in one or more inactive devices. In some instances, an off state is generated by zero (or near zero) voltage between an inactive device and a common cathode. In some instances an off state exists even with a minimum voltage applied between an inactive device and a common cathode, wherein the minimum voltage is below that amount needed for deprotection. In some instances a high resistance state is generated by zero voltage between an inactive device and the cathode and a higher resistance between the inactive devices and a common cathode. In some instances, an off state indicates zero voltage or negative voltage between the anode and active device (cathode). In some instances, an on state indicates positive voltage between the anode and active device (cathode) which is sufficient for deprotection. In some instances, an inactive device is in the off or alternate resistance state. In some instances, an active device (where deprotection is desired) is cycled (e.g., pulsed) between one or more on and off states for a period of time. In some instances, an active device (where deprotection is desired) is cycled between one or more on and off states for a period of time and neighboring inactive devices are maintained in an alternative resistance state.

In some instances, methods described herein comprise one or more of (a) providing a surface having (i) one or more electrodes proximal to the surface and (ii) one or more in-plane cathodes proximal to the surface, wherein the surface comprises a first plurality of protected biomolecules attached thereto; (b) energizing at least one electrode proximal to a first region of the surface to electrochemically generate a reagent, wherein the reagent reacts with at least some of the first plurality of biomolecules in the first region; (c) coupling at least one protected biomolecule monomer to at least one deprotected biomolecule in the first region; and (d) repeating steps (a)-(c) to synthesize the biomolecule. In some instances the biomolecule comprises a polynucleotide. In some instances, the biomolecule monomer comprises a nucleotide. In some instances, a negative voltage is applied to a cathode, and a positive voltage is applied to an anode. In some instances, the absolute difference in voltage is about 2, 1.9, 1.8, 1.7, 1.6, 1.5, 1.4, 1.3, 1.2, 1.1, 1, 0.9, 0.8, 0.7, 0.6, 0.5, 0.4, 0.3, or 0.2 volts. In some instances, the absolute difference in voltage is at least about 2, 1.9, 1.8, 1.7, 1.6, 1.5, 1.4, 1.3, 1.2, 1.1, 1, 0.9, 0.8, 0.7, 0.6, 0.5, 0.4, 0.3, or 0.2 volts. In some instances, the absolute difference in voltage is no more than about 2, 1.9, 1.8, 1.7, 1.6, 1.5, 1.4, 1.3, 1.2, 1.1, 1, 0.9, 0.8, 0.7, 0.6, 0.5, 0.4, 0.3, or no more than 0.2 volts. In some instances, the absolute difference in voltage is no more than about 0.2-2, 0.5-2, 0.8-2, 1-2, 1.5-2, 0.2-1, 0.2-0.5, 0.5-1, or 0.5-1.5 volts. In some instances, the absolute difference in voltage is no more than 0.2-2, 0.5-2, 0.8-2, 1-2, 1.5-2, 0.2-1, 0.2-0.5, 0.5-1, or 0.5-1.5 volts.

A voltage may be applied to the cathode in addition to the anode. In some instances, the cathode is biased with a negative voltage relative to ground. In some instances, biasing the voltage (bias voltage) of the cathode reduces the maximum anode voltage needed for electrochemical reactions (e.g., the voltage difference between the anode and cathode will equal the anode voltage plus the magnitude of the negative bias voltage at the cathode). In some instances, a device comprises a contact bias on the cathode. In some instances, a bias voltage at the cathode is switched whenever the anode voltage is switched (e.g., synched). In some instances, a cathode controls electrochemistry for a single device. In some instances, a cathode controls electrochemistry for a plurality of devices ("common" cathode). In some instances, use of a common cathode results in fewer transistors needed per device. In some instances, the bias voltage is no more than −0.1, −0.2, −0.3, −0.5, −0.7, −0.9, −1.0 −1.1, −1.2, −1.5, −1.8, −2.0, −2.1, −2.2, or no more than −2.5 volts. In some instances, the biased voltage is at least −0.1, −0.2, −0.3, −0.5, −0.7, −0.9, −1.0 −1.1, −1.2, −1.5, −1.8, −2.0, −2.1, −2.2, or at least −2.5 volts. In some instances, the biased voltage is about −0.1, −0.2, −0.3, −0.5, −0.7, −0.9, −1.0 −1.1, −1.2, −1.5, −1.8, −2.0, −2.1, −2.2, or about −2.5 volts. In some instances, the biased voltage is about −0.1 to −2.5 volts, −0.2 to −2.5 volts, −0.5 to −2.5 volts, −1.0 to −2.5 volts, −1.5 to −2.5 volts, −1.0 to −2.0 volts, −0.5 to −1.0 volts, −0.2 to −1.5 volts, or −2.0 to −2.5 volts.

The voltage between two layers of a device or surface may be varied. In some instances, a voltage is between the anode and cathode. In some instances the voltage is about 0.5-3, 1-3, 1.5-2.5, 1-2.5, or 1.5-2 volts. In some instances, the voltage is at least about 0.5, 0.75, 1, 1.2, 1.5, 1.7, 1.9, 2, 2.2, 2.4, or more than 2.4 volts. In some instances, the voltage is about 0.5, 0.75, 1, 1.2, 1.5, 1.7, 1.9, 2, 2.2, 2.4, or about 2.4 volts. In some instances, the voltage is about −0.1 to −2.5 volts, −0.2 to −2.5 volts, −0.5 to −2.5 volts, −1.0 to −2.5 volts, −1.5 to −2.5 volts, −1.0 to −2.0 volts, −0.5 to −1.0 volts, −0.2 to −1.5 volts, or −2.0 to −2.5 volts. In some instances, a conducting layer of a device is charged with a positive voltage. In some instances, a conducting layer of a device is charged with a negative voltage. In some instances, a first layer of a device is charged with a positive voltage, and a second layer is charged with a negative voltage at the same time.

The amount of time a voltage is applied may be varied for each synthesis cycle (e.g., deblocking, coupling, etc.). In some instances, the amount of time is the total amount of time the voltage is applied during a synthesis cycle. Voltage is applied in some instances for no more than about 0.1, 0.2, 0.5, 0.8, 1, 2, 5, or no more than 10 seconds. Voltage is applied in some instances for about 0.1-10, 0.5-10, 0.5-5, 0.1-5, 2-5, 2-10, 3-10, or 0.1-2 seconds. Voltage is applied in some instances about 0.1, 0.2, 0.5, 0.8, 1, 2, 5, or about 10 seconds. Voltage is applied in some instances for no more than about 0.1, 0.2, 0.5, 0.8. 1, 2, 5, 10, 20, 50, 100, 200, 500, 800, or no more than 1000 milliseconds (ms). Voltage is applied in some instances for about 0.1, 0.2, 0.5, 0.8. 1, 2, 5, 10, 20, 50, 100, 200, 500, 800, or about 1000 milliseconds. Voltage is applied in some instances for about 0.1-1000, 0.5-500, 0.5-50, 0.1-5, 2-50, 2-100, 3-200, 0.1-10, 1-100, 1-50, or 0.1-2 milliseconds.

Voltage may be applied as a single "on"/"off" cycle, or applied as a series of alternating "on" and "off" cycles to an active device. In some instances, an "on" state is a positive voltage or a negative voltage. The application of voltage in the "on" state followed by an "off" state is in some instances defined as a "pulse." In some instances, voltage is applied in a series of pulses, such as 1-1000, 1-500, 1-300, 10-500, 10-100, 50-500, 50-200, 100-1000, 2-10, 2-8, 20-200, or 300-750 pulses. The number of pulses may be about 1, 2, 5, 10, 20, 50, 100, 200, 300, 500, 750, or 1000 pulses. The voltage application time may be divided by the number of pulses to define a pulse time (or pulse width, or time per pulse). The pulse time in some instances is about 0.1-1000, 0.5-500, 0.5-50, 0.1-5, 2-50, 2-100, 3-200, 0.1-10, 1-100, 1-50, or 0.1-2 milliseconds. In some instances, a polynucleotide synthesis surface is washed with a solvent in between pulses. In some instances, a polynucleotide synthesis surface is not washed with a solvent in between pulses. In some instances a series of pulses are used to deliver voltage to a surface, followed by a wash step, which in some instances, is followed by another series of pulses. In some instances, the pulses are the same voltage. In some instances, the pulses are not the same voltage. In some instances, a first pulse is positive, and a second pulse is negative. In some instances, the time between a positive and negative voltage is substantially instantaneous. In some instances, a first pulse is about 2 volts and a second pulse is about −0.6 volts. In some instances, a first pulse is 0.5 to 3 volts and a second pulse is −0.1 to −1.0 volts.

The time period between pulses may be varied. In some instances, the time period between pulses may be varied to allow, without being bound by theory, electrochemically generated reagents to dissipate. The time between pulses in some instances is about 0.1-10, 0.5-10, 0.5-5, 0.1-5, 2-5, 2-10, 3-10, or 0.1-2 seconds. In some instances, the ratio between on and off times for series of pulses is described as a duty cycle. In some instances, a duty cycle is about 1:100, 1:50, 1:20, 1:10, 1:5, 1:2, 1:1.5, 1:1.05, 1.05:1, 1.5:1, 2:1, or about 3:1.

Electrochemical reactions may result in less migration of reagents to neighboring (or adjacent) addressable devices (or solid supports) where other polynucleotides are synthesized. In some instances, an addressable device can be energized with two or more pulses. In some instances, an active device comprises a first plurality of protected biomolecules. In some instances, an active device comprises a second plurality of protected biomolecules (proximal) to a neighboring device. In some instances, reduced reagent migration to neighboring devices results in higher synthesis fidelity on the device. For example, a high percentage of a first plurality of protected biomolecules at an active device are chemically modified, while a minimum of percentage of a second plurality of protected biomolecules at a neighboring device are chemically modified. In some instances, electrochemical deprotection chemically modifies a protected nucleoside. In some instances, about 90%, 95%, 97%, 98%, 99%, 99.5%, 99.6%, 99.7%, 99.8%, 99.9%, 99.95%, 99.97%, 99.99%, or 99.995% of the polynucleotides on an addressable device are chemically modified. In some instances, at least 90%, 95%, 97%, 98%, 99%, 99.5%, 99.6%, 99.7%, 99.8%, 99.9%, 99.95%, 99.97%, 99.99%, or at least 99.995% of the polynucleotides on an addressable device are chemically modified. In some instances, about 10%, 5%, 3%, 2%, 1%, 0.5%, 0.4%, 0.3%, 0.2%, 0.1%, 0.05%, 0.02%, 0.01%, 0.005%, 0.004%, 0.001%, or 0.0005% of the polynucleotides on an adjacent addressable device are chemically modified. In some instances, no more than 10%, 5%, 3%, 2%, 1%, 0.5%, 0.4%, 0.3%, 0.2%, 0.1%, 0.05%, 0.02%, 0.01%, 0.005%, 0.004%, 0.001%, or no more than 0.0005% of the polynucleotides on an adjacent addressable device are chemically modified. In some instances, about 90%, 95%, 97%, 98%, 99%, 99.5%, 99.6%, 99.7%, 99.8%, 99.9%, 99.95%, 99.97%, 99.99%, or 99.995% of the protected polynucleotides on an addressable device are chemically modified, and the pitch distance between addressable devices is no more than 1 micron. In some instances, at least 90%, 95%, 97%, 98%, 99%, 99.5%, 99.6%, 99.7%, 99.8%, 99.9%, 99.95%, 99.97%, 99.99%, or at least 99.995% of the protected polynucleotides on an addressable device are chemically modified, and the pitch distance between addressable devices is no more than 1 micron. In some instances, about 10%, 5%, 3%, 2%, 1%, 0.5%, 0.4%, 0.3%, 0.2%, 0.1%, 0.05%, 0.02%, 0.01%, 0.005%, 0.004%, 0.001%, or 0.0005% of the protected polynucleotides on an adjacent addressable device are chemically modified, and the pitch distance between addressable devices is no more than 1 micron. In some instances, no more than 10%, 5%, 3%, 2%, 1%, 0.5%, 0.4%, 0.3%, 0.2%, 0.1%, 0.05%, 0.02%, 0.01%, 0.005%, 0.004%, 0.001%, or no more than 0.0005% of the protected polynucleotides on an adjacent addressable device are chemically modified, and the pitch distance between addressable devices is no more than 1 micron.

Methods described herein may lead to reduced synthesis times for biomolecules. In some instances, the biomolecules comprise polynucleotides. In some instances, polynucleotides are synthesized at a rate of at least 10, 12, 14, 16, 18, 20, 22, 24, 26, 28, 30, 32, 34, 36, 38, 40, 45, 50, 55, 60, 75, or at least 100 nt/hr. In some instances, polynucleotides are synthesized at a rate of about 10, 12, 14, 16, 18, 20, 22, 24, 26, 28, 30, 32, 34, 36, 38, 40, 45, 50, 55, 60, 75, or at least 100 nt/hr. In some instances, polynucleotides are synthesized at a rate of 10-100, 10-75, 10-50, 10-25,7 15-25, 15-50, 15-75, 20-80, 20-50, 30-80, 30-50, 50-100, or 75-125 nt/hr.

Provided herein are methods of fabricating the devices and surfaces for polynucleotide synthesis. Described herein are layers integrated into a solid support. In some instances, layers comprise electrodes or are configured for use as electrodes. In some instances, electrodes are configured as cathodes or anodes. In some instances, an anode comprises a metal oxide. In some instances, nucleic acids are synthesized on an anode. In some instances, nucleic acids are synthesized on a metal oxide layer. In some instances, nucleic acids are synthesized on a porous metal oxide layer comprising a continuous metal layer beneath it. Electrodes in some instances comprise at least one conductor, and are fabricated of materials well known in the art. In some instances, electrodes comprise at least one conductor and one or more insulators or semi-conductors. Materials may comprise metals, non-metals, mixed-metal oxides, nitrides, carbides, silicon-based materials, or other material. In some instances, metal oxides include $TiO_2$, $Ta_2O_5$, $IrO_2$, $RuO_2$, $RhO_2$, $Nb_2O_5$, $Al_2O_3$, BaO, $Y_2O_3$, $HfO_2$, SrO or other metal oxide known in the art. In some instances, metal carbides include TiC, WC, $ThC_2$, ThC, VC, $W_2C$, ZrC, HfC, NbC, TaC, $Ta_2C$, or other metal carbide known in the art. In some instances, metal nitrides include GaN, InN, BN, $Be_3N_2$, $Cr_2N$, MoN, $Si_3N_4$, TaN, $Th_2N_2$, VN, ZrN, TiN, HfN, NbC, WN, TaN, or other metal nitride known in the art. In some instances, a device disclosed herein is manufactured with a combination of materials listed herein or any other suitable material known in the art.

Solid supports comprising layers may be coated with additional materials such as semiconductors or insulators. In some instances, a layer is configured for use as an electrode. In some instances, electrodes are coated with materials for biomolecule attachment and synthesis. In some instances, electrodes are coated with materials for polynucleotide attachment and synthesis. Each electrode can control one, or a plurality of different loci for synthesis. In some instances, each locus for synthesis has a density of polynucleotides. In some instances, the density is at least 1 biomolecule per 10 $nm^2$, 20 $nm^2$, 50 $nm^2$, 100 $nm^2$, 200 $nm^2$, 500 $nm^2$, 1,000 $nm^2$, 2,000 $nm^2$, 5,000 $nm^2$ or at least 1 oligo per 10,000 $nm^2$. In some instances, the density is about 1 biomolecule per 10 $nm^2$ to about 1 biomolecule per 5,000 $nm^2$, about 1 biomolecule per 50 $nm^2$ to about 1 biomolecule per 500 $nm^2$, or about 1 biomolecule per 25 $nm^2$ to about 1 biomolecule per 75 $nm^2$. In some instances, the density of polynucleotides is about 1 biomolecule per 25 $nm^2$ to about 1 biomolecule per 75 $nm^2$. In some instances, the density is at least 1 biomolecule per 10 $nm^2$, 20, 50, 100, 200, 500, 1,000, 2,000, 5,000 or at least 1 oligo per 10,000 $nm^2$. In some instances, the density is about 1 oligo per 10 $nm^2$ to about 1 oligo per 5,000 $nm^2$, about 1 oligo per 50 $nm^2$ to about 1 oligo per 500 $nm^2$, or about 1 oligo per 25 $nm^2$ to about 1 oligo per 75 $nm^2$. In some instances, the density of polynucleotides is about 1 oligo per 25 $nm^2$ to about 1 oligo per 75 $nm^2$.

Described herein are devices where two or more solid supports are assembled. In some instances, solid supports are interfaced together on a larger unit. Interfacing may comprise exchange of fluids, electrical signals, or other medium of exchange between solid supports. This unit may be capable of interface with any number of servers, computers, or networked devices. For example, a plurality of solid support is integrated onto a rack unit or mounted on a rack unit, which can be conveniently inserted or removed from a server rack. The rack unit may comprise any number of solid supports. In some instances the rack unit comprises about 1, 2, 5, 10, 20, 50, 100, 200, 500, 1000, 2000, 5000, 10,000, 20,000, 50,000, 100,000 or 100,000 solid supports. In some instances the rack unit comprises at least 1, 2, 5, 10, 20, 50, 100, 200, 500, 1000, 2000, 5000, 10,000, 20,000, 50,000, 100,000 or 100,000 solid supports. In some instances the rack unit comprises at most 1, 2, 5, 10, 20, 50, 100, 200, 500, 1000, 2000, 5000, 10,000, 20,000, 50,000, 100,000 or 100,000 solid supports. In some instances, all or a portion of the solid supports of a rack unit are in fluidic communication, electronic communication, or both. In some instances, the server rack comprises about 10, 20, 50, 80, 100, 200, 500, 800, or 1000 rack units. In some instances, the server rack comprises at least about 10, 20, 50, 80, 100, 200, 500, 800, or 1000 rack units. In some instances, the server rack comprises at most about 10, 20, 50, 80, 100, 200, 500, 800, or 1000 rack units. In some instances, all or a portion of the rack units of a rack server are in fluidic communication, electronic communication, or both. In some instances, two or more solid supports are not interfaced with each other. In some instances, two or more rack units comprising solid supports, such as those described herein, are stacked vertically. Fluidic communication, electronic communication, or both may be formed using, by way of non-limiting example, one or more tubes (e.g., microfluidic tubes), valves, actuators, robotics, etc.

Figure 9:
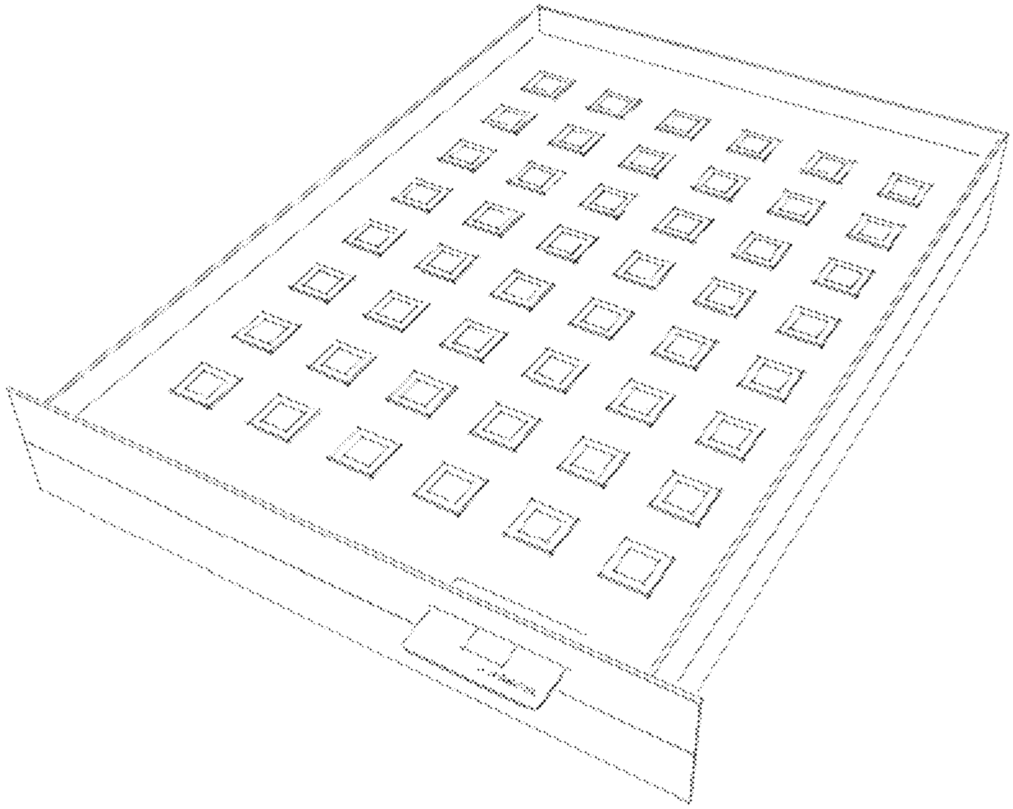
FIG. 9 is an example of rack-style instrument. Such instruments may comprise hundreds or thousands of solid support arrays according to some embodiments.
Figure 10A:
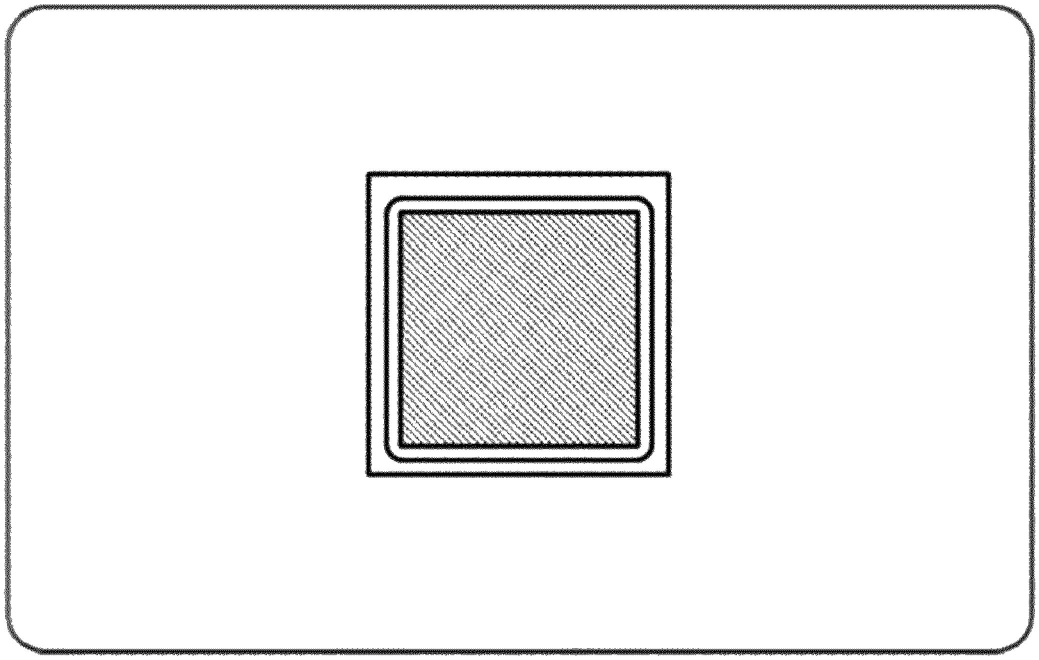
FIG. 10A is a front side of an example of a solid support array according to some embodiments. Such arrays in some instances may comprise thousands or millions of polynucleotide synthesis devices as described herein.
Figure 10B:
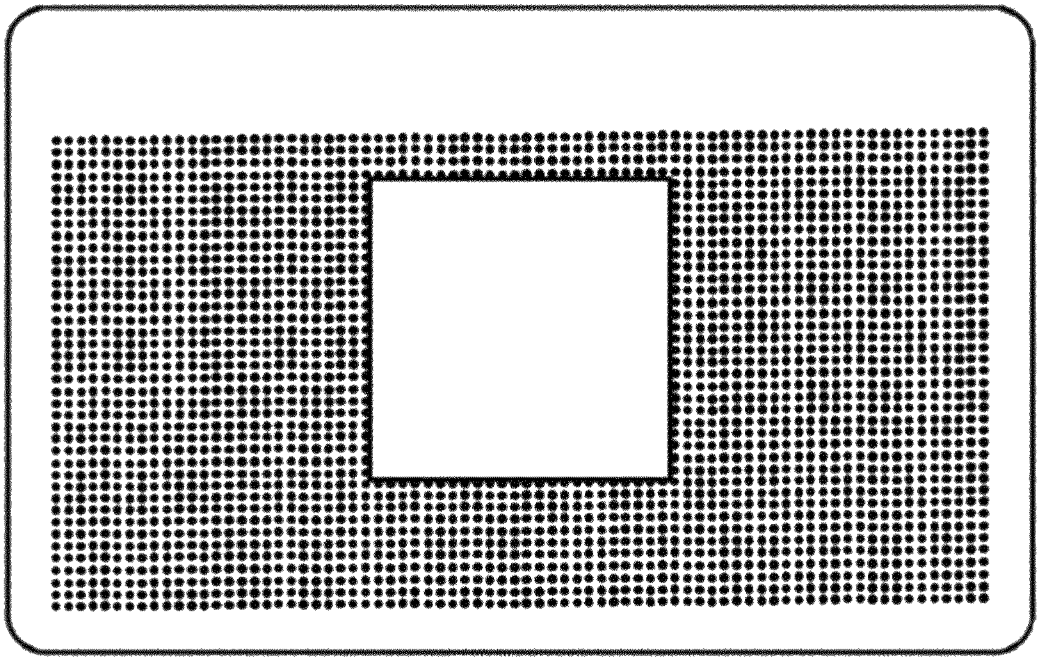
FIG. 10B is a back side of an example of a solid support array according to some embodiments.
Figure 11:
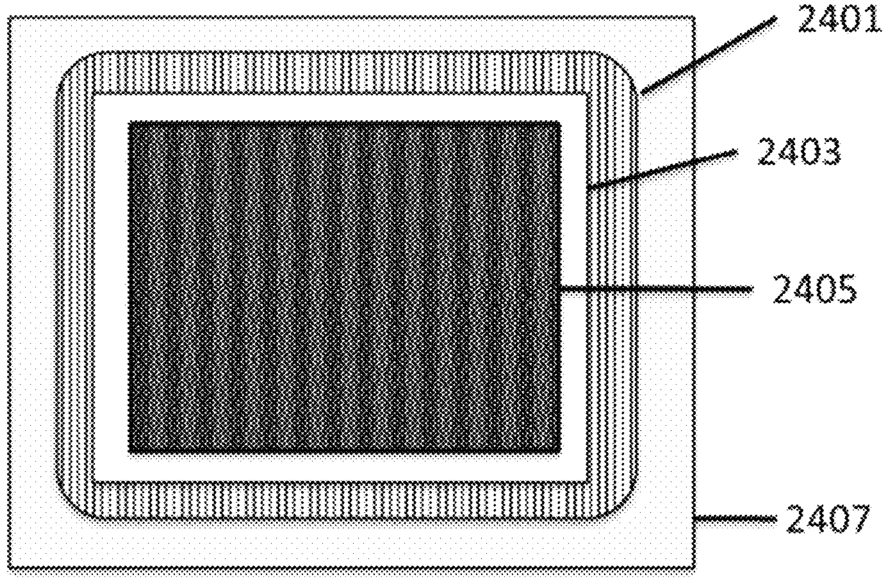
FIG. 11 is a schema of solid support comprising an active area and fluidics interface according to some embodiments.

Nucleic acids (and the information stored in them) present on solid supports can be accessed from the rack unit. See, e.g., FIG. 9. In some instances, solid supports are present on solid supports such as chips (FIGS. 10A-10B and FIG. 11). Access includes removal of polynucleotides from solid supports, direct analysis of polynucleotides on the solid support, or any other method which allows the information stored in the nucleic acids to be manipulated or identified. Information in some instances is accessed from a plurality of racks, a single rack, a single solid support in a rack, a portion of the solid support, or a single locus on a solid support. In various instances, access comprises interfacing nucleic acids with additional devices such as mass spectrometers, HPLC, sequencing instruments, PCR thermocyclers, or other device for manipulating nucleic acids. Access to nucleic acid information in some instances is achieved by cleavage of polynucleotides from all or a portion of a solid support.

In some instances, the rack unit or rack server is located in a data center. In some instances, the data center employs mechanical structures used for mounting conventional computing and data storage resources in rack units, for example, openings adapted to support disk drives, processing blades, or other computer equipment. In some instances, computer systems, such as those provided herein, are used to retrieve polynucleotides from one or more rack units on one or more rack servers. In some instances, a user (e.g., technician, researcher, customer, etc.), computer system, or both directs retrieval of one or more rack units on one or more rack servers. In some instances, a rack unit can be retrieved from a rack server using a robotic system, such as a robotic arm. In some instances, the robotic system is in communication with the computer system. The robotic system may be used to interface any component of a data storage system with another component of the data storage system. In some instances, interfacing comprises transferring, storing, moving, processing, or retrieving. In some instances, the robotic system moves a solid support between components (e.g., units or chambers) of the data storage system. A component may comprise, by way of non-limiting example, synthesis unit, storage unit, amplification unit, etc.

Cleavage in some instances comprises exposure to chemical reagents (ammonia or other reagent), electrical potential, radiation, heat, light, acoustics, or other form of energy capable of manipulating chemical bonds. In some instances, cleavage occurs by charging one or more electrodes in the vicinity of the polynucleotides. In some instances, electromagnetic radiation in the form of UV light is used for cleavage of polynucleotides. In some instances, a lamp is used for cleavage of polynucleotides, and a mask mediates exposure locations of the UV light to the surface. In some instances, a laser is used for cleavage of polynucleotides, and a shutter opened/closed state controls exposure of the UV light to the surface. In some instances, a computer system, such as those provided herein, directs the opened/closed state of the shutter. In some instances, access to nucleic acid information (including removal/addition of racks, solid supports, reagents, nucleic acids, or other component) is completely automated (e.g., using computer systems provided herein). In some instances, chips have one or more contacts. In some instances, chips comprise at least 5, 10, 15, 20, 25, 30, 35, 40, 45, 50, 55, 60, 75, 100, or more than 200 contacts.

Solid supports as described herein comprise an active area. In some instances, the active area comprises addressable solid supports, regions, or loci for nucleic acid synthesis. In some instances, the active area comprises addressable regions or loci for nucleic acid storage. In some instances, an active area is in fluid communication with solvents or other reagents. The active area comprises varying dimensions. For example, the dimension of the active area is between about 1 mm to about 50 mm by about 1 mm to about 50 mm. In some instances, the active area comprises a width of at least or about 0.5, 1, 1.5, 2, 2.5, 3, 5, 5, 10, 12, 14, 16, 18, 20, 25, 30, 35, 40, 45, 50, 60, 70, 80, or more than 80 mm. In some instances, the active area comprises a height of at least or about 0.5, 1, 1.5, 2, 2.5, 3, 5, 5, 10, 12, 14, 16, 18, 20, 25, 30, 35, 40, 45, 50, 60, 70, 80, or more than 80 mm. An exemplary active area within a solid support is seen in FIG. 11. A package 2407 comprises an active area 2405 within a solid support 2403. The package 2407 also comprises a fluidics interface 2401.

Described herein are devices, compositions, systems and methods for solid support based nucleic acid synthesis and storage. In some instances, the solid support has a number of sites (e.g., spots) or positions for synthesis or storage. In some instances, the solid support comprises up to or about 10,000 by 10,000 positions in an area. In some instances, the solid support comprises between about 1000 and 20,000 by between about 1000 and 20,000 positions in an area. In some instances, the solid support comprises at least or about 10, 30, 50, 75, 100, 200, 300, 400, 500, 1000, 2000, 3000, 4000, 5000, 6000, 7000, 8000, 9000, 10,000, 12,000, 14,000, 16,000, 18,000, 20,000 positions by least or about 10, 30, 50, 75, 100, 200, 300, 400, 500, 1000, 2000, 3000, 4000, 5000, 6000, 7000, 8000, 9000, 10,000, 12,000, 14,000, 16,000, 18,000, 20,000 positions in an area. In some instances, the area is up to 0.25, 0.5, 0.75, 1.0, 1.25, 1.5, or 2.0 inches squared. In some instances, the solid support comprises addressable loci having a pitch of at least or about 0.1, 0.2, 0.25, 0.3, 0.4, 0.5, 1.0, 1.5, 2.0, 2.5, 3.0, 3.5, 4.0, 4.5, 5, 6, 7, 8, 9, 10, or more than 10 um. In some instances, the solid support comprises addressable loci having a pitch of about 5 um. In some instances, the solid support comprises addressable loci having a pitch of about 2 um. In some instances, the solid support comprises addressable loci having a pitch of about 1 um. In some instances, the solid support comprises addressable loci having a pitch of about 0.2 um. In some instances, the solid support comprises addressable loci having a pitch of about 0.2 μm to about 10 um, about 0.2 to about 8 um, about 0.5 to about 10 um, about 1 μm to about 10 um, about 2 μm to about 8 um, about 3 μm to about 5 um, about 1 μm to about 3 μm or about 0.5 μm to about 3 um. In some instances, the solid support comprises addressable loci having a pitch of about 0.1 μm to about 3 um. In some instances, the solid support comprises addressable loci having a pitch of at least or about 0.01, 0.02, 0.025, 0.03, 0.04, 0.05, 0.1, 0.15, .02, 0.25, 0.30, 0.35, 0.4, 0.45, 0.5, 0.6, 0.7, 0.8, 0.9, 1, or more than 1 um. In some instances, the solid support comprises addressable loci having a pitch of about 0.5 um. In some instances, the solid support comprises addressable loci having a pitch of about 0.2 um. In some instances, the solid support comprises addressable loci having a pitch of about 0.1 um. In some instances, the solid support comprises addressable loci having a pitch of about 0.02 um. In some instances, the solid support comprises addressable loci having a pitch of about 0.02 μm to about 1 um, about 0.02 to about 0.8 um, about 0.05 to about 0.1 um, about 0.1 μm to about 1 um, about 0.2 μm to about 0.8 um, about 0.3 μm to about 0.5 um, about 0.1 μm to about 0.3 μm or about 0.05 μm to about 0.3 um. In some instances, the solid support comprises addressable loci having a pitch of about 0.01 μm to about 0.3 um. See e.g. FIGS. 7B-7C.

Devices described herein may comprise high-density addressable arrays for synthesis. In some instances, a device array comprises about 1, 10, 100, 500, 1000, 2000, 5000, 10,000, 20,000, 50,000, 1000,000, or 200,000 addressable loci per $mm^2$. In some instances, a device array comprises at least about 1, 10, 100, 500, 1000, 2000, 5000, 10,000, 20,000, 50,000, 1000,000, or at least 200,000 addressable loci per $mm^2$. In some instances, a device array comprises at most about 1, 10, 100, 500, 1000, 2000, 5000, 10,000, 20,000, 50,000, 1000,000, or at least 200,000 addressable loci per $mm^2$. In some instances, a device array comprises about 1-50,000, 1-10,000, 10-100,000, 50-100,000, 100-100,000, 100-50,000, 100-5000, 100-1000, 500-50,000, 500-10,000, 500-25,000, 1000-200,000, 1000-100,000, 1000-50,000, 1000-25,000, 1000-10,000, 5000-100,000, 5000-200,000, or 5000-50,000 loci per $mm^2$.

Structures for Biomolecule Synthesis

Provided herein are rigid or flexibles structures for biomolecule synthesis (e.g., polynucleotide synthesis). In the case of rigid structures, provided herein are devices having a structure for the generation of a library of polynucleotides. In some instances, the structure comprises a plate.

Figure 12A:
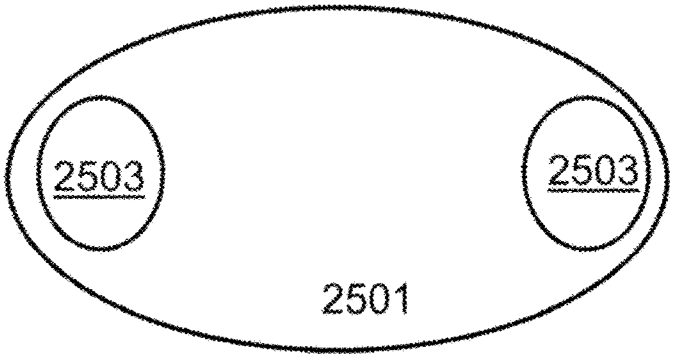
FIG. 12A depicts a continuous loop arrangements for flexible structures according to some embodiments.
Figure 12B:
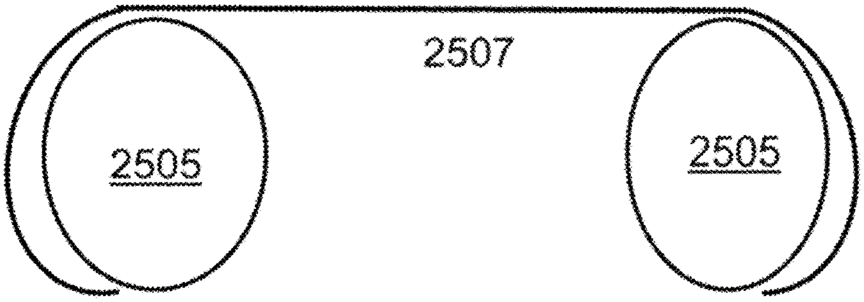
FIG. 12B depicts a reel-to-reel arrangements for flexible structures according to some embodiments.
Figure 12C:
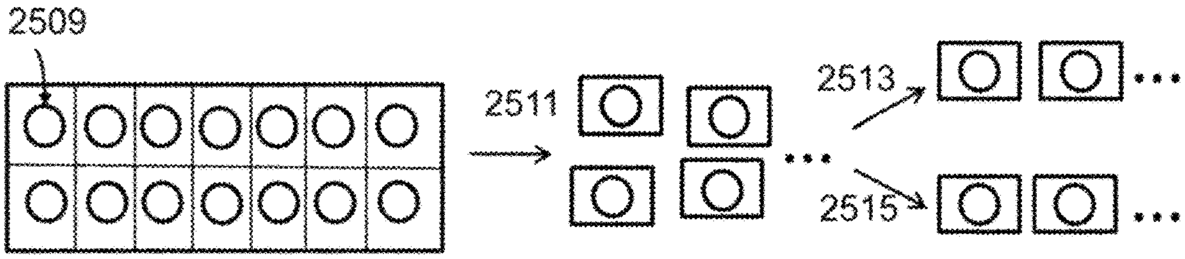
FIG. 12C depicts a schema for release and extraction of synthesized polynucleotides according to some embodiments.
Figure 12D:
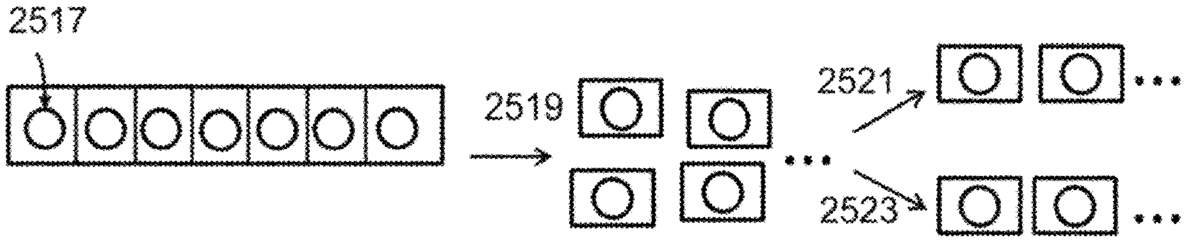
FIG. 12D depicts a schema for release and extraction of synthesized polynucleotides according to some embodiments.

In the case of flexible structures, provided herein are devices where the flexible structure comprises a continuous loop 2501 wrapped around one or more fixed structures, e.g., a pair of rollers 2503 or a non-continuous flexible structure 2507 wrapped around separate fixed structures, e.g., a pair reels 2505. See FIGS. 12A-12B. In some instances, the structures comprise multiple regions for polynucleotide synthesis. An exemplary structure is illustrated in FIG. 12C where a plate comprises distinct regions 2509 for polynucleotide synthesis. The distinct regions 2509 may be separated 2511 by breaking or cutting. Each of the distinct regions may be further released, sequenced, decrypted, and read 2513 or stored 2515. An alternative structure is illustrated in FIG. 12D in which a tape comprises distinct regions 2517 for polynucleotide synthesis. The distinct regions 2517 may be separated 2519 by breaking or cutting. Each of the distinct regions may be further released, sequenced, decrypted, and read 2521 or stored 2523. Provided herein are flexible structures having a surface with a plurality of loci for polynucleotide extension. In some instances, each locus of the structure has a width of about 10 μm and a distance between the center of each structure of about 21 um. In some instances, each locus of the structure has a width of about 1 μm and a distance between the center of each structure of about 2 um. In some instances, each locus of the structure has a width of about 0.1 μm and a distance between the center of each structure of about 0.2 um. Loci may comprise, without limitation, circular, rectangular, tapered, or rounded shapes. Alternatively or in combination, the structures are rigid. In some instances, the rigid structures comprise loci for polynucleotide synthesis. In some instances, the rigid structures comprise substantially planar regions, channels, or wells for polynucleotide synthesis. In some instances, structures are patterned on one or more layers of the device.

Wells described herein may comprise any sizes or dimensions. In some instances, a well described herein has a width to depth (or height) ratio of 1 to 0.01, wherein the width is a measurement of the width at the narrowest segment of the well. In some instances, a well described herein has a width to depth (or height) ratio of 0.5 to 0.01, wherein the width is a measurement of the width at the narrowest segment of the well. In some instances, a well described herein has a width to depth (or height) ratio of about 0.01, 0.05, 0.1, 0.15, 0.16, 0.2, 0.5, or 1. Provided herein are structures for polynucleotide synthesis comprising a plurality of discrete loci for polynucleotide synthesis. Exemplary structures for the loci include, without limitation, substantially planar regions, channels, wells or protrusions. Structures described herein may comprise a plurality of clusters, each cluster comprising a plurality of wells, loci or channels. Alternatively, structures described herein may comprise a homogenous arrangement of wells, loci or channels. Structures provided herein may comprise wells having a height or depth from about 5 μm to about 500 um, from about 5 μm to about 400 um, from about 5 μm to about 300 um, from about 5 μm to about 200 um, from about 5 μm to about 100 um, from about 5 μm to about 50 um, or from about 10 μm to about 50 um. In some instances, the height of a well is less than 100 um, less than 80 um, less than 60 um, less than 40 μm or less than 20 um. In some instances, well height is about 10, 20, 30, 40, 50, 60, 70, 80, 90, 100, 200, 300, 400, 500 μm or more. In some instances, the height or depth of the well is at least 10, 25, 50, 75, 100, 200, 300, 400, 500, 600, 700, 800, 900, 1000, or more than 1000 nm. In some instances, the height or depth of the well is in a range of about 10 nm to about 1000 nm, about 25 nm to about 900 nm, about 50 nm to about 800 nm, about 75 nm to about 700 nm, about 100 nm to about 600 nm, or about 200 nm to about 500. In some instances, the height or depth of the well is in a range of about 50 nm to about 1 um. In some instances, well height is about 10, 20, 30, 40, 50, 60, 70, 80, 90, 100, 200, 300, 400, 500, 700, 800, 900 or about 1000 nm.

Structures for polynucleotide synthesis provided herein may comprise channels. The channels may have a width to depth (or height) ratio of 1 to 0.01, where the width is a measurement of the width at the narrowest segment of the microchannel. In some instances, a channel described herein has a width to depth (or height) ratio of 0.5 to 0.01, where the width is a measurement of the width at the narrowest segment of the microchannel. In some instances, a channel described herein has a width to depth (or height) ratio of about 0.01, 0.05, 0.1, 0.15, 0.16, 0.2, 0.5, or 1.

Described herein are structures for polynucleotide synthesis comprising a plurality of discrete loci. Structures comprise, without limitation, substantially planar regions, channels, protrusions, or wells for polynucleotide synthesis. In some instances, structures described herein are provided comprising a plurality of channels, wherein the height or depth of the channel is from about 5 μm to about 500 μm, from about 5 μm to about 400 μm, from about 5 μm to about 300 μm, from about 5 μm to about 200 μm, from about 5 μm to about 100 μm, from about 5 μm to about 50 μm, or from about 10 μm to about 50 μm. In some cases, the height of a channel is less than 100 μm, less than 80 μm, less than 60 μm, less than 40 μm or less than 20 μm. In some cases, channel height is about 10, 20, 30, 40, 50, 60, 70, 80, 90, 100, 200, 300, 400, 500 μm or more. In some instances, the height or depth of the channel is at least 10, 25, 50, 75, 100, 200, 300, 400, 500, 600, 700, 800, 900, 1000, or more than 1000 nm. In some instances, the height or depth of the channel is in a range of about 10 nm to about 1000 nm, about 25 nm to about 900 nm, about 50 nm to about 800 nm, about 75 nm to about 700 nm, about 100 nm to about 600 nm, or about 200 nm to about 500. Channels described herein may be arranged on a surface in clusters or as a homogenous field.

The width of a locus on the surface of a structure for polynucleotide synthesis described herein may be from about 0.1 μm to about 500 μm, from about 0.5 μm to about 500 μm, from about 1 μm to about 200 μm, from about 1 μm to about 100 μm, from about 5 μm to about 100 μm, or from about 0.1 μm to about 100 μm, for example, about 90 μm, 80 μm, 70 μm, 60 μm, 50 μm, 40 μm, 30 μm, 20 μm, 10 μm, 5 μm, 1 μm or 0.5 μm. In some instances, the width of a locus is less than about 100 μm, 90 μm, 80 μm, 70 μm, 60 μm, 50 μm, 40 μm, 30 μm, 20 μm or 10 μm. In some instances, the width of a locus is at least 10, 25, 50, 75, 100, 200, 300, 400, 500, 600, 700, 800, 900, 1000, or more than 1000 nm. In some instances, the width of a locus is in a range of about 10 nm to about 1000 nm, about 25 nm to about 900 nm, about 50 nm to about 800 nm, about 75 nm to about 700 nm, about 100 nm to about 600 nm, or about 200 nm to about 500. In some instances, the width of a locus is in a range of about 50 nm to about 1000 nm. In some instances, the distance between the center of two adjacent loci is from about 0.1 μm to about 500 μm, 0.5 μm to about 500 μm, from about 1 μm to about 200 μm, from about 1 μm to about 100 μm, from about 5 μm to about 200 μm, from about 5 μm to about 100 μm, from about 5 μm to about 50 μm, or from about 5 μm to about 30 μm, for example, about 20 μm. In some instances, the total width of a locus is about 5 μm, 10 μm, 20 μm, 30 μm, 40 μm, 50 μm, 60 μm, 70 μm, 80 μm, 90 μm, or 100 μm. In some instances, the total width of a locus is about 1 μm to 100 μm, 30 μm to 100 μm, or 50 μm to 70 μm. In some instances, the distance between the center of two adjacent loci is from about 0.5 μm to about 2 μm, 0.5 μm to about 2 μm, from about 0.75 μm to about 2 μm, from about 1 μm to about 2 μm, from about 0.2 μm to about 1 μm, from about 0.5 μm to about 1.5 μm, from about 0.5 μm to about 0.8 μm, or from about 0.5 μm to about 1 μm, for example, about 1 μm. In some instances, the total width of a locus is about 50 nm, 0.1 μm, 0.2 μm, 0.3 μm, 0.4 μm, 0.5 μm, 0.6 μm, 0.7 μm, 0.8 μm, 0.9 μm, 1 μm, 1.1 μm, 1.2 μm, 1.3 μm, 1.4 μm, or 1.5 μm. In some instances, the total width of a locus is about 0.5 μm to 2 μm, 0.75 μm to 1 μm, or 0.9 μm to 2 μm. In some instances, a locus is substantially planer.

In some instances, each locus supports the synthesis of a population of polynucleotides having a different sequence than a population of polynucleotides grown on another locus. Provided herein are surfaces which comprise at least 10, 100, 256, 500, 1000, 2000, 3000, 4000, 5000, 6000, 7000, 8000, 9000, 10000, 11000, 12000, 13000, 14000, 15000, 20000, 30000, 40000, 50000 or more clusters. Provided herein are surfaces which comprise more than 2,000; 5,000; 10,000; 20,000; 30,000; 50,000; 100,000; 200,000; 300,000; 400,000; 500,000; 600,000; 700,000; 800,000; 900,000; 1,000,000; 5,000,000; or 10,000,000 or more distinct loci. In some cases, each cluster includes about 1, 2, 3, 4, 5, 6, 7, 8, 9, 10, 20, 30, 40, 50, 60, 70, 80, 90, 100, 120, 130, 150, 200, 500 or more loci. In some cases, each cluster includes about 50 to 500, 50 to 200, 50 to 150, or 100 to 150 loci. In some cases, each cluster includes 100 to 150 loci. In some instances, each cluster includes 109, 121, 130 or 137 loci.

Provided herein are loci having a width at the longest segment of about 5 to 100 μm. In some cases, the loci have a width at the longest segment of about 5, 10, 15, 20, 25, 30, 35, 40, 45, 50, 55, 60, 65, 70, 75, 80, 85, 90, 95, or 100 μm. In some cases, the loci are channels having multiple segments, wherein each segment has a center to center distance apart of 5 to 50 μm. In some cases, the center to center distance apart for each segment is about 5, 10, 15, 20, 25, 30, 35, 40, 45, or 50 μm.

Provided herein are loci having a width at the longest segment of 5 to 500 nm. In some cases, the loci have a width at the longest segment of about 5, 10, 15, 20, 25, 30, 35, 40, 45, 50, 55, 60, 65, 70, 75, 80, 85, 90, 95, or 100 nm. In some cases, the loci are channels having multiple segments, wherein each segment has a center to center distance apart of 5 to 50 nm. In some cases, the center to center distance apart for each segment is about 5, 10, 15, 20, 25, 30, 35, 40, 45, 50, 55, 60, 65, 70, 75, 80, 85, 90, 95, 100, 110, 120, 130, 140, 150, 150, 170, 180, 190 or 200 nm.

In some instances, the number of distinct polynucleotides synthesized on the surface of a structure described herein is dependent on the number of distinct loci available in the substrate. In some instances, the density of loci within a cluster of a substrate is at least or about 1 locus per $mm^2$, 10 loci per $mm^2$, 25 loci per $mm^2$, 50 loci per $mm^2$, 65 loci per $mm^2$, 75 loci per $mm^2$, 100 loci per $mm^2$, 130 loci per $mm^2$, 150 loci per $mm^2$, 175 loci per $mm^2$, 200 loci per $mm^2$, 300 loci per $mm^2$, 400 loci per $mm^2$, 500 loci per $mm^2$, 1,000 loci per $mm^2$, $10^4$ loci per $mm^2$, $10^5$ loci per $mm^2$, $10^6$ loci per $mm^2$, or more. In some cases, a substrate comprises from about 10 loci per $mm^2$ to about 500 $mm^2$, from about 25 loci per $mm^2$ to about 400 $mm^2$, from about 50 loci per $mm^2$ to about 500 $mm^2$, from about 100 loci per $mm^2$ to about 500 $mm^2$, from about 150 loci per $mm^2$ to about 500 $mm^2$, from about 10 loci per $mm^2$ to about 250 $mm^2$, from about 50 loci per $mm^2$ to about 250 $mm^2$, from about 10 loci per $mm^2$ to about 200 $mm^2$, or from about 50 loci per $mm^2$ to about 200 $mm^2$. In some cases, a substrate comprises from about $10^4$ loci per $mm^2$ to about $10^5$ $mm^2$. In some cases, a substrate comprises from about $10^5$ loci per $mm^2$ to about $10^7$ $mm^2$. In some cases, a substrate comprises at least $10^5$ loci per $mm^2$. In some cases, a substrate comprises at least $10^6$ loci per $mm^2$. In some cases, a substrate comprises at least $10^7$ loci per $mm^2$. In some cases, a substrate comprises from about $10^4$ loci per $mm^2$ to about $10^5$ $mm^2$. In some instances, the density of loci within a cluster of a substrate is at least or about 1 locus per $um^2$, 10 loci per $um^2$, 25 loci per $um^2$, 50 loci per $um^2$, 65 loci per $um^2$, 75 loci per $um^2$, 100 loci per $um^2$, 130 loci per $um^2$, 150 loci per $um^2$, 175 loci per $um^2$, 200 loci per $um^2$, 300 loci per $um^2$, 400 loci per $um^2$, 500 loci per $um^2$, 1,000 loci per $um^2$ or more. In some cases, a substrate comprises from about 10 loci per $um^2$ to about 500 $um^2$, from about 25 loci per $um^2$ to about 400 $um^2$, from about 50 loci per $um^2$ to about 500 $um^2$, from about 100 loci per $um^2$ to about 500 $um^2$, from about 150 loci per $um^2$ to about 500 $um^2$, from about 10 loci per $um^2$ to about 250 $um^2$, from about 50 loci per $um^2$ to about 250 $um^2$, from about 10 loci per $um^2$ to about 200 $um^2$, or from about 50 loci per $um^2$ to about 200 $um^2$.

In some instances, the distance between the centers of two adjacent loci within a cluster is from about 10 μm to about 500 um, from about 10 μm to about 200 um, or from about 10 μm to about 100 um. In some cases, the distance between two centers of adjacent loci is greater than about 10 um, 20 um, 30 um, 40 um, 50 um, 60 um, 70 um, 80 um, 90 μm or 100 um. In some cases, the distance between the centers of two adjacent loci is less than about 200 um, 150 um, 100 um, 80 um, 70 um, 60 um, 50 um, 40 um, 30 um, 20 μm or 10 um. In some cases, the distance between the centers of two adjacent loci is less than about 10000 nm, 8000 nm, 6000 nm, 4000 nm, 2000 nm 1000 nm, 800 nm, 600 nm, 400 nm, 200 nm, 150 nm, 100 nm, 80 um, 70 nm, 60 nm, 50 nm, 40 nm, 30 nm, 20 nm or 10 nm. In some instances, each square meter of a structure described herein allows for at least $10^7$, $10^8$, $10^9$, $10^{10}$, $10^{11}$ loci, where each locus supports one polynucleotide. In some instances, $10^9$ polynucleotides are supported on less than about 6, 5, 4, 3, 2 or 1 $m^2$ of a structure described herein.

In some instances, a structure described herein provides support for the synthesis of more than 2,000; 5,000; 10,000; 20,000; 30,000; 50,000; 100,000; 200,000; 300,000; 400,000; 500,000; 600,000; 700,000; 800,000; 900,000; 1,000,000; 1,200,000; 1,400,000; 1,600,000; 1,800,000; 2,000,000; 2,500,000; 3,000,000; 3,500,000; 4,000,000; 4,500,000; 5,000,000; 10,000,000 or more non-identical polynucleotides. In some cases, the structure provides support for the synthesis of more than 2,000; 5,000; 10,000; 20,000; 50,000; 100,000; 200,000; 300,000; 400,000; 500,000; 600,000; 700,000; 800,000; 900,000; 1,000,000; 1,200,000; 1,400,000; 1,600,000; 1,800,000; 2,000,000; 2,500,000; 3,000,000; 3,500,000; 4,000,000; 4,500,000; 5,000,000; 10,000,000 or more polynucleotides encoding for distinct sequences. In some instances, at least a portion of the polynucleotides have an identical sequence or are configured to be synthesized with an identical sequence. In some instances, the structure provides a surface environment for the growth of polynucleotides having at least 50, 60, 70, 75, 80, 85, 90, 95, 100, 110, 120, 130, 140, 150, 160, 175, 200, 225, 250, 275, 300, 325, 350, 375, 400, 425, 450, 475, 500 bases or more. In some arrangements, structures for polynucleotide synthesis described herein comprise sites for polynucleotide synthesis in a uniform arrangement.

In some instances, polynucleotides are synthesized on distinct loci of a structure, wherein each locus supports the synthesis of a population of polynucleotides. In some cases, each locus supports the synthesis of a population of polynucleotides having a different sequence than a population of polynucleotides grown on another locus. In some instances, the loci of a structure are located within a plurality of clusters. In some instances, a structure comprises at least 10, 500, 1000, 2000, 3000, 4000, 5000, 6000, 7000, 8000, 9000, 10000, 11000, 12000, 13000, 14000, 15000, 20000, 30000, 40000, 50000 or more clusters. In some instances, a structure comprises more than 2,000; 5,000; 10,000; 100,000; 200,000; 300,000; 400,000; 500,000; 600,000; 700,000; 800,000; 900,000; 1,000,000; 1,100,000; 1,200,000; 1,300,000; 1,400,000; 1,500,000; 1,600,000; 1,700,000; 1,800,000; 1,900,000; 2,000,000; 300,000; 400,000; 500,000; 600,000; 700,000; 800,000; 900,000; 1,000,000; 1,200,000; 1,400,000; 1,600,000; 1,800,000; 2,000,000; 2,500,000; 3,000,000; 3,500,000; 4,000,000; 4,500,000; 5,000,000; or 10,000,000 or more distinct loci. In some cases, each cluster includes 1, 2, 3, 4, 5, 6, 7, 8, 9, 10, 20, 30, 40, 50, 60, 70, 80, 90, 100, 120, 130, 150 or more loci. In some instances, each cluster includes 50 to 500, 100 to 150, or 100 to 200 loci. In some instances, each cluster includes 109, 121, 130 or 137 loci. In some instances, each cluster includes 5, 6, 7, 8, 9, 10, 11 or 12 loci. In some instances, polynucleotides from distinct loci within one cluster have sequences that, when assembled, encode for a contiguous longer polynucleotide of a predetermined sequence.

Structure Size

In some instances, a structure described herein is about the size of a plate (e.g., chip or wafer), for example between about 40 and 120 mm by between about 25 and 100 mm. In some instances, a structure described herein has a diameter less than or equal to about 1000 mm, 500 mm, 450 mm, 400 mm, 300 mm, 250 nm, 200 mm, 150 mm, 100 mm or 50 mm. In some instances, the diameter of a substrate is between about 25 mm and 1000 mm, between about 25 mm and about 800 mm, between about 25 mm and about 600 mm, between about 25 mm and about 500 mm, between about 25 mm and about 400 mm, between about 25 mm and about 300 mm, or between about 25 mm and about 200. Non-limiting examples of substrate size include about 300 mm, 200 mm, 150 mm, 130 mm, 100 mm, 84 mm, 76 mm, 54 mm, 51 mm and 25 mm. In some instances, a substrate has a planar surface area of at least 100 $mm^2$; 200 $mm^2$; 500 $mm^2$; 1,000 $mm^2$; 2,000 $mm^2$; 4,500 $mm^2$; 5,000 $mm^2$; 10,000 $mm^2$; 12,000 $mm^2$; 15,000 $mm^2$; 20,000 $mm^2$; 30,000 $mm^2$; 40,000 $mm^2$; 50,000 $mm^2$ or more. In some instances, the thickness is between about 50 mm and about 2000 mm, between about 50 mm and about 1000 mm, between about 100 mm and about 1000 mm, between about 200 mm and about 1000 mm, or between about 250 mm and about 1000 mm. Non-limiting examples thickness include 275 mm, 375 mm, 525 mm, 625 mm, 675 mm, 725 mm, 775 mm and 925 mm. In some instances, the thickness is at least or about 0.5 mm, 1.0 mm, 1.5 mm, 2.0 mm, 2.5 mm, 3.0 mm, 3.5 mm, 4.0 mm, or more than 4.0 mm. In some cases, the thickness of varies with diameter and depends on the composition of the substrate. For example, a structure comprising materials other than silicon may have a different thickness than a silicon structure of the same diameter. Structure thickness may be determined by the mechanical strength of the material used and the structure must be thick enough to support its own weight without cracking during handling. In some instances, a structure is more than about 1, 2, 3, 4, 5, 10, 15, 30, 40, 50 feet in any one dimension. In some instances, a structure comprises an array of polynucleotide synthesis devices. In some instances, a structure is integrated into a CMOS.

Materials

Provided herein are devices comprising a surface, wherein the surface is modified to support polynucleotide synthesis at predetermined locations and with a resulting low error rate, a low dropout rate, a high yield, and a high oligo representation. In some instances, surfaces of devices for polynucleotide synthesis provided herein are fabricated from a variety of materials capable of modification to support a de novo polynucleotide synthesis reaction. In some cases, the devices are sufficiently conductive, e.g., are able to form uniform electric fields across all or a portion of the devices. In some instances, devices comprises one or more conducting layers. Devices described herein may comprise a flexible material. Exemplary flexible materials include, without limitation, modified nylon, unmodified nylon, nitrocellulose, and polypropylene. Devices described herein may comprise a rigid material. Exemplary rigid materials include, without limitation, glass, fuse silica, silicon, silicon dioxide, silicon nitride, plastics (for example, polytetrafluoroethylene, polypropylene, polystyrene, polycarbonate, and blends thereof, and metals (for example, gold, platinum). Devices disclosed herein may be fabricated from a material comprising silicon, polystyrene, agarose, dextran, cellulosic polymers, polyacrylamides, polydimethylsiloxane (PDMS), glass, or any combination thereof. In some cases, devices disclosed herein are manufactured with a combination of materials listed herein or any other suitable material known in the art.

Devices described herein may comprise material having a range of tensile strength. Exemplary materials having a range of tensile strengths include, but are not limited to, nylon (70 MPa), nitrocellulose (1.5 MPa), polypropylene (40 MPa), silicon (268 MPa), polystyrene (40 MPa), agarose (1-10 MPa), polyacrylamide (1-10 MPa), polydimethylsiloxane (PDMS) (3.9-10.8 MPa). Solid supports described herein can have a tensile strength from 1 to 300, 1 to 40, 1 to 10, 1 to 5, or 3 to 11 MPa. Solid supports described herein can have a tensile strength of about 1, 1.5, 2, 3, 4, 5, 6, 7, 8, 9, 10, 11, 20, 25, 40, 50, 60, 70, 80, 90, 100, 150, 200, 250, 270, or more MPa. In some instances, a device described herein comprises a solid support for polynucleotide synthesis that is in the form of a flexible material capable of being stored in a continuous loop or reel, such as a tape or flexible sheet.

Young's modulus measures the resistance of a material to elastic (recoverable) deformation under load. Exemplary materials having a range of Young's modulus stiffness include, but are not limited to, nylon (3 GPa), nitrocellulose (1.5 GPa), polypropylene (2 GPa), silicon (150 GPa), polystyrene (3 GPa), agarose (1-10 GPa), polyacrylamide (1-10 GPa), polydimethylsiloxane (PDMS) (1-10 GPa). Solid supports described herein can have a Young's moduli from 1 to 500, 1 to 40, 1 to 10, 1 to 5, or 3 to 11 GPa. Solid supports described herein can have a Young's moduli of about 1, 1.5, 2, 3, 4, 5, 6, 7, 8, 9, 10, 11, 20, 25, 40, 50, 60, 70, 80, 90, 100, 150, 200, 250, 400, 500 GPa, or more. As the relationship between flexibility and stiffness are inverse to each other, a flexible material has a low Young's modulus and changes its shape considerably under load. In some instances, a solid support described herein has a surface with a flexibility of at least nylon.

In some cases, devices disclosed herein comprise a silicon dioxide base and a surface layer of silicon oxide. Alternatively, the devices may have a base of silicon oxide. Surface of the devices provided here may be textured, resulting in an increase overall surface area for polynucleotide synthesis. Devices disclosed herein in some instances comprise at least 5%, 10%, 25%, 50%, 80%, 90%, 95%, or 99% silicon. Devices disclosed herein in some instances are fabricated from silicon on insulator (SOI) wafer.

The structure may be fabricated from a variety of materials, suitable for the methods and compositions of the devices described herein. In some instances, the materials from which the substrates/solid supports of the devices are fabricated exhibit a low level of polynucleotide binding. In some situations, material that are transparent to visible and/or UV light can be employed. Materials that are sufficiently conductive, e.g. those that can form uniform electric fields across all or a portion of the substrates/solids support described herein, can be utilized. In some instances, such materials may be connected to an electric ground. In some cases, the substrate or solid support can be heat conductive or insulated. The materials can be chemical resistant and heat resistant to support chemical or biochemical reactions such as a series of polynucleotide synthesis reactions. For flexible materials, materials of interest can include: nylon, both modified and unmodified, nitrocellulose, polypropylene, and the like.

For rigid materials, specific materials of interest include: glass; fuse silica; silicon, plastics (for example polytetrafluoroethylene, polypropylene, polystyrene, polycarbonate, and blends thereof, and the like); metals (for example, gold, platinum, and the like). The structure can be fabricated from a material selected from the group consisting of silicon, polystyrene, agarose, dextran, cellulosic polymers, polyacrylamides, polydimethylsiloxane (PDMS), and glass. The substrates/solid supports or the microstructures, reactors therein may be manufactured with a combination of materials listed herein or any other suitable material known in the art.

In some instances, a substrate disclosed herein comprises a computer readable material. Computer readable materials include, without limitation, magnetic media, reel-to-reel tape, cartridge tape, cassette tape, flexible disk, paper media, film, microfiche, continuous tape (e.g., a belt) and any media suitable for storing electronic instructions. In some cases, the substrate comprises magnetic reel-to-reel tape or a magnetic belt. In some instances, the substrate comprises a flexible printed circuit board.

Structures described herein may be transparent to visible and/or UV light. In some instances, structures described herein are sufficiently conductive to form uniform electric fields across all or a portion of a structure. In some instances, structures described herein are heat conductive or insulated. In some instances, the structures are chemical resistant and heat resistant to support a chemical reaction such as a polynucleotide synthesis reaction. In some instances, the substrate is magnetic. In some instances, the structures comprise a metal or a metal alloy. Structures described herein may be integrated into a rack, such as a rack unit in a rack server, described herein.

Structures for polynucleotide synthesis may be over 1, 2, 5, 10, 30, 50 or more feet long in any dimension. In the case of a flexible structure, the flexible structure is optionally stored in a wound state, e.g., in a reel. In the case of a large rigid structure, e.g., greater than 1 foot in length, the rigid structure can be stored vertically or horizontally.

Surface Preparation

Provided herein are methods to support the immobilization of a biomolecule on a substrate, where a surface of a structure described herein comprises a material and/or is coated with a material that facilitates a coupling reaction with the biomolecule for attachment. To prepare a structure for biomolecule immobilization, surface modifications may be employed that chemically and/or physically alter the substrate surface by an additive or subtractive process to change one or more chemical and/or physical properties of a substrate surface or a selected site or region of the surface. For example, surface modification involves one or more of: (1) changing the wetting properties of a surface, (2) functionalizing a surface, e.g. providing, modifying or substituting surface functional groups, (3) defunctionalizing a surface, e.g. removing surface functional groups, (4) otherwise altering the chemical composition of a surface, e.g., through etching, (5) increasing or decreasing surface roughness, (6) providing a coating on a surface, e.g., a coating that exhibits wetting properties that are different from the wetting properties of the surface, and/or (7) depositing particulates on a surface. In some instances, the surface of a structure is selectively functionalized to produce two or more distinct areas on a structure, wherein at least one area has a different surface or chemical property that another area of the same structure. Such properties include, without limitation, surface energy, chemical termination, surface concentration of a chemical moiety, and the like.

In some instances, a surface of a structure disclosed herein is modified to comprise one or more actively functionalized surfaces configured to bind to both the surface of the substrate and a biomolecule, thereby supporting a coupling reaction to the surface. In some instances, the surface is also functionalized with a passive material that does not efficiently bind the biomolecule, thereby preventing biomolecule attachment at sites where the passive functionalization agent is bound. In some cases, the surface comprises an active layer only defining distinct loci for biomolecule support.

In some instances, the surface is contacted with a mixture of functionalization groups which are in any different ratio. In some instances, a mixture comprises at least 2, 3, 4, 5 or more different types of functionalization agents. In some cases, the ratio of the at least two types of surface functionalization agents in a mixture is about 1:1, 1:2, 1:5, 1:10, 2:10, 3:10, 4:10, 5:10, 6:10, 7:10, 8:10, 9:10, or any other ratio to achieve a desired surface representation of two groups. In some instances, desired surface tensions, wettabilities, water contact angles, and/or contact angles for other suitable solvents are achieved by providing a substrate surface with a suitable ratio of functionalization agents. In some cases, the agents in a mixture are chosen from suitable reactive and inert moieties, thus diluting the surface density of reactive groups to a desired level for downstream reactions. In some instances, the mixture of functionalization reagents comprises one or more reagents that bind to a biomolecule and one or more reagents that do not bind to a biomolecule. Therefore, modulation of the reagents allows for the control of the amount of biomolecule binding that occurs at a distinct area of functionalization.

In some instances, a method for substrate functionalization comprises deposition of a silane molecule onto a surface of a substrate. The silane molecule may be deposited on a high energy surface of the substrate. In some instances, the high surface energy region includes a passive functionalization reagent. Methods described herein provide for a silane group to bind the surface, while the rest of the molecule provides a distance from the surface and a free hydroxyl group at the end to which a biomolecule attaches. In some instances, the silane is an organofunctional alkoxysilane molecule. Non-limiting examples of organofunctional alkoxysilane molecules include dimethylchloro-octodecyl-silane, methyldichloro-octodecyl-silane, trichloro-octodecyl-silane, and trimethyl-octodecyl-silane, triethyl-octodecyl-silane. In some instances, the silane is an amino silane. Examples of amino silanes include, without limitation, 11-acetoxyundecyltriethoxysilane, n-decyltriethoxysilane, (3-aminopropyl)trimethoxysilane, (3-aminopropyl)triethoxysilane, glycidyloxypropyl/trimethoxysilane and N-(3-triethoxysilylpropyl)-4-hydroxybutyramide. In some instances, the silane comprises 11-acetoxyundecyltriethoxysilane, n-decyltriethoxysilane, (3-aminopropyl)trimethoxysilane, (3-aminopropyl)triethoxysilane, glycidyloxypropyl/trimethoxysilane, N-(3-triethoxysilylpropyl)-4-hydroxybutyramide, or any combination thereof. In some instances, an active functionalization agent comprises 11-acetoxyundecyltriethoxysilane. In some instances, an active functionalization agent comprises n-decyltriethoxysilane. In some cases, an active functionalization agent comprises glycidyloxypropyltriethoxysilane (GOPS). In some instances, the silane is a fluorosilane. In some instances, the silane is a hydrocarbon silane. In some cases, the silane is 3-iodo-propyltrimethoxysilane. In some cases, the silane is octylchlorosilane.

In some instances, silanization is performed on a surface through self-assembly with organofunctional alkoxysilane molecules. The organofunctional alkoxysilanes are classified according to their organic functions. Non-limiting examples of siloxane functionalizing reagents include hydroxyalkyl siloxanes (silylate surface, functionalizing with diborane and oxidizing the alcohol by hydrogen peroxide), diol (dihydroxyalkyl) siloxanes (silylate surface, and hydrolyzing to diol), aminoalkyl siloxanes (amines require no intermediate functionalizing step), glycidoxysilanes (3-glycidoxypropyl-dimethyl-ethoxysilane, glycidoxy-trimethoxysilane), mercaptosilanes (3-mercaptopropyl-trimethoxysilane, 3-4 epoxycyclohexyl-ethyltrimethoxysilane or 3-mercaptopropyl-methyl-dimethoxysilane), bicyclohepthenyl-trichlorosilane, butyl-aldehydr-trimethoxysilane, or dimeric secondary aminoalkyl siloxanes. Exemplary hydroxyalkyl siloxanes include allyl trichlorochlorosilane turning into 3-hydroxypropyl, or 7-oct-1-enyl trichlorochlorosilane turning into 8-hydroxyoctyl. The diol (dihydroxyalkyl) siloxanes include glycidyl trimethoxysilane-derived (2,3-dihydroxypropyloxy)propyl (GOPS). The aminoalkyl siloxanes include 3-aminopropyl trimethoxysilane turning into 3-aminopropyl (3-aminopropyl-triethoxysilane, 3-aminopropyl-diethoxy-methylsilane, 3-aminopropyl-dimethyl-ethoxysilane, or 3-aminopropyl-trimethoxysilane). In some cases, the dimeric secondary aminoalkyl siloxanes is bis (3-trimethoxysilylpropyl) amine turning into bis(silyloxylpropyl)amine.

Active functionalization areas may comprise one or more different species of silanes, for example, 1, 2, 3, 4, 5, 6, 7, 8, 9, 10 or more silanes. In some cases, one of the one or more silanes is present in the functionalization composition in an amount greater than another silane. For example, a mixed silane solution having two silanes comprises a 99:1, 98:2, 97:3, 96:4, 95:5, 94:6, 93:7, 92:8, 91:9, 90:10, 89:11, 88:12, 87:13, 86:14, 85:15, 84:16, 83:17, 82:18, 81:19, 80:20, 75:25, 70:30, 65:35, 60:40, 55:45 ratio of one silane to another silane. In some instances, an active functionalization agent comprises 11-acetoxyundecyltriethoxysilane and n-decyltriethoxysilane. In some instances, an active functionalization agent comprises 11-acetoxyundecyltriethoxysilane and n-decyltriethoxysilane in a ratio from about 20:80 to about 1:99, or about 10:90 to about 2:98, or about 5:95.

In some instances, functionalization comprises deposition of a functionalization agent to a structure by any deposition technique, including, but not limiting to, chemical vapor deposition (CVD), atomic layer deposition (ALD), plasma enhanced CVD (PECVD), plasma enhanced ALD (PEALD), metal organic CVD (MOCVD), hot wire CVD (HWCVD), initiated CVD (iCVD), modified CVD (MCVD), vapor axial deposition (VAD), outside vapor deposition (OVD), physical vapor deposition (e.g., sputter deposition, evaporative deposition), and molecular layer deposition (MLD).

Any step or component in the following functionalization process be omitted or changed in accordance with properties desired of the final functionalized substrate. In some cases, additional components and/or process steps are added to the process workflows embodied herein. In some instances, a substrate is first cleaned, for example, using a piranha solution. An example of a cleaning process includes soaking a substrate in a piranha solution (e.g., 90% $H_2SO_4$, 10% $H_2O_2$) at an elevated temperature (e.g., 120° C.) and washing (e.g., water) and drying the substrate (e.g., nitrogen gas). The process optionally includes a post piranha treatment comprising soaking the piranha treated substrate in a basic solution (e.g., $NH_4OH$) followed by an aqueous wash (e.g., water). In some instances, a surface of a structure is plasma cleaned, optionally following the piranha soak and optional post piranha treatment. An example of a plasma cleaning process comprises an oxygen plasma etch. In some instances, the surface is deposited with an active functionalization agent following by vaporization. In some instances, the substrate is actively functionalized prior to cleaning, for example, by piranha treatment and/or plasma cleaning.

The process for surface functionalization optionally comprises a resist coat and a resist strip. In some instances, following active surface functionalization, the substrate is spin coated with a resist, for example, SPR™ 3612 positive photoresist. The process for surface functionalization, in various instances, comprises lithography with patterned functionalization. In some instances, photolithography is performed following resist coating. In some instances, after lithography, the surface is visually inspected for lithography defects. The process for surface functionalization, in some instances, comprises a cleaning step, whereby residues of the substrate are removed, for example, by plasma cleaning or etching. In some instances, the plasma cleaning step is performed at some step after the lithography step.

In some instances, a surface coated with a resist is treated to remove the resist, for example, after functionalization and/or after lithography. In some cases, the resist is removed with a solvent, for example, with a stripping solution comprising N-methyl-2-pyrrolidone. In some cases, resist stripping comprises sonication or ultrasonication. In some instances, a resist is coated and stripped, followed by active functionalization of the exposed areas to create a desired differential functionalization pattern.

In some instances, the methods and compositions described herein relate to the application of photoresist for the generation of modified surface properties in selective areas, wherein the application of the photoresist relies on the fluidic properties of the surface defining the spatial distribution of the photoresist. Without being bound by theory, surface tension effects related to the applied fluid may define the flow of the photoresist. For example, surface tension and/or capillary action effects may facilitate drawing of the photoresist into small structures in a controlled fashion before the resist solvents evaporate. In some instances, resist contact points are pinned by sharp edges, thereby controlling the advance of the fluid. The underlying structures may be designed based on the desired flow patterns that are used to apply photoresist during the manufacturing and functionalization processes. A solid organic layer left behind after solvents evaporate may be used to pursue the subsequent steps of the manufacturing process. Structures may be designed to control the flow of fluids by facilitating or inhibiting wicking effects into neighboring fluidic paths. For example, a structure is designed to avoid overlap between top and bottom edges, which facilitates the keeping of the fluid in top structures allowing for a particular disposition of the resist. In an alternative example, the top and bottom edges overlap, leading to the wicking of the applied fluid into bottom structures. Appropriate designs may be selected accordingly, depending on the desired application of the resist.

In some instances, a structure described herein has a surface that comprises a material having thickness of at least or at least 0.1 nm, 0.5 nm, 1 nm, 2 nm, 5 nm, 10 nm or 25 nm that comprises a reactive group capable of binding nucleosides. Exemplary include, without limitation, glass and silicon, such as silicon dioxide and silicon nitride. In some cases, exemplary surfaces include nylon and PMMA.

In some instances, electromagnetic radiation in the form of UV light is used for surface patterning. In some instances, a lamp is used for surface patterning, and a mask mediates exposure locations of the UV light to the surface. In some instances, a laser is used for surface patterning, and a shutter opened/closed state controls exposure of the UV light to the surface. The laser arrangement may be used in combination with a flexible structure that is capable of moving. In such an arrangement, the coordination of laser exposure and flexible structure movement is used to create patterns of one or more agents having differing nucleoside coupling capabilities.

Described herein are surfaces for polynucleotide synthesis that are reusable. After synthesis and/or cleavage of polynucleotides, a surface may be bathed, washed, cleaned, baked, etched, or otherwise functionally restored to a condition suitable for subsequent polynucleotide synthesis. The number of times a surface is reused and the methods for recycling/preparing the surface for reuse vary depending on subsequent applications. Surfaces prepared for reuse are in some instances reused about 1, 2, 3, 5, 10, 20, 50, 100, 1,000 or more times. Surfaces prepared for reuse are in some instances reused at least 1, 2, 3, 5, 10, 20, 50, 100, 1,000 or more times. In some instances, the remaining "life" or number of times a surface is suitable for reuse is measured or predicted.

Material Deposition Systems

In some cases, the synthesized polynucleotides are stored on the substrate, for example a solid support. Nucleic acid reagents may be deposited on the substrate surface in a non-continuous, or drop-on-demand method. Examples of such methods include the electromechanical transfer method, electric thermal transfer method, and electrostatic attraction method. In the electromechanical transfer method, piezoelectric elements deformed by electrical pulses cause the droplets to be ejected. In the electric thermal transfer method, bubbles are generated in a chamber of the device, and the expansive force of the bubbles causes the droplets to be ejected. In the electrostatic attraction method, electrostatic force of attraction is used to eject the droplets onto the substrate. In some cases, the drop frequency is from about 5 KHz to about 500 KHz; from about 5 KHz to about 100 KHz; from about 10 KHz to about 500 KHz; from about 10 KHz to about 100 KHz; or from about 50 KHz to about 500 KHz. In some cases, the frequency is less than about 500 KHz, 200 KHz, 100 KHz, or 50 KHz.

The size of the droplets dispensed correlates to the resolution of the device. In some instances, the devices deposit droplets of reagents at sizes from about 0.01 pl to about 20 pl, from about 0.01 pl to about 10 pl, from about 0.01 pl to about 1 pl, from about 0.01 pl to about 0.5 pl, from about 0.01 pl to about 0.01 pl, or from about 0.05 pl to about 1 pl. In some instances, the droplet size is less than about 1 pl, 0.5 pl, 0.2 pl, 0.1 pl, or 0.05 pl.

In some arrangements, the configuration of a polynucleotide synthesis system allows for a continuous polynucleotide synthesis process that exploits the flexibility of a substrate for traveling in a reel-to-reel type process. This synthesis process operates in a continuous production line manner with the substrate travelling through various stages of polynucleotide synthesis using one or more reels to rotate the position of the substrate. In an exemplary instance, a polynucleotide synthesis reaction comprises rolling a substrate: through a solvent bath, beneath a deposition device for phosphoramidite deposition, through a bath of oxidizing agent, through an acetonitrile wash bath, and through a deblock bath. Optionally, the tape is also traversed through a capping bath. A reel-to-reel type process allows for the finished product of a substrate comprising synthesized polynucleotides to be easily gathered on a take-up reel, where it can be transported for further processing or storage.

In some arrangements, polynucleotide synthesis proceeds in a continuous process as a continuous flexible tape is conveyed along a conveyor belt system. Similar to the reel-to-reel type process, polynucleotide synthesis on a continuous tape operates in a production line manner, with the substrate travelling through various stages of polynucleotide synthesis during conveyance. However, in a conveyor belt process, the continuous tape revisits a polynucleotide synthesis step without rolling and unrolling of the tape, as in a reel-to-reel process. In some arrangements, polynucleotide synthesis steps are partitioned into zones and a continuous tape is conveyed through each zone one or more times in a cycle. For example, a polynucleotide synthesis reaction may comprise (1) conveying a substrate through a solvent bath, beneath a deposition device for phosphoramidite deposition, through a bath of oxidizing agent, through an acetonitrile wash bath, and through a block bath in a cycle; and then (2) repeating the cycles to achieve synthesized polynucleotides of a predetermined length. After polynucleotide synthesis, the flexible substrate is removed from the conveyor belt system and, optionally, rolled for storage. Rolling may be around a reel, for storage. In some instances, a flexible substrate comprising thermoplastic material is coated with nucleoside coupling reagent. The coating is patterned into loci such that each locus has diameter of about 10 um, with a center-to-center distance between two adjacent loci of about 21 μm. In this instance, the locus size is sufficient to accommodate a sessile drop volume of 0.2 pl during a polynucleotide synthesis deposition step. In some cases, the locus density is about 2.2 billion loci per $m^2$ (1 locus/441×$10^{-12}$ $m^2$). In some cases, a 4.5 $m^2$ substrate comprise about 10 billion loci, each with a 10 μm diameter.

In some arrangements, polynucleotide synthesis proceeds on a rack unit, such as those described herein. In some instances, one or more fluids comprising reagents for polynucleotide synthesis are delivered to at least one rack unit through one or more tubes. In some instances, the rack unit comprising at least one solid support are exposed to reagents consecutively to achieve polynucleotide synthesis. In some instances, a UV spectrometer or another suitable device is used to measure the concentration of polynucleotides on a solid support. In some instances, reagents are delivered as a gas using a vacuum (e.g., for cleaving polynucleotides on a solid support). The rack unit may further comprise one or more electrodes. The one or more electrodes may be coupled to an electrical system in a rack server to deliver a voltage to one or more location on a solid support in a rack unit.

In some arrangements, a device for application of one or more reagents to a substrate during a synthesis reaction is configured to deposit reagents and /or nucleoside monomers for nucleoside phosphoramidite based synthesis. Reagents for polynucleotide synthesis include reagents for polynucleotide extension and wash buffers. As non-limiting examples, the device deposits cleaning reagents, coupling reagents, capping reagents, oxidizers, de-blocking agents, acetonitrile, gases such as nitrogen gas, and any combination thereof. In addition, the device optionally deposits reagents for the preparation and/or maintenance of substrate integrity. In some instances, the polynucleotide synthesizer deposits a drop having a diameter less than about 200 μm, 100 μm, or 50 μm in a volume less than about 1000, 500, 100, 50, or 20 pl. In some cases, the polynucleotide synthesizer deposits between about 1 and 10000, 1 and 5000, 100 and 5000, or 1000 and 5000 droplets per second.

Described herein are devices, methods, systems and compositions where reagents for polynucleotide synthesis are recycled or reused. Recycling of reagents may comprise collection, storage, and usage of unused reagents, or purification/transformation of used reagents. For example, a reagent bath is recycled and used for a polynucleotide synthesis step on the same or a different surface. Reagents described herein may be recycled 1, 2, 3, 4, 5, 6, 7, 8, 9, 10 or more times. Alternatively or in combination, a reagent solution comprising a reaction byproduct is filtered to remove the byproduct, and the reagent solution is used for additional polynucleotide synthesis reactions.

Many integrated or non-integrated elements are often used with polynucleotide synthesis systems. In some instances, a polynucleotide synthesis system comprises one or more elements useful for downstream processing of synthesized polynucleotides. As an example, the system comprises a temperature control element such as a thermal cycling device. In some instances, the temperature control element is used with a plurality of resolved reactors to perform nucleic acid assembly such as PCA and/or nucleic acid amplification such as PCR. In some instances, the synthesized polynucleotides are transferred to an amplification unit, a storage unit, a sequencing unit, or any combination thereof. In some instances, the synthesized polynucleotides may be transferred using a robotic system (e.g., robotic arm or picker). In some instances, the synthesized polynucleotides may be transferred on a solid support described herein. In some instances, the synthesized polynucleotides may not be transferred on a solid support described herein. For example, the synthesized polynucleotides may be transferred in a capsule, tube, or any other suitable structure. The synthesized polynucleotides may be transferred in a liquid, gas, or solid.

High Density Synthesis Devices

Provided herein are devices, methods, compositions, and systems for biomolecule synthesis on solid supports. In some instances, electrochemistry is used to control synthesis of biomolecules, such as through deprotection, coupling, or cleavage steps. Further provided herein are devices, methods, compositions, and systems for nucleic acid storage and synthesis on solid supports. In some instances, solid supports comprise surfaces. In some instances, surfaces comprise one or more features. In some instances, features comprise one or more loci for biomolecule synthesis. Further provided herein are pluralities of devices which are combined to form larger arrays or chips. Further provided herein are devices comprising one or more addressable solid supports. Further provided herein are devices and methods which are configured for electrochemical deprotection or deblocking during biomolecule (e.g., polynucleotide synthesis). Further provided herein are devices comprising one or more addressable solid supports for polynucleotide synthesis. In some instances, devices are charged with an electrical voltage in order to perform one or more steps of polynucleotide synthesis, such as electrophoretic applications. Such devices in some instances comprise "active" or "inactive" states, wherein each state comprises one or more voltage states, and/or one or more resistance states (e.g., "on", "off", or "disconnect"). The states of a device may be controlled using a computer system provided herein. The computer system may be integrated into a data storage system provided herein. Arrays of devices or addressable supports in some instances provide for addressable control of high-density nucleic acid synthesis and/or storage. Further provided herein are devices comprising in-plane cathodes which reduce migration of reagents to proximal or neighboring devices (e.g., diffusion control).

Provided herein are devices for polynucleotide synthesis (e.g., FIG. 1). Such devices in some instances comprise a solid support 100 comprising a plurality of features 106 for polynucleotide synthesis. Such devices may comprise conductive elements or electrodes 102. Such electrodes may function as anodes or cathodes. Polynucleotides 104 comprise a protecting or blocking group 105 bound to a terminal base during at least one synthesis cycle. Application of a voltage through electrodes 102 during a synthesis step 107 in some instances generates a reagent that can be used to treat polynucleotides 104. The length of time the voltage is applied, number of times it applied, and other variables have a significant effect on the extent of the desired reaction and reduction in unwanted side reactions. The geometry of the device's surface and electrodes also may influence the efficiency of chemical reactions.

Figure 2:
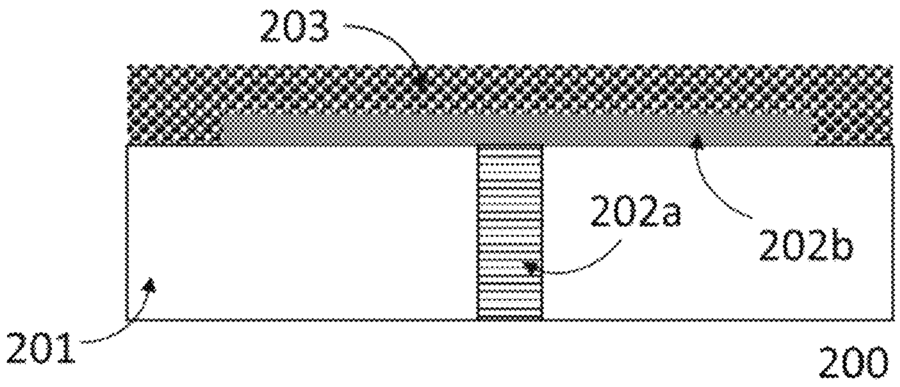
FIG. 2 illustrates a silicon-based prior art device having a porous growth layer above an electrode according to some embodiments.

Provided herein are devices for polynucleotide synthesis comprising layers of materials. Such devices may comprise any number of layers of materials comprising conductors, semiconductors, or insulative materials. Traditional devices 200 comprise a base layer 201, conducting materials 202*a*/202*b*, 205 (one or more conducting layers configured for use as an electrode; conducting materials may be buried in the base layer such as 202*a*, or above the base layer, such as 202*b*), and a porous growth layer surface 203 (FIG. 2). In some instances, conductive layer 202*a* is in electrical contact with layer 202*b*. Each of such layers may be individually patterned to generate features for polynucleotide synthesis such as pores, holes, wells, channels, or other shape (e.g., FIG. 7B and FIG. 7C). Various layers of such devices are in some instances combined to form addressable solid supports. Layers or surfaces of such devices may be in fluid communication with solvents, solutes, or other reagents used during polynucleotide synthesis.

Further described herein are devices comprising a plurality of surfaces. In some instances, surfaces comprise features for polynucleotides synthesis in proximity to conducting materials. In some instances, devices described herein comprise 1, 2, 5, 10, 50, 100, or even thousands of surfaces per device. In some instances, a voltage is applied to one or more layers of a device described herein to facilitate polynucleotide synthesis. In some instances, a voltage is applied to one or more layers of a device described herein to facilitate a step in polynucleotide synthesis, such as deblocking. Different layers on different surfaces of different devices are often energized with a voltage at varying times or with varying voltages. For example, a positive voltage is applied to a first layer, and a negative voltage is applied to a second layer of the same or a different device. In some instances, one or more layers on different devices are energized, while others are disconnected from a ground. In some instances, base layers comprise additional circuitry, such as complementary metal—oxide—semiconductors (CMOS) devices. In some instances, various layers of one or more devices are connected laterally via routing, and/or vertically with vias. In some instances, various layers of one or more devices are connected laterally via routing, and/or vertically with vias to a CMOS layer. In some instances, various layers of one or more devices are connected to a CMOS device via wire bonds, pogo pin contacts, or through Si Vias (TSV). In some instances, arrays of devices are independently addressable. In some instances, layers or components of devices comprising conducting materials function as cathodes or anodes when a voltage is applied.

Figure 3A:
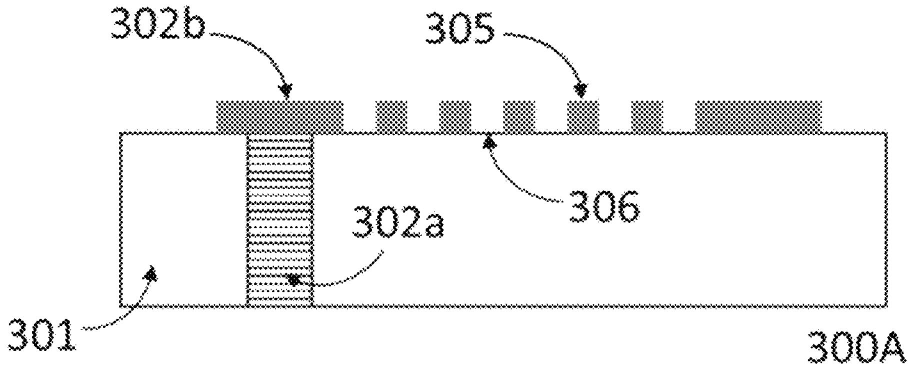
FIG. 3A illustrates a silicon-based polynucleotide synthesis surface comprising patterned conducting anodes according to some embodiments.

A first device 300A provided herein comprises a base layer 301, and a patterned top layer 305 (FIG. 3A). In some instances, the top layers 305 and 302*b* comprise a conducting material. In some instances, devices comprise a conducting layer 302*a* present in the base layer. In some instances, a polynucleotide synthesis surface 306 is formed on the solvent-exposed surface of the base layer 301. Such a device provides fluid communication between the polynucleotide synthesis surface 306 and the top layer 305. In some instances, the patterned top layer comprises a plurality of voids which facilitate fluid communication between the polynucleotide synthesis surface 306 and the top layer 305. In some instances, voids comprise any size or shape, including but not limited to well, channels, or other shape.

Figure 3B:
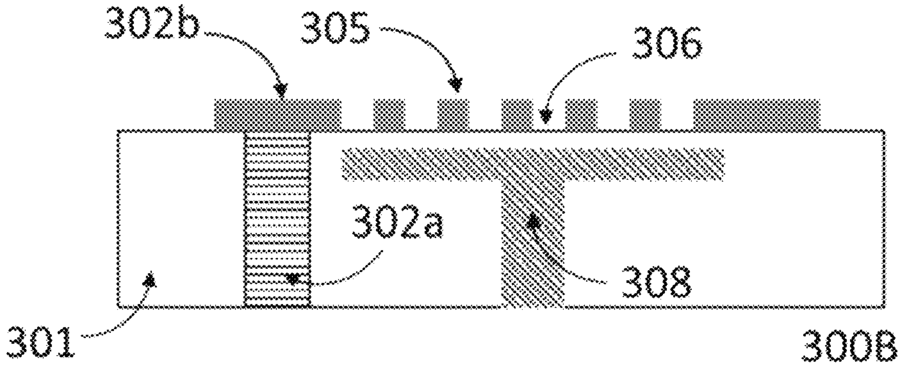
FIG. 3B illustrates a silicon-based polynucleotide synthesis surface comprising patterned conducting anodes and a buried shield electrode according to some embodiments.

A second device 300B provided herein comprises a base layer 301, a buried shield electrode 308, and a patterned top layer 305 (FIG. 3B). In some instances, the top layers 305 and 302*b* comprise a conducting material. In some instances, devices comprise a conducting layer 302*a* present in the base layer. In some instances, a polynucleotide synthesis surface 306 is formed by pores in the top layer 305. Such a device provides fluid communication between the polynucleotide synthesis surface 306 and the top layer. In some instances, the buried shield electrode 308 does not contact the synthesis surface 306 or top layer 305. In some instances, voltage is passed through the shield electrode 308 to influence the flow of ions in a solvent which contacts the synthesis surface 306. In some instances a different voltage is applied to the shield electrode 308 compared to the voltage applied to the top layer 305. In some instances, a voltage applied to the shield electrode 308 is synchronized with an adjacent or proximate conducting layer (e.g., 302*b*). In some instances, the time between a voltage applied to the shield electrode and the proximate anode is no more than 0.1 microsecond, 0.2, 0.5, 0.8, 1.0, 1.2, 1.5, 1.8, 2, 5, 8, 10, 12, 15, 20, 50, 80, or no more than 100 microseconds. In some instances, the time between a voltage applied to the shield electrode and the proximate anode is about 0.1 microsecond, 0.2, 0.5, 0.8, 1.0, 1.2, 1.5, 1.8, 2, 5, 8, 10, 12, 15, 20, 50, 80, or about 100 microseconds. In some instances, the time between a voltage applied to the shield electrode and the proximate anode is 0.1-1, 0.1-5, 0.1-10, 0.1-100, 0.5-10, 0.5-100, 1-10, 1-50, 1-100, 5-50, 10-100 or 50-100 microseconds.

Figure 4:
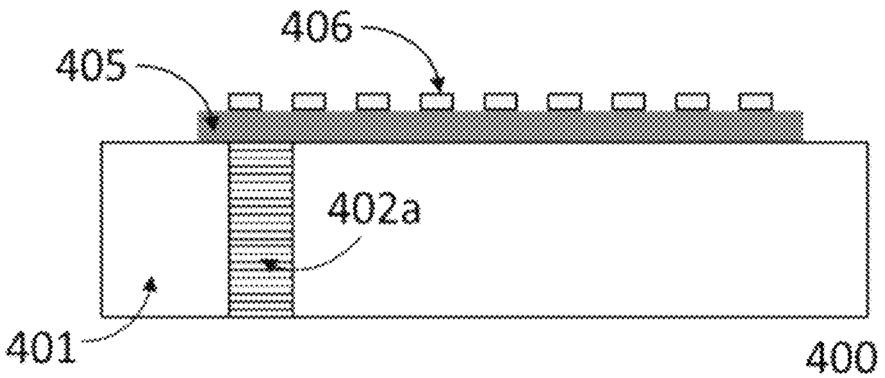
FIG. 4 illustrates a silicon-based polynucleotide synthesis surface comprising oxide islands above a conducting layer according to some embodiments. The oxide islands are patterned as an exemplary arrangement only, and in some instances are randomly arranged.

A third device 400 provided herein comprises a base layer 401, and an intermediate layer 405, and a top layer 406 (FIG. 4). In some instances, the intermediate layer 405 and layer 402*a* comprise a conducting material. In some instances, the top layer comprises a polynucleotide synthesis surface 406. Such a device provides fluid communication between the polynucleotide synthesis surface 406 and the intermediate layer 405. The polynucleotide synthesis surfaces 406 in some instances are patterned as cylinders, substantially rectangular shapes, channels, or other shape. In some instances, polynucleotide synthesis surfaces 406 are randomly distributed. In some instances, the intermediate layer 405 comprises a thermal oxide. Devices in some instances comprise one or more additional bonding layers between the synthesis surface 406 and the bottom layer 401. In some instances, the intermediate layer is 1-100, 1-50, 1-25, 1-10, 1-5, 2-25, 2-50, 5-50, 5-25, 5-75, 10-100, 10-50, or 50-100 nm thick. In some instances, the intermediate layer is no more than 1, 2, 5, 10, 15, 20, 25, 30, 50, 75, 100, or no more than 150 nm thick. In some instances, the intermediate layer is about 1, 2, 5, 10, 15, 20, 25, 30, 50, 75, 100, or about 150 nm thick. In some instances, the top layer is 1-100, 1-50, 1-25, 1-10, 1-5, 2-25, 2-50, 5-50, 5-25, 5-75, 10-100, 10-50, or 50-100 nm thick. In some instances, the top layer is no more than 1, 2, 5, 10, 15, 20, 25, 30, 50, 75, 100, or no more than 150 nm thick. In some instances, the top layer is about 1, 2, 5, 10, 15, 20, 25, 30, 50, 75, 100, or about 150 nm thick.

Figure 5A:
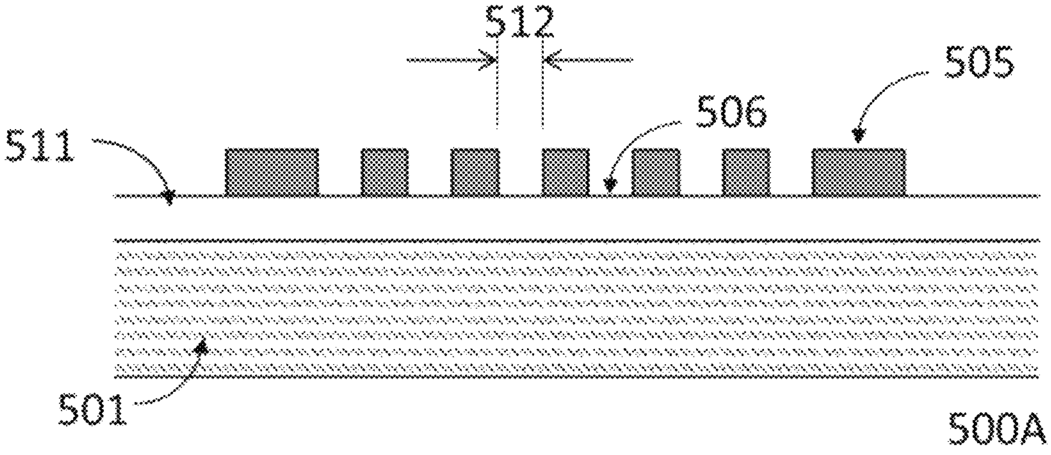
FIG. 5A illustrates a silicon-based polynucleotide synthesis surface comprising patterned conducting anodes and a thermal oxide layer on top of an optional p- or n-type silicon layer according to some embodiments. Polynucleotide growth occurs in the pores between anodes. Vertical interconnect accesses (VIAs) are not shown for clarity.

A fourth device 500A provided herein comprises a base layer 501, a first intermediate layer 511, a top layer 505 (FIG. 5A). In some instances, the first intermediate comprises a polynucleotide synthesis surface 506. In some instances, the smallest feature dimension is 512. In some instances, a device comprises one or more of a) a base layer comprising silicon; b) an intermediate layer comprising an oxide; and c) a top layer comprising a conductive material. In some instances, the top layer is configured to produce an electrochemically generated reagent when energized with a voltage. In some instances, the intermediate layer and the top layer are in fluid communication with a solvent. In some instances the intermediate layer is located between the base layer and the top layer. In some instances, the intermediate layer is configured for the attachment of molecules. In some instances, the solid support comprises a plurality of features. In some instances the top layer comprises a plurality of voids configured to allow fluid communication of the solvent with the intermediate layer. In some instances at least some of the voids are centered above one or more features. In some instances, the voids comprise wells or channels. In some instances, the wells or channels are 1-5, 1-10, 1-15, 1-20, 1-25, 1-50, 1-75, 1-100, 1-150, 1-200, or 1-500 nm deep. In some instances, the wells or channels are no more than 1, 2, 3, 5, 10, 15, 20, 25, 30, 40, 50, 75, 100, 150, 200, or no more than 500 nm deep. In some instances, the plurality of features are located on the intermediate layer. In some instances, the smallest feature dimension is proportional to the diffusion distance of a reagent generated proximate to a conducting layer. In some instances, the intermediate layer is 1-100, 1-50, 1-25, 1-10, 1-5, 2-25, 2-50, 5-50, 5-25, 5-75, 10-100, 10-50, or 50-100 nm thick. In some instances, the intermediate layer is no more than 1, 2, 5, 10, 15, 20, 25, 30, 50, 75, 100, or no more than 150 nm thick. In some instances, the intermediate layer is about 1, 2, 5, 10, 15, 20, 25, 30, 50, 75, 100, or about 150 nm thick. In some instances, the top layer is 1-100, 1-50, 1-25, 1-10, 1-5, 2-25, 2-50, 5-50, 5-25, 5-75, 10-100, 10-50, or 50-100 nm thick. In some instances, the top layer is no more than 1, 2, 5, 10, 15, 20, 25, 30, 50, 75, 100, or no more than 150 nm thick. In some instances, the top layer is about 1, 2, 5, 10, 15, 20, 25, 30, 50, 75, 100, or about 150 nm thick. In some instances, the device comprises one or conducting layers which are configured for use as cathodes. In some instances, the device comprises one or more in-plane cathodes.

Figure 5B:
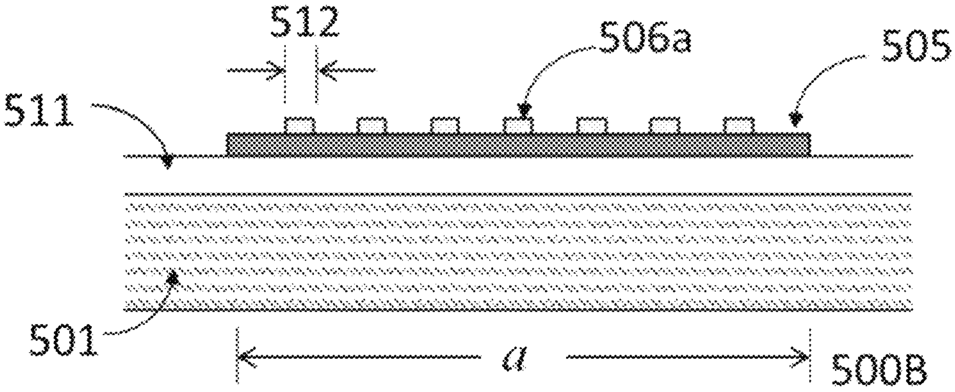
FIG. 5B illustrates a silicon-based polynucleotide synthesis surface comprising patterned oxide islands on top of a conducting anode layer, and a thermal oxide layer on top of an optional p- or n-type silicon layer according to some embodiments. Polynucleotide growth occurs on the oxide islands. Vertical interconnect accesses (VIAs) are not shown for clarity.
Figure 5C:
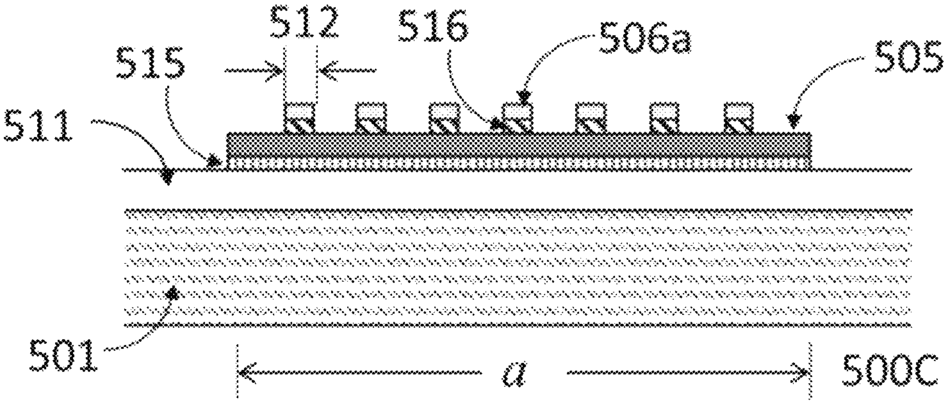
FIG. 5C illustrates a silicon-based polynucleotide synthesis surface comprising patterned oxide islands on top of a conducting anode layer, and a thermal oxide layer on top of an optional p- or n-type silicon layer according to some embodiments. The conducting layer is sandwiched on both sides by an additional bonding layer. A single bonding layer is shown for clarity only; in some instances the surface comprise a plurality of bonding layers. Polynucleotide growth occurs on the oxide islands. Vertical interconnect accesses (VIAs) are not shown for clarity.

A fifth device 500B provided herein comprises a base layer 501, a first intermediate layer 511, a second intermediate layer 505, a top layer 506 (FIG. 5B). In some instances, polynucleotides are synthesized on top layer 506. The polynucleotide synthesis surfaces 506 in some instances are patterned as cylinders, substantially rectangular shapes, channels, or other shape. In some instances, polynucleotide synthesis surfaces 506 are randomly patterned. In some instances, the smallest feature dimension is 512. In some instances, a device comprises additional bonding layers 515 and 516 (FIG. 5C), as shown in device 500C. In some instances, the smallest feature dimension is proportional to the diffusion distance of a reagent generated proximate to a conducting layer.

Figure 6A:
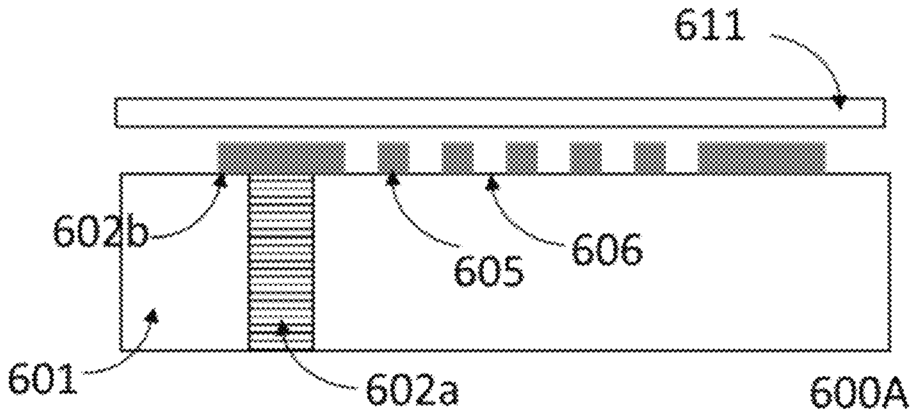
FIG. 6A illustrates a device comprising an anode "sandwiched" above the plane of the cathode according to some embodiments.
Figure 6B:
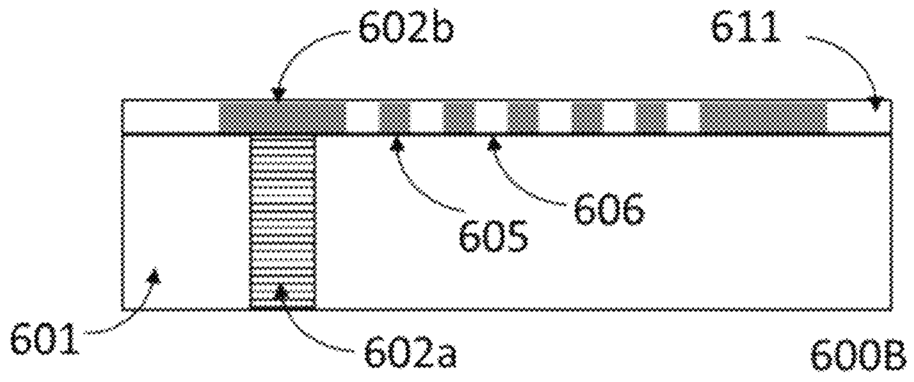
FIG. 6B illustrates a device comprising an anode located substantially in the same plane of the cathode ("in-plane") according to some embodiments.

In some instances, a device 600A comprises a conductive layer 611 configured for use as a cathode which is above the plane of one or more conductive layers 605/602*b* configured for use as an anode (attached to a lower conductive layer 602*a*), FIG. 6A. In some instances, the anode is in fluid communication with one or more loci for polynucleotide synthesis 606. In another configuration, a conductive layer 611 configured for use as a cathode and located in the same plane as one or more conductive layers 605/602*b* configured for use as an anode (attached to a lower conductive layer 602*a*), as in device 600B of FIG. 6B. In some instances, a device comprises one or more of a) a base layer comprising silicon; b) an intermediate layer comprising a conductive material, wherein the intermediate layer is configured to produce an electrochemically generated reagent when energized with a voltage; and c) a top layer comprising an oxide. In some instances, the intermediate layer and the top layer are in fluid communication with a solvent. In some instances, the intermediate layer is located between the base layer and the top layer. In some instances, the top layer is configured for the attachment of molecules. In some instances, the solid support comprises a plurality of features. In some instances in-plane cathodes in close proximity to active anode layers reduce excess migration of electrochemically generated reagents to neighboring devices.

Figure 7A:
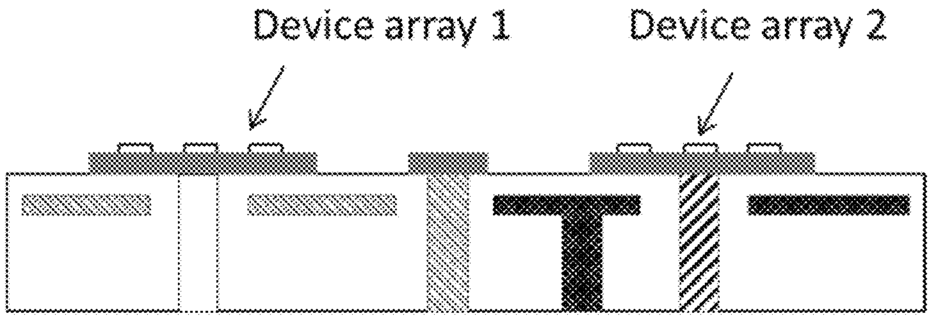
FIG. 7A illustrates a cross-section view of a high-density device for polynucleotide synthesis according to some embodiments. Two exemplary addressable device arrays are shown for clarity only.
Figure 7B:
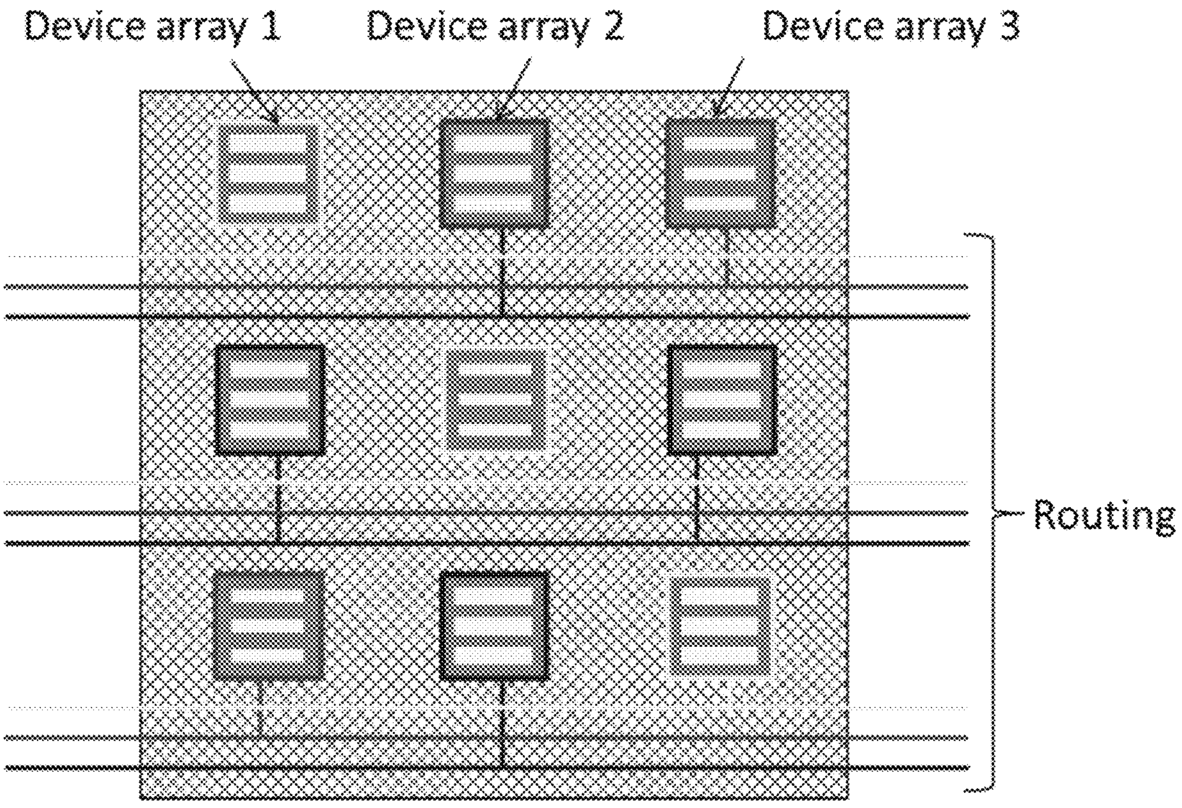
FIG. 7B illustrates a top view of a high-density device for polynucleotide synthesis according to some embodiments. Nine exemplary addressable device arrays are shown for clarity only.
Figure 7C:
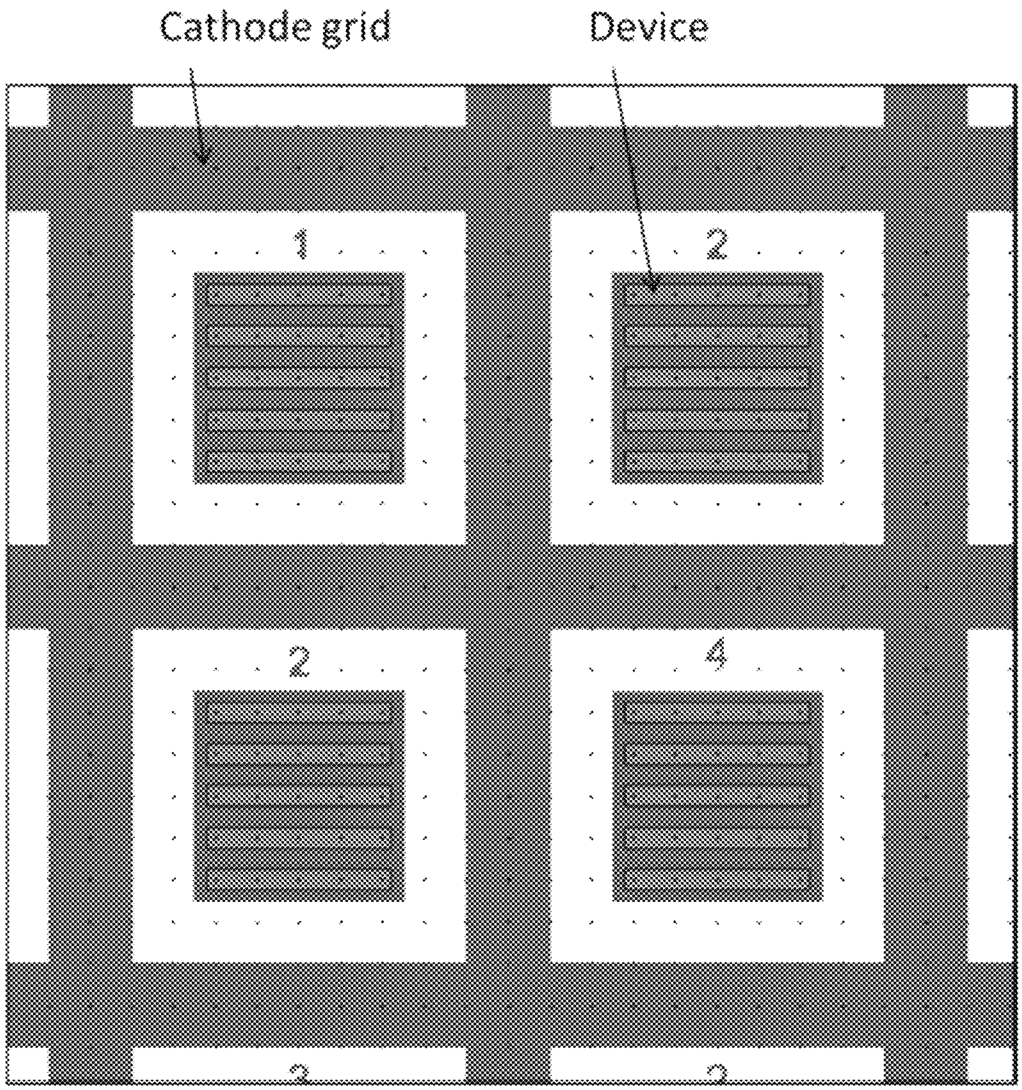
FIG. 7C illustrates a top view of a high-density device for polynucleotide synthesis. Four exemplary addressable device arrays are shown for clarity only.
Figure 7D:
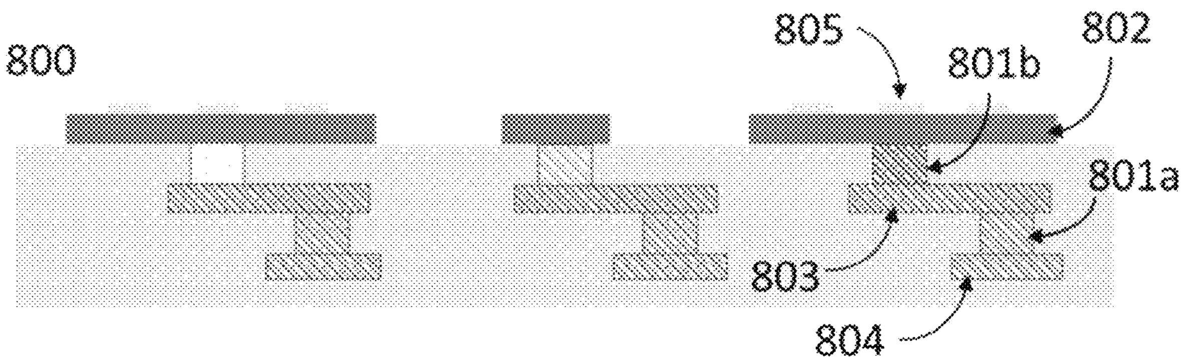
FIG. 7D illustrates a cross-section view of a high-density device for polynucleotide synthesis according to some embodiments. Two exemplary device arrays are shown for clarity only.
Figure 7E:
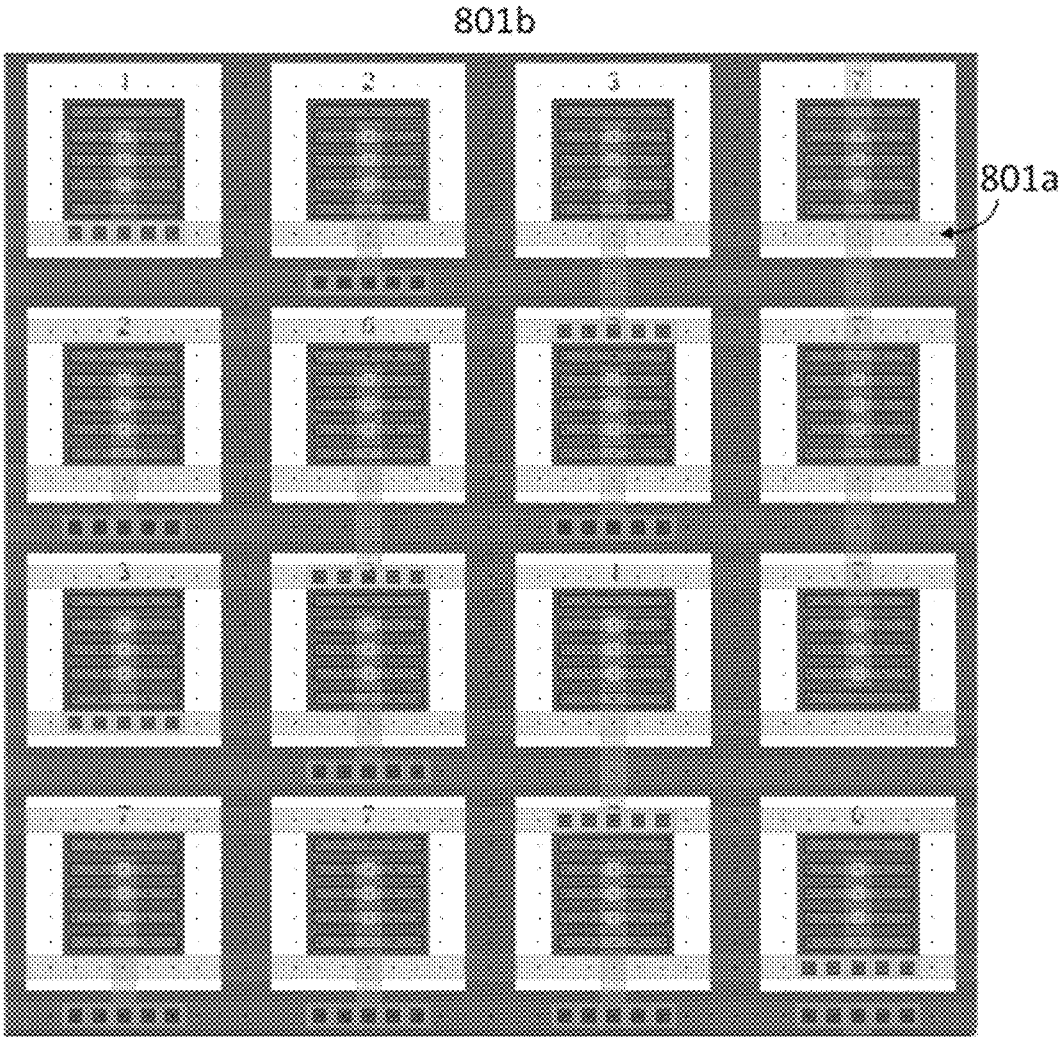
FIG. 7E illustrates a top view of a high-density device for polynucleotide synthesis according to some embodiments. Sixteen exemplary addressable device arrays are shown for clarity only.
Figure 8:
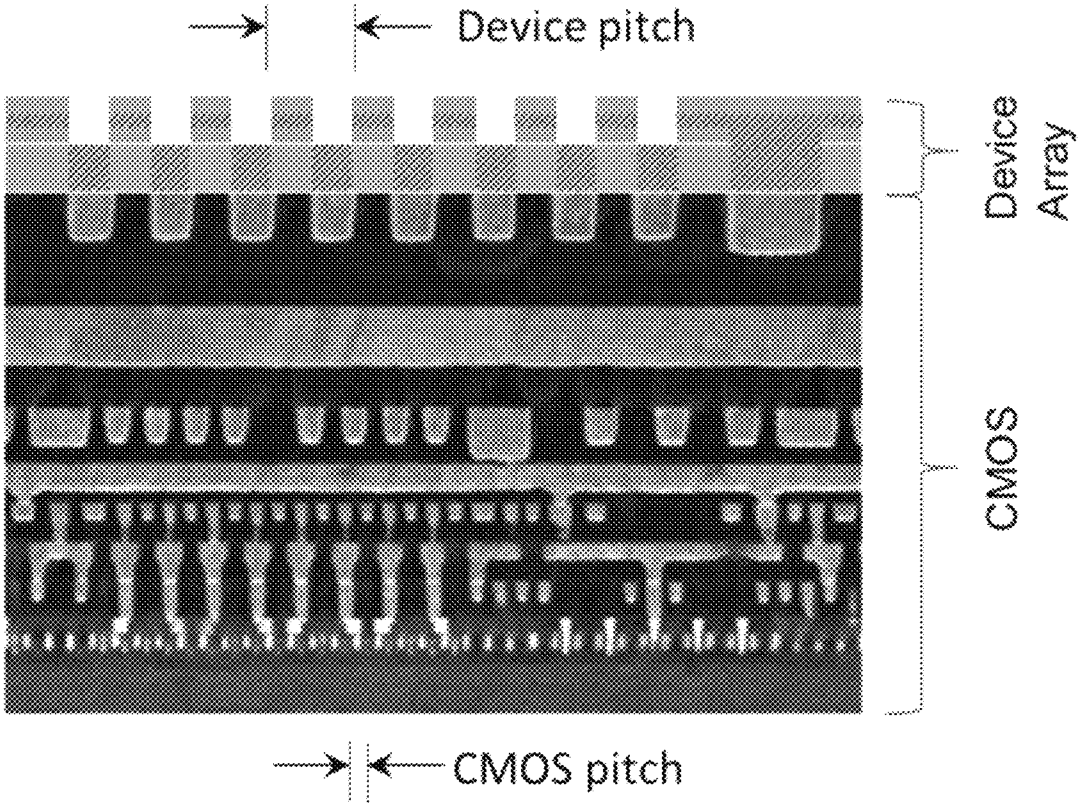
FIG. 8 depicts a schematic of a CMOS-integrated device array according to some embodiments.

A sixth device described herein comprises a plurality of device arrays (or addressable solid supports), as shown in FIGS. 7A-7E. FIG. 7A shows two such device arrays for clarity, although such devices may comprise any number of device arrays. Nine such device arrays are shown in FIG. 7B, along with routing connections which allow addressable control of individual or groups of device arrays. In some instances, device array 1 is individually addressable from device arrays 2 and 3. Four such device arrays are shown in FIG. 7C for clarity only; any number of devices may be arrayed in this way. The four devices are addressable in groups 1, 2, and 4 as shown for clarity only; the number of addressable groups in some instances is equal to or less than the number of total device arrays. Conductive layers 802 in some instances generate reagents (e.g., acid) for electrochemical deprotection of biomolecules, such as polynucleotides. In some instances, 802 is configured for use as an anode. In some instances, a conducting layer is also configured for use as a cathode as shown in FIG. 7C. A cross section of devices of FIG. 7C or 8E are shown in FIG. 7D. In some instances, polynucleotides are synthesized on oxide layer 805. In some instances, polynucleotides are synthesized on conductive layer 802. Such devices are in some instances addressable by a first layer of routing 801*a* and a second layer of routing 801*b*. Such devices may comprise any number of routing layers, for example 1, 2, 3, 4, 5, 10, 20, 50, 100, or more than 100 layers of routing. Routing in different horizontal planes in some instances is connected by one or more vertical interconnect accesses (VIAs), 803 and 804. Such devices may comprise any number of vias, for example 1, 2, 3, 4, 5, 10, 20, 50, 100, 1000, or more than 1000 vias per square micron. The number and size of routing and vias in some instances are proportional to the number of addressable solid supports on a device. A device comprising 16 device arrays (similar to FIG. 7C) is shown in FIG. 7E. Routing 801*b* is superficial to routing 801*a* in the device. The sixteen device arrays of FIG. 7E are in some instances addressable as seven groups, but other configurations are also consistent with the devices and methods described herein. In some instances, devices are integrated with additional circuitry, such as CMOS (FIG. 8). In some instances, loci and surrounding anodes are circular, rectangular, square, or other shape. In some instances, a device is fabricated having about the dimensions: p=device pitch; d=device size=⅖ p; s=oxide growth feature=⅕ p; n=cathode neck=⅕ p; g=device-to-cathode gap=⅕ p; and t=platinum thickness=1/50 p. In some instances, the device pitch is no more than 5, 10, 15, 20, 25, 30, 35, 40, 45, 50, 60, 75, 85, 100, 125, 150, 175, 200, 250, 500, or no more than 1000 nm. In some instances, the device pitch is about 5, 10, 15, 20, 25, 30, 35, 40, 45, 50, 60, 75, 85, 100, 125, 150, 175, 200, 250, 500, or about 1000 nm. In some instances, the device pitch is 5-500, 5-100, 10-200, 10-500, 25-500, 50-500, 100-500, 100-1000, 250-1000, 500-1000, or 100-1000 nm. In some instances, the shortest distance between the cathode and anode (g, device to cathode gap) is 5-50%, 5-25%, 5-30%, 10-30%, 10-50%, 10-20%, 20-50%, or 30-75% of the pitch distance. In some instances, the smallest width of the cathode (n) is 5-50%, 5-25%, 5-30%, 10-30%, 10-50%, 10-20%, 20-50%, or 30-75% of the pitch distance. In some instances, the smallest width of the cathode (n) is 5-50%, 5-25%, 5-30%, 10-30%, 10-50%, 10-20%, 20-50%, or 30-75% of the pitch distance. In some instances, the largest dimension of the anode (d, linear distance or diameter) is 5-50%, 5-25%, 5-30%, 10-30%, 10-50%, 10-20%, 20-50%, or 30-75% of the pitch distance. In some instances, a via closest in proximity to the anode has a largest dimension (linear distance or diameter) of 5-50%, 5-25%, 5-30%, 10-30%, 10-50%, 10-20%, 20-50%, or 30-75% of the pitch distance. In some instances, the feature size (s, linear distance or diameter) is 5-50%, 5-25%, 5-30%, 10-30%, 10-50%, 10-20%, 20-50%, or 30-75% of the pitch distance. In some instances, the thickness of one or more of the anode or cathode is no more than 0.55-5%, 0.5-2.5%, 0.5-3%, 1-3%, 1-5%, 1-2%, 2-5%, or 3-7.5% of the pitch distance.

Devices may comprise any number of device arrays. In some instances, devices comprise at least 10, 50, 100, 1000, 10,000, 100,000, or more than 100,000 device arrays in a single device. In some instances, devices comprise about 10, 50, 100, 1000, 10,000, 100,000, or about 100,000 device arrays in a single device. In some instances, devices comprise 10-50, 10-5000, 10-10,000, 100-1000, 100-10,000, 100-100,000, 1000-10,000, or 1000-100,000 device arrays in a single device.

In some instances, a device comprises one or more base layers. In some instances, a base layer comprises a first layer comprising an oxide, and a second layer comprising a carbide, and a third layer comprising a nitride. In some instances, a device comprises at least 1, 2, 3, 4, 5, 10, 15, 20, 25, 50 or more than 75 base layers. In some instances, a device comprises 1, 2, 3, 4, 5, 6, 7, 8, 9, 10, 12, 15, 20, 25, 30, or more than 30 vias. In some instances, a device comprises 1, 2, 3, 4, 5, 6, 7, 8, 9, 10, 12, 15, 20, 25, 30, or more than 30 routing elements. In some instances, a first layer (of a base layer) comprises an oxide such as $SiO_2$. In some instances, a second layer (of a base layer) comprises a carbide such as silicon carbide. In some instances, a third layer (of a base layer) comprises a nitride such as silicon nitride. Additional materials may also be used for these layers. In some instances, a device comprises a top layer. In some instances, the top layer comprises one or more device layers and one or more in-plane cathodes. In some instances, the in-plane cathode comprises a first layer comprising an oxide, a second layer comprising a metal-doped nitride, and a third layer comprising a metal. In some instances, the first layer (of the cathode) comprises silicon oxide. In some instances, the second layer (of the cathode) comprises titanium nitride doped with chromium. In some instances, the third layer (of the cathode) comprises platinum. In some instances, the device layer comprises a first layer comprising an oxide, a second layer comprising a metal-doped nitride, a third layer comprising a metal, a fourth layer comprising a metal, and a fifth layer comprising an oxide. In some instances, the first layer (of the device layer) comprises silicon oxide. In some instances, the second layer (of the device layer) comprises titanium nitride doped with chromium. In some instances, the third layer (of the device layer) comprises platinum. In some instances, the fourth layer (of the device layer) comprises ruthenium. In some instances, the fifth layer (of the device layer) comprises titanium. In some instances, the sixth layer (of the device layer) comprises silicon oxide. In some instances, polynucleotides are synthesized on the fifth layer of the device layer. Additional materials may also be used for these layers.

Device arrays may be scaled to any size or dimensions. In some instances, device arrays are about 0.01, 0.02, 0.05, 0.1, 0.2, 0.5, 0.8, 1, 2, 5, 8, or about 10 microns in width. In some instances, device arrays are no more than 0.01, 0.02, 0.05, 0.1, 0.2, 0.5, 0.8, 1, 2, 5, 8, or no more than 10 microns in width. In some instances, device arrays are 0.01-10, 0.1-10, 0.1-1, 0.5-1, 1-10, or 5-30 microns in width. In some instances, device arrays are separated by about 0.01, 0.02, 0.05, 0.1, 0.2, 0.5, 0.8, 1, 2, 5, 8, or about 10 microns. In some instances, device arrays are separated by no more than 0.01, 0.02, 0.05, 0.1, 0.2, 0.5, 0.8, 1, 2, 5, 8, or no more than 10 microns. In some instances, device arrays are separated by 0.01-10, 0.1-10, 0.1-1, 0.5-1, 1-10, or 5-30 microns.

Devices with addressable device arrays may be addressed in different patterns or configurations. In some instances, only specific groups (or clusters) of devices in arrays are activated simultaneously. In some instances, device arrays are addressed according to FIGS. 13A-13G. Any number of device arrays may be activated simultaneously. In some instances, about 1%, 2%, 3%, 5%, 7%, 10%, 15%, 20%, 30%, 40%, 50%, 60%, 75%, 95%, or about 100% of the device arrays in a device described herein are activated simultaneously. In some instances, no more than 1%, 2%, 3%, 5%, 7%, 10%, 15%, 20%, 30%, 40%, 50%, 60%, 75%, 95%, or no more than 99% of the device arrays in a device described herein are activated simultaneously. In some instances, at least 1%, 2%, 3%, 5%, 7%, 10%, 15%, 20%, 30%, 40%, 50%, 60%, 75%, 95%, or at least 99% of the device arrays in a device described herein are activated simultaneously. In some instances 1-2%, 1-5%, 1-10%, 1-20%, 1-50%, 2-10%, 2-50%, 5-50%, 5-90%, 10-25%, 10-95%, or 15-95% of the device arrays in a device described herein are activated simultaneously.

Devices may be controlled (activated, deactivated, disconnected) together. In some instances, devices in arrays comprise clusters of smaller devices. In some instances, a device cluster comprises at least 25, 50, 60, 70, 80, 90, 100, 125, 150, 200, or more than 500 devices in a cluster. In some instances, devices within a cluster are independently addressable. In some instances, a device cluster comprises at least 2, 3, 4, 5, 6, 7, 8, 9, 10, or more than 10 addressable devices. In some instances, a device cluster comprises at least 2, 3, 4, 5, 6, 7, 8, 9, 10, or more than 10 cathodes.

Devices described herein may be fabricated using numerous methods, such as masking methods. In some instances, a lift-off fabrication method is used. Lift-off methods in some instances comprises addition of a sacrificial layer (e.g., photoresist or "PR") to a base layer coated with an oxide layer, addition of a conductive layer, and removal of the sacrificial layer. In some instances, a dry-etch fabrication method is used. Dry-etch methods in some instances comprises addition of one or more layers to a base layer, such as an oxide layer, a first intermediate layer (e.g., TiN, or other material), a conductive layer (e.g., platinum), a second intermediate layer (e.g., TiN, or other material), and a sacrificial layer (e.g., photoresist); partial removal of the second intermediate layer to expose the conductive layer; partial removal of the conductive layer to expose the first intermediate layer; partial removal of the first conductive layer to expose the first intermediate layer; and partial removal of the first intermediate layer to expose the oxide layer.

Devices may be configured a smallest dimension of the plurality of features is no more than the diffusion distance of an electrochemically generated reagent. In some instances, the diffusion distance is no more than 1000 nm, 750 nm, 500 nm, 400 nm, 300 nm, 250 nm, 225 nm, 200 nm, 150 nm, 125 nm, 100 nm, 75 nm, 50 nm, 25 nm, 10 nm, or no more than 5 nm.

Devices may be configured with one or more vias or routing components. In some instances, vias and routing are no more than 10, 20, 50, 100, 150, 200, 250, 300, 350, or no more than 500 nm in length. In some instances, vias and routing are about 10, 20, 50, 100, 150, 200, 250, 300, 350, or about 500 nm in length. In some instances, vias and routing are 10-500, 10-350, 10-200, 10-100, 10-50, 50-500, 50-300, 50-250, 50-200, 50-100, 100-300, 100-500, 100-200, 200-500, or 300-500. In some instances, vias comprise a conducting material. In some instances, vias comprise a metal described herein. In some instances, vias comprise copper. In some instances, vias comprise substantially copper.

Assembly

Polynucleotides may be designed to collectively span a large region of a predetermined sequence that encodes for information. In some instances, larger polynucleotides are generated through ligation reactions to join the synthesized polynucleotides. One example of a ligation reaction is polymerase chain assembly (PCA). In some instances, at least of a portion of the polynucleotides are designed to include an appended region that is a substrate for universal primer binding. For PCA reactions, the presynthesized polynucleotides include overlaps with each other (e.g., 4, 20, 40 or more bases with overlapping sequence). During the polymerase cycles, the polynucleotides anneal to complementary fragments and then are filled in by polymerase. Each cycle thus increases the length of various fragments randomly depending on which polynucleotides find each other. Complementarity amongst the fragments allows for forming a complete large span of double-stranded DNA. In some cases, after the PCA reaction is complete, an error correction step is conducted using mismatch repair detecting enzymes to remove mismatches in the sequence. Once larger fragments of a target sequence are generated, they can be amplified. For example, in some cases, a target sequence comprising 5' and 3' terminal adapter sequences is amplified in a polymerase chain reaction (PCR) which includes modified primers that hybridize to the adapter sequences. In some cases, the modified primers comprise one or more uracil bases. The use of modified primers allows for removal of the primers through enzymatic reactions centered on targeting the modified base and/or gaps left by enzymes which cleave the modified base pair from the fragment. What remains is a double-stranded amplification product that lacks remnants of adapter sequence. In this way, multiple amplification products can be generated in parallel with the same set of primers to generate different fragments of double-stranded DNA.

Error correction may be performed on synthesized polynucleotides and/or assembled products. An example strategy for error correction involves site-directed mutagenesis by overlap extension PCR to correct errors, which is optionally coupled with two or more rounds of cloning and sequencing. In certain instances, double-stranded nucleic acids with mismatches, bulges and small loops, chemically altered bases and/or other heteroduplexes are selectively removed from populations of correctly synthesized nucleic acids. In some instances, error correction is performed using proteins/enzymes that recognize and bind to or next to mismatched or unpaired bases within double-stranded nucleic acids to create a single or double-strand break or to initiate a strand transfer transposition event. Non-limiting examples of proteins/enzymes for error correction include endonucleases (T7 Endonuclease I, *E. coli* Endonuclease V, T4 Endonuclease VII, mung bean nuclease, Cell, *E. coli* Endonuclease IV, UVDE), restriction enzymes, glycosylases, ribonucleases, mismatch repair enzymes, resolvases, helicases, ligases, antibodies specific for mismatches, and their variants. Examples of specific error correction enzymes include T4 endonuclease 7, T7 endonuclease 1, S1, mung bean endonuclease, MutY, MutS, MutH, MutL, cleavase, CELI, and HINF1. In some cases, DNA mismatch-binding protein MutS (*Thermus aquaticus*) is used to remove failure products from a population of synthesized products. In some instances, error correction is performed using the enzyme Correctase. In some cases, error correction is performed using SURVEYOR endonuclease (Transgenomic), a mismatch-specific DNA endonuclease that scans for known and unknown mutations and polymorphisms for heteroduplex DNA.

Nucleic Acid Based Information Storage

Provided herein are devices, compositions, systems and methods for nucleic acid-based information (data) storage. A biomolecule such as a DNA molecule provides a suitable host for information storage in-part due to its stability over time and capacity for enhanced information coding, as opposed to traditional binary information coding. In a first step, a digital sequence encoding an item of information (e.g., digital information in a binary code for processing by a computer) is received. An encryption scheme is applied to convert the digital sequence from one or more symbols (e.g., a binary code) to a nucleic acid sequence. A surface material for nucleic acid extension, a design for loci for nucleic acid extension (e.g., arrangement spots), and reagents for nucleic acid synthesis are selected. The surface of a structure is prepared for nucleic acid synthesis. De novo polynucleotide synthesis is then performed. The synthesized polynucleotides are stored and available for subsequent release, in whole or in part. Once released, the polynucleotides, in whole or in part, are sequenced, subject to decryption to convert nucleic sequence back to digital sequence. The digital sequence is then assembled to obtain an alignment encoding for the original item of information.

Nucleic acids encoding digital information may comprise error correction component. In some instances, the error correction component comprises an error correction code, such as a Reed-Solomon (RS) code, a LDPC code, a polar code, a turbo code. In some instances, the error correction code spreads the digital data to be stored over many polynucleotides. In some instances, spreading the data over a plurality of polynucleotides builds redundancy to correct for erasures (e.g., lost oligos). In some instances, the digital information can be recovered in the presence of errors. In some instances, the error correction component comprises a parity base. In some instances, the error correction component comprises an index sequence. In some instances, the index sequences define the location or address of the digital information encoded in the nucleic acid. In some instances, the index sequences define the source of the digital information. Nucleic acids encoding digital information in some instances comprise overlap with one or more nucleic acids in the same library or set. In some instances, the error correction component comprises an overlap or redundancy region. In some instances, algorithms are applied to sequenced nucleic acids to reduce errors. In some instances, error corrective algorithms comprise consensus sequencing, HEDGES (Hash Encoded, Decoded by Greedy Exhaustive Search), or other method.

Nucleic acids encoding for digital information may be stored in different media. In some instances, nucleic acids are stored as essentially dry or lyophilized powders. In some instances, nucleic acids are stored in buffers. In some instances, nucleic acids are stored on chips, wafers, or other silicon solid support. In some instances, nucleic acids are stored inside an organism (or population of organisms), such as a plasmid or genome.

The solid support for nucleic acid synthesis or storage as described herein comprises a high capacity for storage of data. For example, the capacity of the solid support is at least or about 1, 2, 3, 4, 5, 6, 7, 8, 9, 10, 20, 50, 100, 200, 300, 400, 500, 600, 700, 800, 900, 1000, or more than 1000 petabytes. In some instances, the capacity of the solid support is between about 1 to about 10 petabytes or between about 1 to about 100 petabytes. In some instances, the capacity of the solid support is about 100 petabytes. In some instances, the data is stored as addressable arrays of packets as droplets. In some instances, the data is stored as addressable arrays of packets as droplets on a spot. In some instances, the data is stored as addressable arrays of packets as dry wells. In some instances, the addressable arrays comprise at least or about 1, 2, 3, 4, 5, 6, 7, 8, 9, 10, 20, 50, 100, 200, or more than 200 terabytes of data. In some instances, the addressable arrays comprise at least or about 1, 2, 3, 4, 5, 6, 7, 8, 9, 10, 20, 50, 100, 200, or more than 200 gigabytes of data. In some instances, the addressable arrays comprise at least or about 1, 2, 3, 4, 5, 6, 7, 8, 9, 10, 20, 50, 100, 200, or more than 200 terabytes of data. In some instances, an item of information is stored in a background of data. For example, an item of information encodes for about 10 to about 100 megabytes of data and is stored in 1 petabyte of background data. In some instances, an item of information encodes for at least or about 1, 10, 20, 30, 40, 50, 60, 70, 80, 90, 100, 150, 200, 300, 400, 500, or more than 500 megabytes of data and is stored in 1, 10, 20, 30, 40, 50, 60, 70, 80, 90, 100, 150, 200, 300, 400, 500, or more than 500 petabytes of background data. In some instances, storage capacity is based on a device pitch (FIG. 26), wherein smaller device pitches allow for greater storage.

Items of Information

Optionally, an early step of data storage process disclosed herein includes obtaining or receiving one or more items of information in the form of an initial code. Items of information include, without limitation, text, audio and visual information. Exemplary sources for items of information include, without limitation, books, periodicals, electronic databases, medical records, letters, forms, voice recordings, animal recordings, biological profiles, broadcasts, films, short videos, emails, bookkeeping phone logs, internet activity logs, drawings, paintings, prints, photographs, pixelated graphics, and software code. Exemplary biological profile sources for items of information include, without limitation, gene libraries, genomes, gene expression data, and protein activity data. Exemplary formats for items of information include, without limitation, .txt, .PDF, .doc, .docx, .ppt, .pptx, .xls, .xlsx, .jpg, .gif, .psd, .bmp, .tiff, .png, and .mpeg. The amount of individual file sizes encoding for an item of information, or a plurality of files encoding for items of information, in digital format include, without limitation, up to 1024 bytes (equal to 1 KB), 1024 KB (equal to 1 MB), 1024 MB (equal to 1 GB), 1024 GB (equal to 1 TB), 1024 TB (equal to 1 PB), 1 exabyte, 1 zettabyte, 1 yottabyte, 1 xenottabyte or more. In some instances, an amount of digital information is at least 1 gigabyte (GB). In some instances, the amount of digital information is at least 1, 2, 3, 4, 5, 6, 7, 8, 9, 10, 20, 50, 100, 200, 300, 400, 500, 600, 700, 800, 900, 1000 or more than 1000 gigabytes. In some instances, the amount of digital information is at least 1 terabyte (TB). In some instances, the amount of digital information is at least 1, 2, 3, 4, 5, 6, 7, 8, 9, 10, 20, 50, 100, 200, 300, 400, 500, 600, 700, 800, 900, 1000 or more than 1000 terabytes. In some instances, the amount of digital information is at least 1 petabyte (PB). In some instances, the amount of digital information is at least 1, 2, 3, 4, 5, 6, 7, 8, 9, 10, 20, 50, 100, 200, 300, 400, 500, 600, 700, 800, 900, 1000 or more than 1000 petabytes. In some instances, the digital information does not contain genomic data acquired from an organism. Items of information in some instance are encoded. Non-limiting encoding method examples include 1 bit/base, 2 bit/base, 4 bit/base or other encoding method.

Sequencing

After extraction and/or amplification of polynucleotides from the surface of the structure, suitable sequencing technology may be employed to sequence the polynucleotides. In some cases, the DNA sequence is read on the substrate or within a feature of a structure. In some cases, the polynucleotides stored on the substrate are extracted is optionally assembled into longer nucleic acids and then sequenced. In some cases, the polynucleotides stored on the substrate are extracted and not assembled into longer nucleic acids. In some instances, the sequences of the sequences polynucleotides may be assembled in silico.

Polynucleotides synthesized and stored on the structures described herein encode data that can be interpreted by reading the sequence of the synthesized polynucleotides and converting the sequence into a set of symbol (e.g., binary code) readable by a computer. In some cases, the sequences require assembly, and the assembly step may need to be at the nucleic acid sequence stage or at the digital sequence stage. The assembly may be accomplished using one or more indices of the sequences. The one or more indices may be used to group or align one or more sequences in order to interpret information encoded in the polynucleotides.

Provided herein are detection systems comprising a device capable of sequencing stored polynucleotides, either directly on the structure and/or after removal from the main structure. In cases where the structure is a reel-to-reel tape of flexible material, the detection system comprises a device for holding and advancing the structure through a detection location and a detector disposed proximate the detection location for detecting a signal originated from a section of the tape when the section is at the detection location. In some instances, the signal is indicative of a presence of a polynucleotide. In some instances, the signal is indicative of a sequence of a polynucleotide (e.g., a fluorescent signal). In some instances, information encoded within polynucleotides on a continuous tape is read by a computer as the tape is conveyed continuously through a detector operably connected to the computer. In some instances, a detection system comprises a computer system comprising a polynucleotide sequencing device, a database for storage and retrieval of data relating to polynucleotide sequence, software for converting DNA code of a polynucleotide sequence to binary code, a computer for reading the binary code, or any combination thereof.

Provided herein are sequencing systems that can be integrated into the devices described herein. In some instances, the sequencing system is a parallel sequencing system. Various methods of sequencing are well known in the art, and comprise "base calling" wherein the identity of a base in the target polynucleotide is identified. In some instances, polynucleotides synthesized using the methods, devices, compositions, and systems described herein are sequenced after cleavage from the synthesis surface. In some instances, sequencing occurs during or simultaneously with polynucleotide synthesis, wherein base calling occurs immediately after or before extension of a nucleoside monomer into the growing polynucleotide chain. Methods for base calling include measurement of electrical currents/voltages generated by polymerase-catalyzed addition of bases to a template strand. In some instances, synthesis surfaces comprise enzymes, such as polymerases. In some instances, such enzymes are tethered to electrodes or to the synthesis surface. In some instances, enzymes comprise terminal deoxynucleotidyl transferases, or variants thereof.

Computer Systems

In various aspects, any of the systems described herein are operably linked to a computer and are optionally automated through a computer either locally or remotely. In various instances, the methods and systems described herein further comprise software programs on computer systems and use thereof. Accordingly, computerized control for the synchronization of the dispense/vacuum/refill functions such as orchestrating and synchronizing the material deposition device movement, dispense action and vacuum actuation are within the bounds of the disclosure provided herein. In some instances, the computer systems are programmed to interface between the user specified base sequence and the position of a material deposition device to deliver the correct reagents to specified regions of the substrate. As an example, a computer system, such as the system shown in FIG. 18 or FIG. 19, may be used for encoding data represented as a set of symbols to another set of symbols. For example, the data may be represented as numerical symbols, such as binary values of "0"s and "1"s and the computer system may execute a program comprising an error correction code (e.g., RS code, LDPC code, Turbo code, etc.). In some instances, the computer system executes a program to convert the data to a plurality of nucleic acid sequences, convert a plurality of nucleic acid sequences to data, or both. In some examples, a program may be a machine learning algorithm. In some examples, the machine learning algorithm may determine a nucleotide base based on a signal (e.g., electrical signal, such as current or voltage).

A program may be executed on a computer system provided herein. In some instances, a program comprises a statistical algorithm or a machine learning algorithm. In some instances, an algorithm comprising machine learning (ML) is used to associate the signal (e.g., electrical currents/ voltages) to the nucleoside monomer added to the polynucleotide. In some cases, the algorithm comprising ML may be trained with training data in order to associate the signal (e.g., electrical currents/voltages) to the nucleoside monomer added to the polynucleotide. In some cases, the algorithm comprises classical ML algorithms for classification and/or clustering (e.g., K-means clustering, mean-shift clustering, density-based spatial clustering of applications with noise (DBSCAN), expectation-maximization (EM) clustering, agglomerative hierarchical clustering, logistic regression, naïve Bayes, K-nearest neighbors, random forests or decision trees, gradient boosting, support vector machines (SVMs), or a combination thereof).

In some cases, the algorithm comprises a learning algorithm comprising layers, such as one or more neural networks. Neural networks may comprise connected nodes in a network, which may perform functions, such as transforming or translating input data. In some examples, the output from a given node may be passed on as input to another node. In some embodiments, the nodes in the network may comprise input units, hidden units, output units, or a combination thereof. In some cases, an input node may be connected to one or more hidden units. In some cases, one or more hidden units may be connected to an output unit. The nodes may take in input and may generate an output based on an activation function. In some embodiments, the input or output may be a tensor, a matrix, a vector, an array, or a scalar. In some embodiments, the activation function may be a Rectified Linear Unit (ReLU) activation function, a sigmoid activation function, or a hyperbolic tangent activation function. In some embodiments, the activation function may be a Softmax activation function. The connections between nodes may further comprise weights for adjusting input data to a given node (e.g., to activate input data or deactivate input data). In some embodiments, the weights may be learned by the neural network. In some embodiments, the neural network may be trained using gradient-based optimizations. In some cases, the gradient-based optimization may comprise of one or more loss functions. In some examples, the gradient-based optimization may be conjugate gradient descent, stochastic gradient descent, or a variation thereof (e.g., adaptive moment estimation (Adam)). In further examples, the gradient in the gradient-based optimization may be computed using backpropagation. In some embodiments, the nodes may be organized into graphs to generate a network (e.g., graph neural networks). In some embodiments, the nodes may be organized into one or more layers to generate a network (e.g., feed forward neural networks, convolutional neural networks (CNNs), recurrent neural networks (RNNs), etc.). In some cases, the neural network may be a deep neural network comprising of more than one layer.

In some cases, the neural network may comprise one or more recurrent layer. In some examples, the one or more recurrent layer may be one or more long short-term memory (LSTM) layers or gated recurrent unit (GRU), which may perform sequential data classification and clustering. In some embodiments, the neural network may comprise one or more convolutional layers. The input and output may be a tensor representing of variables or attributes in a data set (e.g., features), which may be referred to as a feature map (or activation map). In some cases, the convolutions may be one dimensional (1D) convolutions, two dimensional (2D) convolutions, three dimensional (3D) convolutions, or any combination thereof. In further cases, the convolutions may be 1D transpose convolutions, 2D transpose convolutions, 3D transpose convolutions, or any combination thereof. In some examples, one-dimensional convolutional layers may be suited for time series data since it may classify time series through parallel convolutions. In some examples, convolutional layers may be used for analyzing a signal (e.g., electrical currents/voltages) to the nucleoside monomer added to the polynucleotide.

The layers in a neural network may further comprise one or more pooling layers before or after a convolutional layer. The one or more pooling layers may reduce the dimensionality of the feature map using filters that summarize regions of a matrix. This may down sample the number of outputs, and thus reduce the parameters and computational resources needed for the neural network. In some embodiments, the one or more pooling layers may be max pooling, min pooling, average pooling, global pooling, norm pooling, or a combination thereof. Max pooling may reduce the dimensionality of the data by taking only the maximums values in the region of the matrix, which helps capture the significant feature. In some embodiments, the one or more pooling layers may be one dimensional (1D), two dimensional (2D), three dimensional (3D), or any combination thereof. The neural network may further comprise of one or more flattening layers, which may flatten the input to be passed on to the next layer. In some cases, the input may be flattened by reducing it to a one-dimensional array. The flattened inputs may be used to output a classification of an object (e.g., classification of signals (e.g., electrical currents/voltages) to a nucleoside monomer added to the polynucleotide, etc.). The neural networks may further comprise one or more dropout layers. Dropout layers may be used during training of the neural network (e.g., to perform binary or multi-class classifications). The one or more dropout layers may randomly set certain weights as 0, which may set corresponding elements in the feature map as 0, so the neural network may avoid overfitting. The neural network may further comprise one or more dense layers, which comprise a fully connected network. In the dense layer, information may be passed through the fully connected network to generate a predicted classification of an object, and the error may be calculated. In some embodiments, the error may be backpropagated to improve the prediction. The one or more dense layers may comprise a Softmax activation function, which may convert a vector of numbers to a vector of probabilities. These probabilities may be subsequently used in classifications, such as classifications of signal (e.g., electrical currents and/or voltages) to the nucleoside monomer added to the polynucleotide.

Figure 18:
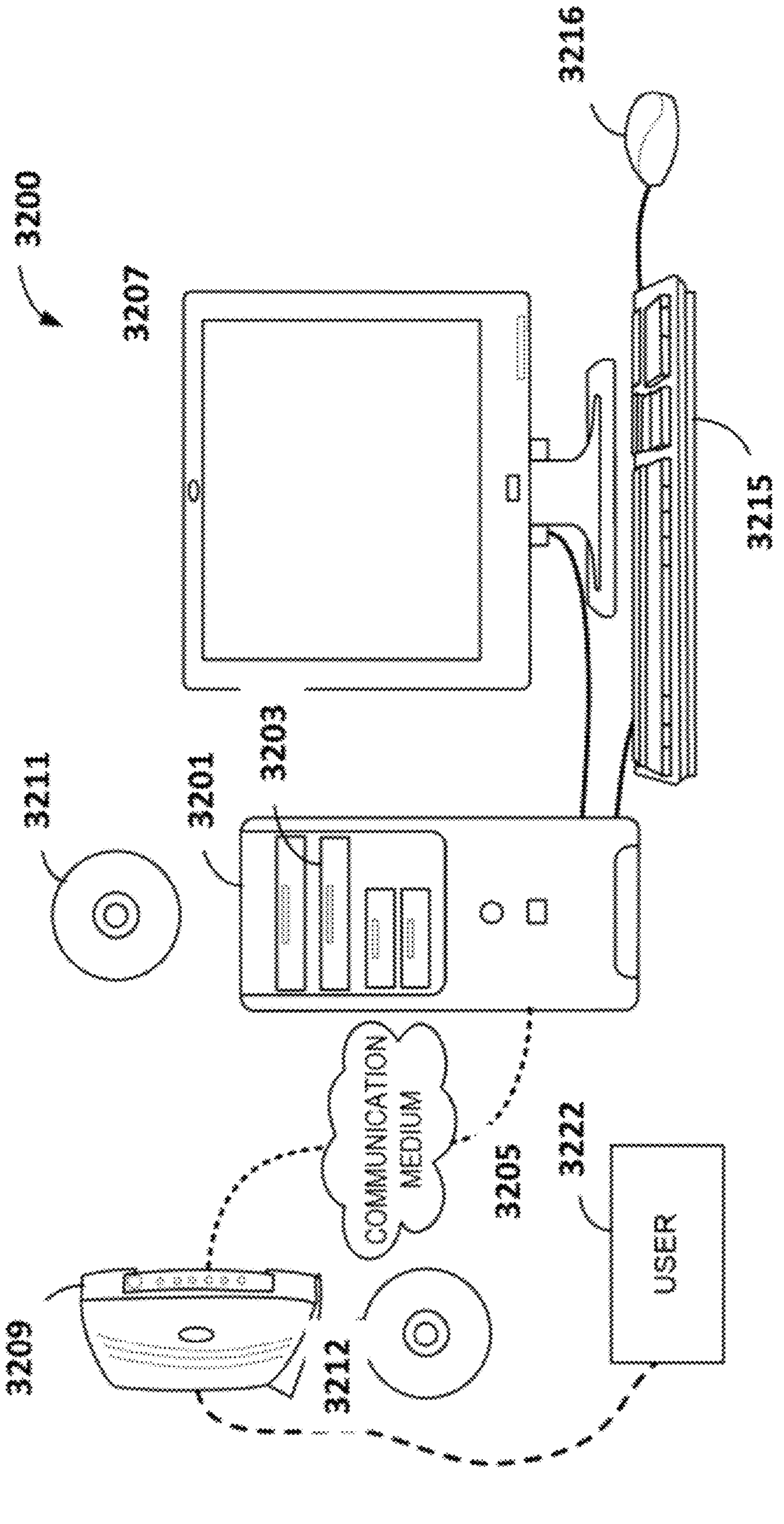
FIG. 18 illustrates an example of a computer system according to some embodiments.

The computer system 3200 illustrated in FIG. 18 may be understood as a logical apparatus that can read instructions from media 3211 and/or a network port 3205, which can optionally be connected to server 3209 having fixed media 3212. The system can include a CPU 3201, disk drives 3203, optional input devices such as keyboard 3215 and/or mouse 3216 and optional monitor 3207. Data communication can be achieved through the indicated communication medium to a server at a local or a remote location. The communication medium can include any means of transmitting and/or receiving data. For example, the communication medium can be a network connection, a wireless connection or an internet connection. Such a connection can provide for communication over the World Wide Web. It is envisioned that data relating to the present disclosure can be transmitted over such networks or connections for reception and/or review by a party 3222.

Figure 19:
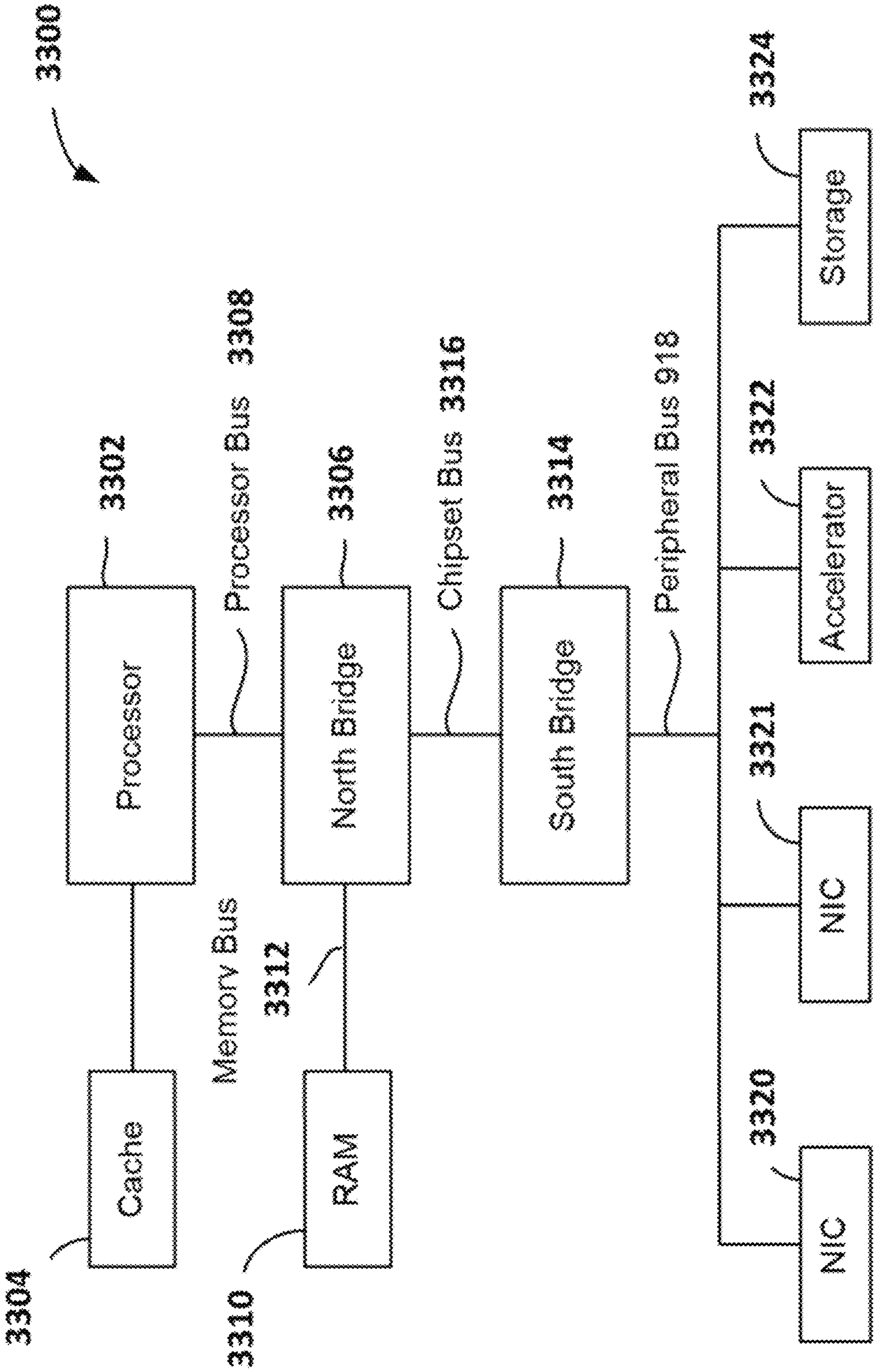
FIG. 19 is a block diagram illustrating architecture of a computer system according to some embodiments. A $Pd^0(R_3P)_4^{4-}$ is shown for example only.

FIG. 19 is a block diagram illustrating a first example architecture of a computer system that can be used in connection with example instances of the present disclosure.

As depicted in FIG. 18, the example computer system can include a processor 3302 for processing instructions. Non-limiting examples of processors include: Intel Xeon™ processor, AMD Opteron™ processor, Samsung 32-bit RISC ARM 1176JZ(F)-S v1.0™ processor, ARM Cortex-A8 Samsung S5PC100™ processor, ARM Cortex-A8 Apple A4™ processor, Marvell PXA 930™ processor, or a functionally-equivalent processor. Multiple threads of execution can be used for parallel processing. In some instances, multiple processors or processors with multiple cores can also be used, whether in a single computer system, in a cluster, or distributed across systems over a network comprising a plurality of computers, cell phones, and/or personal data assistant devices.

As illustrated in FIG. 19, a high speed cache 3304 can be connected to, or incorporated in, the processor 3302 to provide a high speed memory for instructions or data that have been recently, or are frequently, used by processor 3302. The processor 3302 is connected to a north bridge 3306 by a processor bus 3308. The north bridge 3306 is connected to random access memory (RAM) 3310 by a memory bus 3312 and manages access to the RAM 3310 by the processor 3302. The north bridge 3306 is also connected to a south bridge 3314 by a chipset bus 3316. The south bridge 3314 is, in turn, connected to a peripheral bus 3318. The peripheral bus can be, for example, PCI, PCI-X, PCI Express, or other peripheral bus. The north bridge and south bridge are often referred to as a processor chipset and manage data transfer between the processor, RAM, and peripheral components on the peripheral bus 3318. In some alternative architectures, the functionality of the north bridge can be incorporated into the processor instead of using a separate north bridge chip.

In some instances, a system 3300 can include an accelerator card 3322 attached to the peripheral bus 3318. The accelerator can include field programmable gate arrays (FPGAs) or other hardware for accelerating certain processing. For example, an accelerator can be used for adaptive data restructuring or to evaluate algebraic expressions used in extended set processing.

Software and data are stored in external storage 3324 and can be loaded into RAM 3310 and/or cache 3304 for use by the processor. The system 3300 includes an operating system for managing system resources; non-limiting examples of operating systems include: Linux, Windows·, MACOS™, BlackBerry OS™, iOS™, and other functionally-equivalent operating systems, as well as application software running on top of the operating system for managing data storage and optimization in accordance with example embodiments of the present disclosure.

In this example, system 3300 also includes network interface cards (NICs) 3320 and 3321 connected to the peripheral bus for providing network interfaces to external storage, such as Network Attached Storage (NAS) and other computer systems that can be used for distributed parallel processing.

Figure 20:
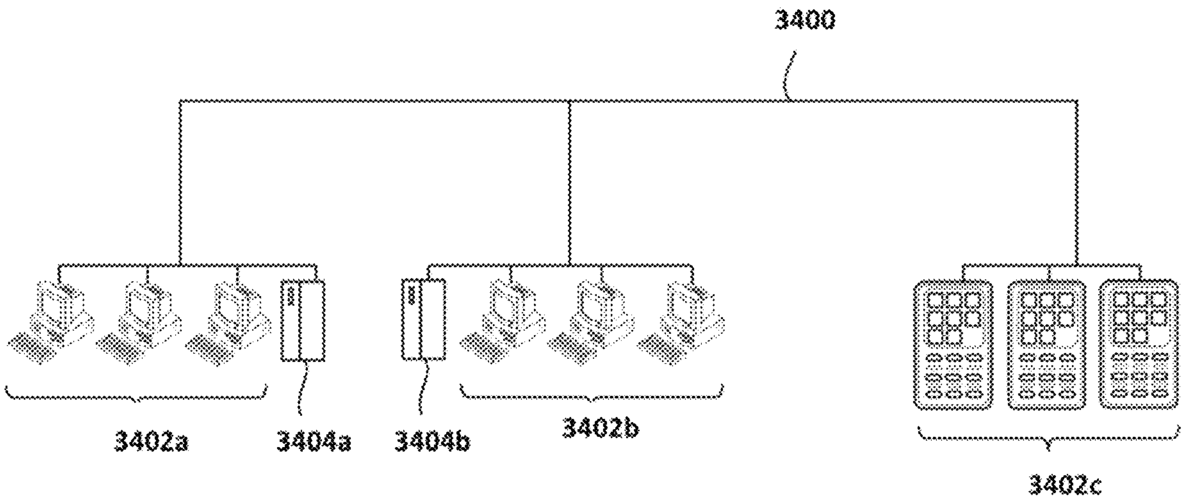
FIG. 20 is a diagram demonstrating a network configured to incorporate a plurality of computer systems, a plurality of cell phones and personal data assistants, and Network Attached Storage (NAS) according to some embodiments.

FIG. 20 is a diagram showing a network 3400 with a plurality of computer systems 3402*a,* and 3402*b,* a plurality of cell phones and personal data assistants 3402*c,* and Network Attached Storage (NAS) 3404*a,* and 3404*b.* In example embodiments, systems 3402*a,* 3402*b,* and 3402*c* can manage data storage and optimize data access for data stored in Network Attached Storage (NAS) 3404*a* and 3404*b.* A mathematical model can be used for the data and be evaluated using distributed parallel processing across computer systems 3402*a,* and 3402*b,* and cell phone and personal data assistant systems 3402*c.* Computer systems 3402*a,* and 3402*b,* and cell phone and personal data assistant systems 3402*c* can also provide parallel processing for adaptive data restructuring of the data stored in Network Attached Storage (NAS) 3404*a* and 3404*b.* FIG. 20 illustrates an example only, and a wide variety of other computer architectures and systems can be used in conjunction with the various embodiments of the present disclosure. For example, a blade server can be used to provide parallel processing. Processor blades can be connected through a back plane to provide parallel processing. Storage can also be connected to the back plane or as Network Attached Storage (NAS) through a separate network interface.

In some example embodiments, processors can maintain separate memory spaces and transmit data through network interfaces, back plane or other connectors for parallel processing by other processors. In other embodiments, some or all of the processors can use a shared virtual address memory space.

Figure 21:
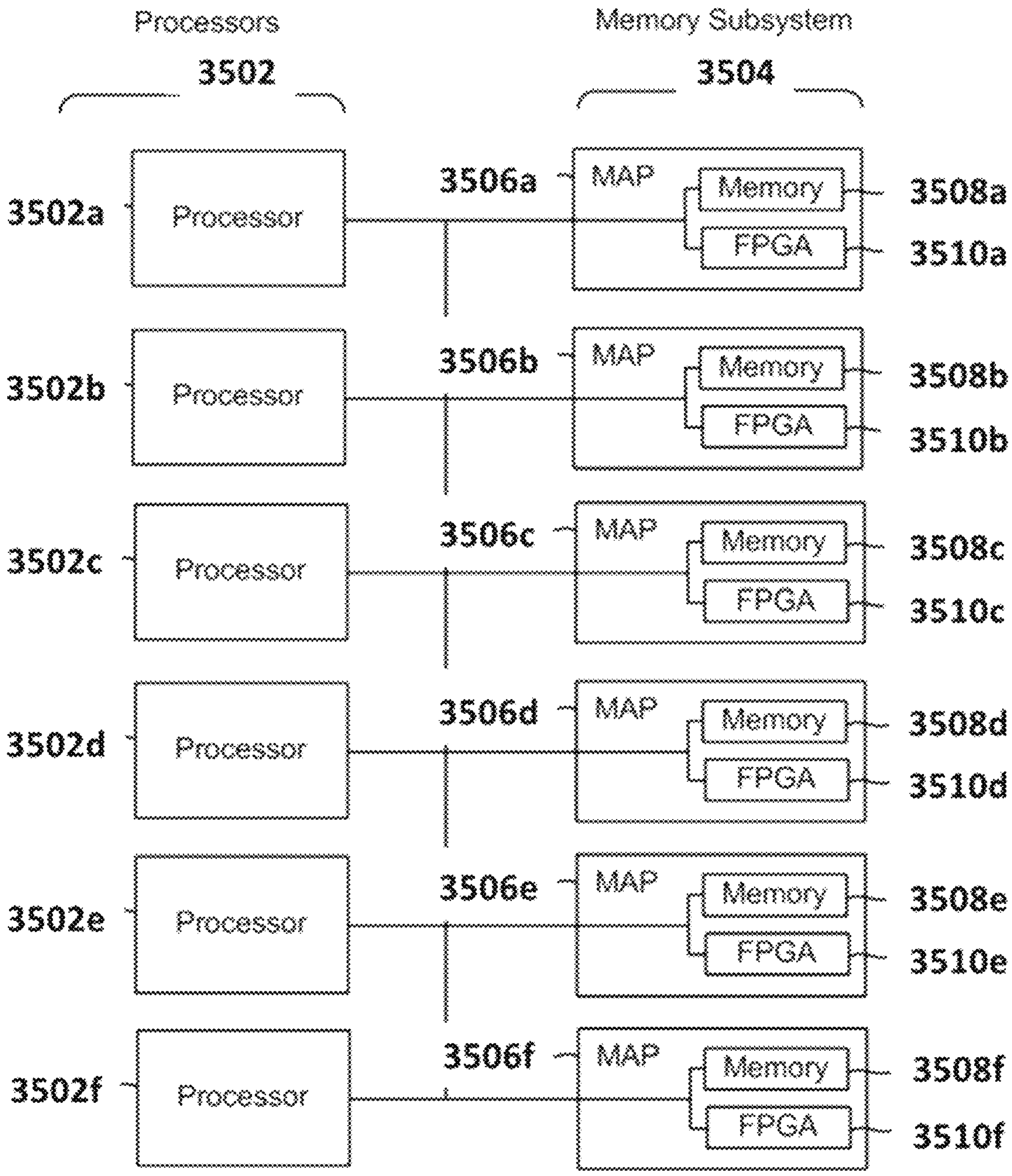
FIG. 21 is a block diagram of a multiprocessor computer system using a shared virtual address memory space according to some embodiments.

FIG. 21 is a block diagram of a multiprocessor computer system 3500 using a shared virtual address memory space in accordance with an example embodiment. The system includes a plurality of processors 3502*a-f* that can access a shared memory subsystem 3504. The system incorporates a plurality of programmable hardware memory algorithm processors (MAPs) 806*a-f* in the memory subsystem 3504. Each MAP 3506*a-f* can comprise a memory 3508*a-f* and one or more field programmable gate arrays (FPGAs) 3510*a-f.* The MAP provides a configurable functional unit and particular algorithms, or portions of algorithms can be provided to the FPGAs 3510*a-f* for processing in close coordination with a respective processor. For example, the MAPs can be used to evaluate algebraic expressions regarding the data model and to perform adaptive data restructuring in example embodiments. In this example, each MAP is globally accessible by all of the processors for these purposes. In one configuration, each MAP can use Direct Memory Access (DMA) to access an associated memory 3508*a-f,* allowing it to execute tasks independently of, and asynchronously from, the respective microprocessor 3502*a-f.* In this configuration, a MAP can feed results directly to another MAP for pipelining and parallel execution of algorithms.

The above computer architectures and systems are examples only, and a wide variety of other computer, cell phone, and personal data assistant architectures and systems can be used in connection with example embodiments, including systems using any combination of general processors, co-processors, FPGAs and other programmable logic devices, system on chips (SOCs), application specific integrated circuits (ASICs), and other processing and logic elements. In some embodiments, all or part of the computer system can be implemented in software or hardware. Any variety of data storage media can be used in connection with example embodiments, including random access memory, hard drives, flash memory, tape drives, disk arrays, Network Attached Storage (NAS) and other local or distributed data storage devices and systems.

In example embodiments, the computer system can be implemented using software modules executing on any of the above or other computer architectures and systems. In other embodiments, the functions of the system can be implemented partially or completely in firmware, programmable logic devices such as field programmable gate arrays (FPGAs), system on chips (SOCs), application specific integrated circuits (ASICs), or other processing and logic elements. For example, the Set Processor and Optimizer can be implemented with hardware acceleration through the use of a hardware accelerator card.

The following examples are set forth to illustrate more clearly the principle and practice of embodiments disclosed herein to those skilled in the art and are not to be construed as limiting the scope of any claimed embodiments. Unless otherwise stated, all parts and percentages are on a weight basis.

EXAMPLES

Example 1

Chemical Synthesis of DNA Using 5'-O-alloc DNA Phosphoramidite Monomers

A dT 15-mer DNA oligomer was synthesized using the synthetic cycle illustrated in FIG. 13. The 5'-O-alloc deprotection conditions were: 800 μM $Pd(Ph_3)_4$, 10 mM $PPh_3$, N,N-dimethylbarbituric acid in THF, reaction time 3 minutes. The integrity of the 15-mer DNA oligomer was confirmed using high-performance liquid chromatography (HPLC) and mass spectrometry (MS) analyses.

FIG. 13 illustrates the chemical synthesis of DNA using 5'-alloc DNA phosphoramidite monomers. First, phosphoramidite coupling was accomplished using a 5'-O-alloc protected phosphoramidite monomer. Second, the coupled phosphoramidite moiety was subjected to oxidation and capping. Third, the coupled phosphoramidite moiety was subjected to Pd-catalyzed alloc deprotection.

Figure 14A:
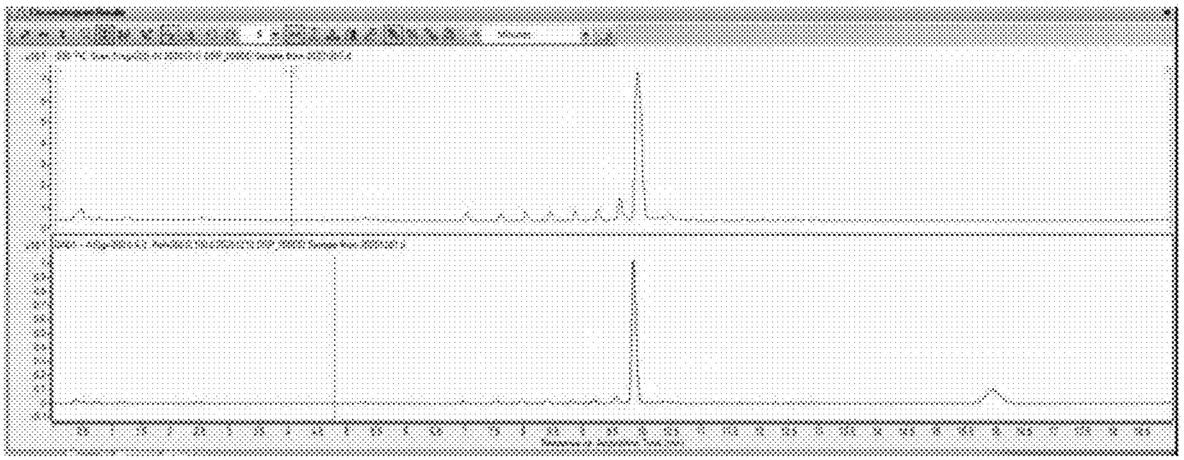
FIG. 14A shows HPLC chromatograms of 15-mer DNA molecules synthesized using 5'-alloc DNA phosphoramidite monomers and subsequent deprotection conditions according to some embodiments. The window is labeled Chromatograph results. The top plot is labeled ESI TIC Scan Frag=200.0V 202201210 DSP_000DD Sample from 20201207.d with a y-axis representing counts from 0 to $7\times10^8$ at $1\times10^8$ unit intervals. The bottom plot is labeled DAD1-A:Sig260.0,4,0 Ref=360.0 0.100.0 20201210 DSP_000DD Sample from 20201207.d with a y-axis representing counts from $-0.1\times10^3$ to $1\times10^3$ at $0.1\times10^3$ unit intervals. Both plots share a common x axis labeled Response vs. Acquisition Time (min) from 0 to 19 at 0.5 unit intervals.
Figure 14B:
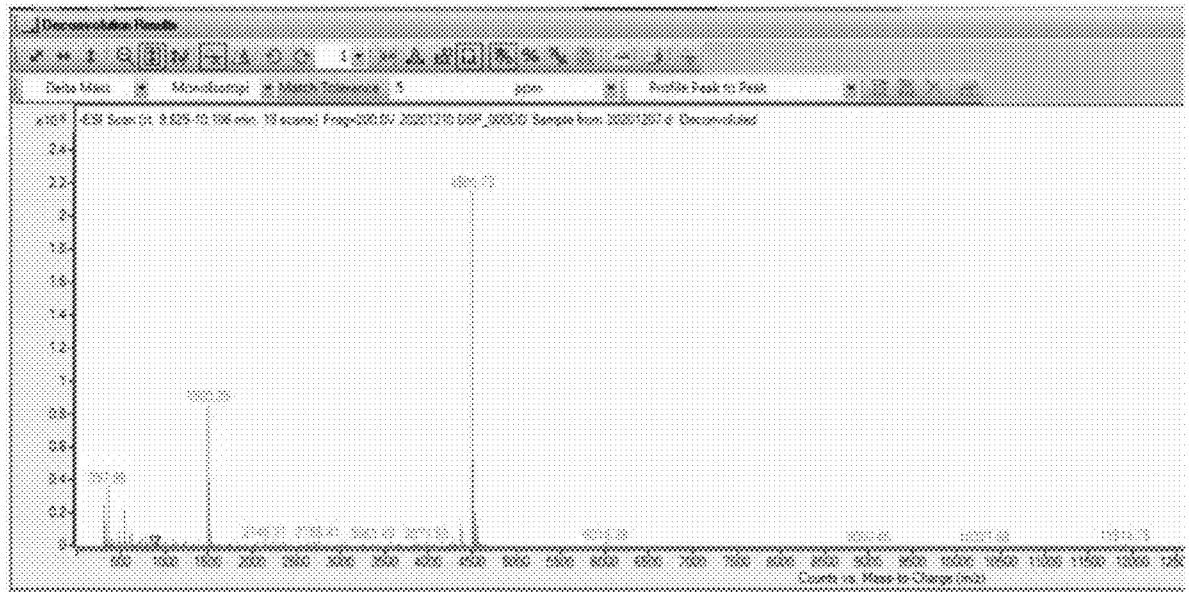
FIG. 14B shows MS analysis of 15-mer DNA molecules synthesized using 5'-alloc DNA phosphoramidite monomers and subsequent deprotection conditions according to some embodiments. The window is titled Deconvolution Results using display variables Delta Mass, monoisotopic, match tolerance 5 ppm, and profile peak to peak. The plot is labeled ESI Scan (rt: 9.825-10.106 min, 18 scans) Frag=200.0V 20201210 DSP_000DD Sample from 20201207.d Deconvoluted. The y-axis represents counts from 0 to $2.4\times10^6$ at $0.2\times10^6$ intervals. The x-axis is labeled counts vs. mass-to-charge (m/z) from 0 to 1250 at 500 unit intervals. Labeled peaks (left right) are 357.98, 1500.25 (second largest peak), 2146.31, 2755.41, 3363.49, 3971.58, 4500.73 (largest peak), 6016.39, 9000.45, 10321.88, and 11914.75.

FIG. 14A shows HPLC analysis of a 15-mer DNA oligomer synthesized using 5'-O-alloc deprotection. FIG. 14B shows MS analysis of a 15-mer DNA oligomer synthesized using 5'-O-alloc deprotection.

Example 2

Chemical Synthesis of DNA Using P—O-alloc DNA Phosphoramidite Monomers

A dT 15-mer DNA oligomer is synthesized by replacing a P—O-cyanoethyl group with a P—O-alloc protecting group. A stable H-phosphonate is generated at each cycle (simultaneously during deprotection), and oxidation occurs as a single step at the end of the synthesis.

FIG. 15 illustrates the chemical synthesis of DNA using P—O-alloc protecting groups. First, phosphoramidite coupling is accomplished using a 5'-O-alloc-protected and P—O-alloc-protected phosphoramidite monomer. Second, the coupled phosphoramidite moiety is subjected to Pd-catalyzed alloc deprotection and capping. After all coupling steps are repeated, the final intermediate is subjected to oxidation and cleavage to afford the desired oligomer molecule.

Example 3

DNA Oligomer Synthesis on an Electrochemical Platform

DNA oligomer synthesis is carried out on an electrochemical platform by conjugating base pairs to a solid support. 5'-O-alloc protected DMTr DNA phosphoramidite monomers are coupled, and subjected to deprotection with a nucleophile, catalyzed by Pd(0). The species can be produced by site-selective reduction of a Pd(II) precursor.

FIG. 16 illustrates the DNA oligomersynthesis on an electrochemical platform, which deprotects 5'-O-alloc protected DNA phosphoramidite moieties with a nucleophile, catalyzed by Pd(0).

Example 4

Electrophoretic Application

FIG. 17 illustrates use of an electrochemical platform for electrophoretic applications, where charged species are selectively attracted or expelled from reaction sites. In one example, a negatively charged aryl sulfonate-containing phosphine ligand is attracted (to facilitate deprotection) or repelled (to prevent deprotection) from reaction sites. Alternatively positively charged ligands are used.

Example 5

High Density Array Device

Following the general methods of Examples 1 or 2, a solid support comprising an addressable array of loci for polynucleotide synthesis is employed to synthesize a library of at least 10,000 polynucleotides with a length of 150 bases. The loci have a pitch distance of 10-200 nm, and the array comprises at least 1000 addressable loci.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of synthesizing a polynucleotide comprising:

coupling at least one nucleoside attached to a solid support to a protected nucleoside, wherein the protected nucleoside comprises a protecting group, wherein the protecting group comprises a branched alkenylene, wherein the solid support comprises an addressable array, and wherein the addressable array comprises a plurality of loci;

contacting an amount of a reagent with the protected nucleoside, wherein the contacting results in deprotection of the protected nucleoside; and repeating the coupling and contacting steps to synthesize the polynucleotide.

2. The method of claim 1, wherein the amount of the reagent is less than about 15 mol % of the protected nucleoside.

3. The method of claim 1, wherein the protecting group protects a 5' hydroxyl of the protected nucleoside.

4. The method of claim 1, wherein the reagent comprises a transition metal catalyst.

5. The method of claim 4, wherein the transition metal catalyst comprises:

a zero oxidation state;

a Pd(0) catalyst;

comprises one or more phosphine ligands; and/or $Pd(Ph_3)_4$.

6. The method of claim 1, further comprising contacting the protected nucleoside with a nucleophile.

7. The method of claim 1, wherein the reagent is in contact with the protected nucleoside for less than about 10 minutes.

8. The method of claim 1, wherein the method further comprises capping, wherein capping comprises applying acetyl chloride or acetic anhydride to the solid support.

9. The method of claim 1, wherein the polynucleotide is 50-300 bases in length.

10. The method of claim 1, further comprising applying a voltage to a solvent in fluid communication with the protected polynucleotide, wherein the voltage is applied for a duration of 0.1 seconds to 10 seconds.

11. The method of claim 1, wherein the protected nucleoside comprises the formula:

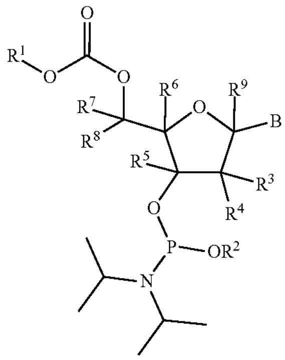

or

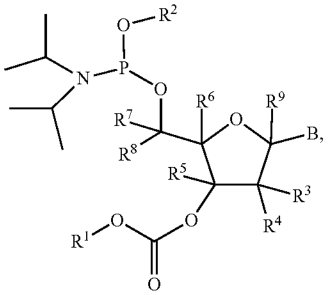

wherein:

R1 is a branched alkenylene;

R2 is alkylene or alkenylene, each of which is independently unsubstituted or substituted;

each R3, R4, R5, R6, R7, R8, or R9 is independently H, OH, a halogen, an O-alkyl, an N-alkyl, an O-alkyl-O-alkyl, an azide; or R3 and R6 are taken together to form a ring; and B is a monocyclic or bicyclic C4-6 heterocyclic ring.

12. The method of claim 11, wherein one or both of R3 and R4 is:

F;

$OCH_3$; or $OCH_2CH_2OCH_3$.

13. The method of claim 1, wherein the reagent comprises a Pd(0) complex with negatively charged aryl-sulfonate containing phosphine ligands.

14. The method of claim 13, further comprising:

applying a voltage to one or more loci to electrophoretically attract the Pd(0) complex with negatively charged phosphine ligands to selected loci to deprotect the protected nucleoside.

15. The method of claim 1, wherein each polynucleotide of the plurality of polynucleotides synthesized has a different sequence from another polynucleotide of the plurality of polynucleotides.

16. The method of claim 1, further comprising:

selectively reducing a Pd(II) precursor at one or more loci of the addressable array to generate a Pd(0) catalyst;

contacting the protected nucleoside with the Pd(0) catalyst and a nucleophile to deprotect the protected nucleoside.

17. The method of claim 1, wherein the plurality of polynucleotides are synthesized at a rate of about 100 nucleotides per hour.

18. The method of claim 6, wherein the nucleophile is N,N-dimethylbarbiturate.

19. The method of claim 1, further comprising an oxidation step, wherein the oxidation step comprises treatment with iodine, water, and a base, wherein the base is selected from pyridine, lutidine, or collidine.

20. The method of claim 1, wherein the protecting group comprising a branched alkenylene is protecting a 3' hydroxyl of the protected nucleoside.

* * * * *